United States Patent
Du et al.

(10) Patent No.: US 12,537,720 B2
(45) Date of Patent: Jan. 27, 2026

(54) COMMUNICATION METHOD AND APPARATUS

(71) Applicant: Huawei Technologies Co., Ltd., Shenzhen (CN)

(72) Inventors: Rui Du, Singapore (SG); Xiao Han, Shenzhen (CN); Mengshi Hu, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 18/764,828

(22) Filed: Jul. 5, 2024

(65) Prior Publication Data
US 2024/0380642 A1    Nov. 14, 2024

Related U.S. Application Data

(63) Continuation of application No. PCT/CN2023/070702, filed on Jan. 5, 2023.

(30) Foreign Application Priority Data

Jan. 6, 2022 (CN) .......................... 202210011237.4

(51) Int. Cl.
*H04L 5/00* (2006.01)
*H04B 7/06* (2006.01)
*H04L 25/02* (2006.01)

(52) U.S. Cl.
CPC ....... *H04L 25/0242* (2013.01); *H04B 7/0639* (2013.01); *H04L 5/0098* (2013.01)

(58) Field of Classification Search
CPC .......... H04B 7/04; H04B 7/06; H04B 7/0456; H04B 7/0639; H04B 17/318; H04L 1/00; H04L 5/00; H04L 5/0098; H04L 12/26; H04L 5/02; H04L 25/03; H04L 25/0242; H04W 24/10; H04W 28/16; H04W 64/00; H04W 72/04; H04W 72/12; H04W 84/12
(Continued)

(56) References Cited

U.S. PATENT DOCUMENTS 8,861,651 B2    10/2014 Aubert
10,153,877 B2 *  12/2018 Park ...................... H04L 5/0048
(Continued)

FOREIGN PATENT DOCUMENTS

EP    2725731 A1    4/2014
WO   2018009462 A1   1/2018

OTHER PUBLICATIONS

IEEE Std 802.11ac™-2013,"Part 11: Wireless LAN Medium Access Control (MAC) and Physical Layer (PHY) Specifications, Amendment 4: Enhancements for Very High Throughput for Operation in Bands below 6 GHZ," Dec. 11, 2013, 425 pages.
(Continued)

*Primary Examiner* — Shawkat M Ali
(74) *Attorney, Agent, or Firm* — Conley Rose, P.C.

(57) ABSTRACT

A communication method includes a first device that determines channel state information based on a first frame that is used for channel measurement and that is sent by a second device, performs conjugate transpose and QR decomposition to obtain a matrix R and a matrix Q, and sends, to the second device, the matrix Q indicating attribute information of a target path.

19 Claims, 20 Drawing Sheets

(58) Field of Classification Search
USPC ....... 375/219, 260, 262, 267, 295, 316, 340, 375/350; 455/186.1, 277.2
See application file for complete search history.

(56) References Cited

U.S. PATENT DOCUMENTS

| | | | |
|---|---|---|---|
| 2015/0326340 A1* | 11/2015 | Huang | H04L 25/0204 375/267 |
| 2018/0175928 A1 | 6/2018 | Roy et al. | |
| 2019/0349224 A1 | 11/2019 | Chiskis et al. | |
| 2020/0007200 A1 | 1/2020 | Schreck et al. | |
| 2020/0280863 A1 | 9/2020 | Cioffi et al. | |

OTHER PUBLICATIONS

IEEE Std 802.11ad-2012, "Part 11:Wireless LAN medium access control (MAC) and physical layer (PHY) specifications, Amendment 3: Enhancements for very high throughput in the 60 GHz band," Mar. 2014, 634 pages.

IEEE Std 802.11n™-2009, Part 11: Wireless LAN Medium Access Control (MAC) and Physical Layer (PHY) specifications, Amendment 5:Enhancements for Higher Throughput, Oct. 29, 2009, 536 pages.

IEEE P802.11ax™M/D6.0, "Part 11: Wireless LAN Medium Access Control(MAC) and Physical Layer (PHY) Specifications, Amendment 1: Enhancements for High Efficiency WLAN," Nov. 2019, 780 pages.

IEEE P802. 11ay™M/D2.2, "Part 11: Wireless LAN Medium Access Control (MAC) and Physical Layer (PHY) Specifications, Amendment 2: Enhanced throughput for operation in 12 license-exempt bands above 45 GHZ," Jan. 2019, 707 pages.

Rui Du et al, An Overview on IEEE 802.11bf:WLAN Sensing, Jul. 2022, 23 pages.

IEEE P802.11be™/D0.01, "Part 11: Wireless LAN Medium Access Control (MAC) and Physical Layer (PHY) Specifications, Amendment 7:Enhancements for extremely high throughput (EHT)," Jul. 2020, 33 pages.

"Series H: Audiovisual and Multimedia Systems, infrastructure of audiovisual services—Transmission multiplexing and synchronization, Multiplexing protocol for low bit rate multimedia communication," ITU-T H.223, Jul. 2001, 74 pages.

* cited by examiner

| Trigger type | UL Length | ... | Doppler | UL HE-SIG-A2 Reserved | Reserved | Trigger Dependent Common Info Trigger dependent common information |
|---|---|---|---|---|---|---|
| 4 | 12 | ... | 1 | 9 | 1 | Variable |

Bits

FIG. 16

| Element ID | Length | Element ID extension | ... | Digital BF Request Digital beamforming request | Feedback type | Nc Index | Reserved |
|---|---|---|---|---|---|---|---|
| 8 | 8 | 8 | | 1 | 1 | 2 | 5 |

COMMUNICATION METHOD AND APPARATUS

CROSS-REFERENCE TO RELATED APPLICATIONS

This is a continuation of International Patent Application No. PCT/CN2023/070702 filed on Jan. 5, 2023, which claims priority to Chinese Patent Application No. 202210011237.4 filed on Jan. 6, 2022. The disclosures of the aforementioned applications are hereby incorporated by reference in their entireties.

TECHNICAL FIELD

This disclosure relates to the field of communication technologies, and in particular, to a communication method and apparatus.

BACKGROUND

Wireless local area network (WLAN) sensing is a technology in which wireless signals are used to sense a target. The target may be an object in a surrounding environment, for example, a person or an object. Based on a capability of radio measurement or environment sampling, WLAN sensing can provide an opportunity for each communication path between two physical devices to extract information about their surroundings.

In WLAN sensing, the target may be sensed based on the 802.11 series standards. A beamforming technology is defined in the 802.11 series standards. In this technology, a sending device may send, to a receiving device, a frame for indicating to perform channel measurement, and the receiving device may perform channel measurement based on the frame to obtain channel state information. To reduce feedback overheads, the receiving device may decompose the channel state information through QR decomposition, compress decomposed channel state information, and feed back compressed channel state information to the sending device. The sending device may reconstruct the channel state information based on the compressed channel state information, and generate a steering matrix to improve communication performance.

However, when the receiving device performs QR decomposition on the channel state information, relative phase information between subcarriers and between pulses cannot be reserved in the decomposed channel state information by using an existing QR decomposition rule. As a result, the sending device cannot extract attribute information of the target based on the reconstructed channel state information, and cannot implement effective sensing on the target. The attribute information of the target may include information such as a target delay, a target angle, and a target Doppler shift. The target delay may be used to determine a distance of the target. The target angle may be used to determine a direction of the target. The target Doppler shift may be used to determine a speed of the target, and the like.

SUMMARY

In view of this, embodiments of this disclosure provide a communication method and apparatus, to reduce channel state information feedback overheads, reserve relative phase information between subcarriers and between pulses, and implement effective sensing on a target.

According to a first aspect, an embodiment of this disclosure provides a communication method. The method may include a first device that receives a first frame for channel measurement from a second device, the first device determines channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers, and the first device performs conjugate transpose and QR decomposition on the channel state information to obtain an upper right triangular matrix R and a matrix Q, and the first device sends the matrix Q to the second device, where in the first L rows of the matrix R, at least one row meets that plus or minus signs of elements on a corresponding diagonal are consistent in a subcarrier dimension, at least one row meets that plus or minus signs of elements on a corresponding diagonal are consistent in a sample dimension, L is a quantity of target paths between the first device and the second device, a sample is a plurality of pieces of channel state information obtained by performing a plurality of times of channel measurement in a time dimension, the sample dimension is a sample dimension corresponding to the plurality of pieces of channel state information, and the matrix Q indicates attribute information of the target path.

Based on the first aspect, in the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension. Correspondingly, the matrix Q obtained through QR decomposition of the matrix R may reserve relative phase information between subcarriers and between pulses. In other words, attribute information such as a delay, an AOD, or a Doppler shift of the target path may be reserved in the matrix Q. Therefore, the second device may determine the attribute information of the target path based on the matrix Q, to implement effective sensing on the target path based on a channel matrix diagonalization principle.

In a possible design, the matrix Q is a unitary matrix, or a matrix obtained by normalizing at least one column of the matrix Q is a unitary matrix.

In a possible design, the attribute information of the target path includes one or more of the following: a delay of the target path, an angle of departure (AOD) of the target path, or a Doppler shift of the target path.

Based on this possible design, the attribute information such as the delay, the AOD, and the Doppler shift of the target path may be reserved in the matrix Q, so that the second device can perform target path sensing based on the attribute information.

In a possible design, the first device determines a first location and a second location, and performs conjugate transpose and QR decomposition on the channel state information based on the first location and the second location, where the first location is a location, in the matrix R, of an element that is in the first L rows of the matrix R and that meets that plus or minus signs of elements on a corresponding diagonal are consistent in a subcarrier dimension, and the second location is a location, in the matrix R, of an element that is in the first L rows of the matrix R and that meets that plus or minus signs of elements on a corresponding diagonal are consistent in a sample dimension.

Based on this possible design, the first device may perform conjugate transpose and QR decomposition on the channel state information based on the first location and the second location. A feasible solution is provided for the first device to perform conjugate transpose and QR decomposition on the channel state information.

In a possible design, the first device receives information about the first location and information about the second location from the second device, or the first location and the second location are predefined, or the first location and the second location are defined by the first device.

In a possible design, the first device sends information about the first location and information about the second location to the second device.

Based on the foregoing two possible designs, the first location and the second location may be specified by the second device, or may be specified in a protocol, or may be defined by the first device. When the first location and the second location are defined by the first device, the first device may further indicate the first location and the second location to the second device. A plurality of feasible solutions are provided for determining the first location and the second location.

In a possible design, before the first device receives the first frame from the second device, the first device sends first indication information to the second device, where the first indication information indicates whether the first device supports one or more of the following feedbacks: feedback of a compressed beamforming matrix based on subcarrier dimension consistency or feedback of a compressed beamforming matrix based on sample dimension consistency.

Based on this possible design, the first device may indicate, to the second device by using the first indication information, whether the first device supports one or more of the foregoing feedbacks. When the first device supports one or more of the foregoing feedbacks, the first device may feed back the compressed beamforming matrix to the second device by using the method provided in this embodiment of this disclosure.

In a possible design, the first indication information is located in one or more of the following fields: a sensing capability field of an association request frame, a core capabilities field of an enhanced directional multi-gigabit (EDMG) sensing capability field, or an optional subelements field of an EDMG sensing capability field.

Based on the possible design, a plurality of feasible solutions is provided for designing the first indication information.

In a possible design, before the first device receives the first frame from the second device, the first device receives second indication information from the second device, where the second indication information indicates whether the second device supports one or more of the following feedbacks: feedback of a compressed beamforming matrix based on subcarrier dimension consistency or feedback of a compressed beamforming matrix based on sample dimension consistency.

Based on this possible design, the second device may indicate, to the first device by using the second indication information, whether the second device supports one or more of the foregoing feedbacks. When the second device supports one or more of the foregoing feedbacks, the second device may feed back the compressed beamforming matrix to the first device based on the function performed by the first device in the method provided in this embodiment of this disclosure, so that the first device performs target path sensing.

In a possible design, the second indication information is located in one or more of the following fields: a sensing capability field of an association response frame, a sensing capability field of a beacon frame, a core capabilities field of an EDMG sensing capability field, or an optional subelements field of an EDMG sensing capability field.

Based on the possible design, a plurality of feasible solutions is provided for designing the second indication information.

In a possible design, before the first device receives the first frame from the second device, the first device receives a sensing request frame from the second device, where the sensing request frame includes a feedback type indication, and the feedback type indication indicates to feed back channel state information for implementing sensing.

In a possible design, before the first device receives the first frame from the second device, the first device sends a sensing response frame to the second device, where the sensing response frame includes a feedback type indication, and the feedback type indication indicates to feed back channel state information for implementing sensing.

Based on the foregoing two possible designs, the first device and the second device may indicate, by using the sensing request frame or the sensing response frame, to feed back the channel state information for implementing sensing when the channel state information is fed back, to perform target path sensing based on the fed-back channel state information.

In a possible design, before the first device sends the matrix Q to the second device, the first device receives third indication information from the second device, where the third indication information indicates to use one or more of the following feedbacks: feedback of a compressed beamforming matrix based on subcarrier dimension consistency or feedback of a compressed beamforming matrix based on sample dimension consistency.

Based on this possible design, the first device may further use one or more of the foregoing feedbacks based on the third indication information sent by the second device, so that the second device performs target path sensing based on the compressed beamforming matrix fed back by the first device.

In a possible design, the third indication information is located in one or more of the following frames: a sensing null data packet announcement (NDPA), a sensing trigger frame, or a Beam Refinement Protocol (BRP).

In a possible design, the third indication information is located in one or more of the following fields: a user information field of a sensing NDPA, a common information field of a sensing NDPA, a common information field of a sensing trigger frame, a user information field of a sensing trigger frame, or a reserved field of a BRP.

Based on the foregoing two possible designs, a plurality of feasible solutions is provided for designing the third indication information.

According to a second aspect, an embodiment of this disclosure provides a communication apparatus. The communication apparatus may implement a function performed by the first device in the first aspect or the possible designs of the first aspect, and the function may be implemented by hardware executing corresponding software. The hardware or the software includes one or more modules corresponding to the foregoing function, for example, a transceiver module and a processing module. The transceiver module is configured to receive a first frame for channel measurement from a second device. The processing module is configured to determine channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers. The processing module is further configured to perform conjugate transpose and QR decomposition on the channel state information to obtain an upper right triangular matrix R and a matrix Q. The transceiver module is further configured to send the matrix Q to the second device, where in the first L rows of the matrix R, at least one row meets that plus or minus signs of elements on a corresponding diagonal are consistent in a subcarrier dimension, at least one row meets that plus or minus signs of elements on a corresponding diagonal are consistent in a sample dimension, L is a quantity of target paths between the first device and the second device, a sample is a plurality of pieces of channel state information obtained by performing a plurality of times of channel measurement in a time dimension, the sample dimension is a sample dimension corresponding to the plurality of pieces of channel state information, and the matrix Q indicates attribute information of the target path.

In a possible design, the matrix Q is a unitary matrix, or a matrix obtained by normalizing at least one column of the matrix Q is a unitary matrix.

In a possible design, the attribute information of the target path includes one or more of the following: a delay of the target path, an AOD of the target path, or a Doppler shift of the target path.

In a possible design, the processing module is further configured to determine a first location and a second location, and perform conjugate transpose and QR decomposition on the channel state information based on the first location and the second location, where the first location is a location, in the matrix R, of an element that is in the first L rows of the matrix R and that meets that plus or minus signs of elements on a corresponding diagonal are consistent in a subcarrier dimension, and the second location is a location, in the matrix R, of an element that is in the first L rows of the matrix R and that meets that plus or minus signs of elements on a corresponding diagonal are consistent in a sample dimension.

In a possible design, the transceiver module is further configured to receive information about the first location and information about the second location from the second device, or the first location and the second location are predefined, or the first location and the second location are defined by the first device.

In a possible design, the transceiver module is further configured to send information about the first location and information about the second location to the second device.

In a possible design, before receiving the first frame from the second device, the transceiver module is further configured to send first indication information to the second device, where the first indication information indicates whether the first device supports one or more of the following feedbacks: feedback of a compressed beamforming matrix based on subcarrier dimension consistency or feedback of a compressed beamforming matrix based on sample dimension consistency.

In a possible design, the first indication information is located in one or more of the following fields: a sensing capability field of an association request frame, a core capabilities field of an EDMG sensing capability field, or an optional subelements field of an EDMG sensing capability field.

In a possible design, before receiving the first frame from the second device, the transceiver module is further configured to receive second indication information from the second device, where the second indication information indicates whether the second device supports one or more of the following feedbacks: feedback of a compressed beamforming matrix based on subcarrier dimension consistency or feedback of a compressed beamforming matrix based on sample dimension consistency.

In a possible design, the second indication information is located in one or more of the following fields: a sensing capability field of an association response frame, a sensing capability field of a beacon frame, a core capabilities field of an EDMG sensing capability field, or an optional subelements field of an EDMG sensing capability field.

In a possible design, before receiving the first frame from the second device, the transceiver module is further configured to receive a sensing request frame from the second device, where the sensing request frame includes a feedback type indication, and the feedback type indication indicates to feed back channel state information for implementing sensing.

In a possible design, before receiving the first frame from the second device, the transceiver module is further configured to send a sensing response frame to the second device, where the sensing response frame includes a feedback type indication, and the feedback type indication indicates to feed back channel state information for implementing sensing.

In a possible design, before sending the matrix Q to the second device, the transceiver module is further configured to receive third indication information from the second device, where the third indication information indicates to use one or more of the following feedbacks: feedback of a compressed beamforming matrix based on subcarrier dimension consistency or feedback of a compressed beamforming matrix based on sample dimension consistency.

In a possible design, the third indication information is located in one or more of the following frames: a sensing NDPA, a sensing trigger frame, or a BRP.

In a possible design, the third indication information is located in one or more of the following fields: a user information field of a sensing NDPA, a common information field of a sensing NDPA, a common information field of a sensing trigger frame, a user information field of a sensing trigger frame, or a reserved field of a BRP.

It should be noted that for a specific implementation of the communication apparatus in the second aspect, refer to a behavior function of the first device in the communication method provided in any one of the first aspect or the possible designs of the first aspect.

According to a third aspect, an embodiment of this disclosure provides a communication apparatus. The communication apparatus may be a first device or a chip or a system on chip in a first device. The communication apparatus may implement a function performed by the first device in the foregoing aspects or the possible designs, and the function may be implemented by hardware. In a possible design, the communication apparatus may include a transceiver and a processor. The transceiver and the processor may be configured to support the communication apparatus in implementing the function in any one of the first aspect or the possible designs of the first aspect. For example, the transceiver may be configured to receive a first frame for channel measurement from a second device. The processor may be configured to determine channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers. The processor may be further configured to perform conjugate transpose and QR decomposition on the channel state information to obtain an upper right triangular matrix R and a matrix Q. The transceiver may be further configured to send the matrix Q to the second device, where in the first L rows of the matrix R, at least one row meets that plus or minus signs of elements on a corresponding diagonal are consistent in a subcarrier dimension, at least one row meets that plus or minus signs of elements on a corresponding diagonal are consistent in a sample dimension, L is a quantity of target paths between the first device and the second device, a sample is a plurality of pieces of channel state information obtained by performing a plurality of times of channel measurement in a time dimension, the sample dimension is a sample dimension corresponding to the plurality of pieces of channel state information, and the matrix Q indicates attribute information of the target path. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the first aspect or the possible designs of the first aspect.

For a specific implementation of the communication apparatus in the third aspect, refer to a behavior function of the first device in the communication method provided in any one of the first aspect or the possible designs of the first aspect.

According to a fourth aspect, an embodiment of this disclosure provides a communication method. The method includes a second device that sends a first frame for channel measurement to a first device, the second device receives a matrix Q from the first device, where the matrix Q is determined based on channel state information, the matrix Q indicates attribute information of a target path, and the target path is a path between the first device and the second device, and the second device performs target path sensing based on the matrix Q.

Based on the fourth aspect, the matrix Q fed back by the first device may reserve relative phase information between subcarriers and between pulses. In other words, the attribute information such as a delay, an AOD, or a Doppler shift of the target path may be reserved in the matrix Q. Therefore, the second device may determine the attribute information of the target path based on the matrix Q, to implement effective sensing on the target path based on a channel matrix diagonalization principle.

In a possible design, the matrix Q is a unitary matrix, or a matrix obtained by normalizing at least one column of the matrix Q is a unitary matrix.

In a possible design, a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers.

In a possible design, the attribute information of the target path includes one or more of the following: a delay of the target path, an AOD of the target path, or a Doppler shift of the target path.

Based on this possible design, the attribute information such as the delay, the AOD, and the Doppler shift of the target path may be reserved in the matrix Q, so that the second device can perform target path sensing based on the attribute information.

In a possible design, the second device determines a first location and a second location, where the first location is a location, in the matrix R, of an element that is in the first L rows of the matrix R and that meets that plus or minus signs of elements on a corresponding diagonal are consistent in a subcarrier dimension, the second location is a location, in the matrix R, of an element that is in the first L rows of the matrix R and that meets that plus or minus signs of elements on a corresponding diagonal are consistent in a sample dimension, and L is a quantity of target paths.

In a possible design, that the second device performs target path sensing based on the matrix Q includes one or more of the following. The second device selects, based on the first location, a column in which an element at the first location in the matrix Q is located, to perform angle sensing, the second device selects, based on the second location, a column in which an element at the second location in the matrix Q is located, to perform angle sensing, the second device selects, based on the first location, a column in which an element at the first location in the matrix Q is located, to perform Doppler shift sensing in a sample dimension, or the second device selects, based on the second location, a column in which an element at the second location in the matrix Q is located, to perform delay sensing in a subcarrier dimension.

Based on the foregoing two possible designs, the second device may implement angle sensing, Doppler shift sensing, and delay sensing based on the matrix Q and the first location and the second location. A plurality of feasible solutions is provided for the second device to perform target path sensing based on the matrix Q.

In a possible design, that the second device determines the first location and the second location includes the following. The second device receives information about the first location and information about the second location from the first device, or the first location and the second location are predefined, or the first location and the second location are defined by the second device.

In a possible design, before the second device receives the matrix Q from the first device, the second device sends information about the first location and information about the second location to the first device.

Based on the foregoing two possible designs, the first location and the second location may be specified by the first device, or may be specified in a protocol, or may be defined by the second device. When the first location and the second location are defined by the second device, the second device may further indicate the first location and the second location to the first device. A plurality of feasible solutions is provided for determining the first location and the second location.

In a possible design, before the second device sends the first frame to the first device, the second device receives first indication information from the first device, where the first indication information indicates whether the first device supports one or more of the following feedbacks: feedback of a compressed beamforming matrix based on subcarrier dimension consistency or feedback of a compressed beamforming matrix based on sample dimension consistency.

Based on this possible design, the first device may indicate, to the second device by using the first indication information, whether the first device supports one or more of the foregoing feedbacks. When the first device supports one or more of the foregoing feedbacks, the first device may feed back the compressed beamforming matrix to the second device by using the method provided in this embodiment of this disclosure.

In a possible design, the first indication information is located in one or more of the following fields: a sensing capability field of an association request frame, a core capabilities field of an EDMG sensing capability field, or an optional subelements field of an EDMG sensing capability field.

Based on the possible design, a plurality of feasible solutions is provided for designing the first indication information.

In a possible design, before the second device sends the first frame to the first device, the second device sends second indication information to the first device, where the second indication information indicates whether the second device supports one or more of the following feedbacks: feedback of a compressed beamforming matrix based on subcarrier dimension consistency or feedback of a compressed beamforming matrix based on sample dimension consistency.

Based on this possible design, the second device may indicate, to the first device by using the second indication information, whether the second device supports one or more of the foregoing feedbacks. When the second device supports one or more of the foregoing feedbacks, the second device may feed back the compressed beamforming matrix to the first device based on the function performed by the first device in the method provided in this embodiment of this disclosure, so that the first device performs target path sensing.

In a possible design, the second indication information is located in one or more of the following fields: a sensing capability field of an association response frame, a sensing capability field of a beacon frame, a core capabilities field of an EDMG sensing capability field, or an optional subelements field of an EDMG sensing capability field.

Based on the possible design, a plurality of feasible solutions is provided for designing the second indication information.

In a possible design, before the second device sends the first frame to the first device, the second device sends a sensing request frame to the first device, where the sensing request frame includes a feedback type indication, and the feedback type indication indicates to feed back channel state information for implementing sensing.

In a possible design, before the second device sends the first frame to the first device, the second device receives a sensing response frame from the first device, where the sensing response frame includes a feedback type indication, and the feedback type indication indicates to feed back channel state information for implementing sensing.

Based on the foregoing two possible designs, the first device and the second device may indicate, by using the sensing request frame or the sensing response frame, to feed back the channel state information for implementing sensing when the channel state information is fed back, to perform target path sensing based on the fed-back channel state information.

In a possible design, before the second device receives the matrix Q from the first device, the second device sends third indication information to the first device, where the third indication information indicates to use one or more of the following feedbacks: feedback of a compressed beamforming matrix based on subcarrier dimension consistency or feedback of a compressed beamforming matrix based on sample dimension consistency.

Based on this possible design, the second device may further indicate, by using the third indication information, the first device to use one or more of the foregoing feedbacks, so that the second device performs target path sensing based on the compressed beamforming matrix fed back by the first device.

In a possible design, the third indication information is located in one or more of the following frames: a sensing NDPA, a sensing trigger frame, or a BRP.

In a possible design, the third indication information is located in one or more of the following fields: a user information field of a sensing NDPA, a common information field of a sensing NDPA, a common information field of a sensing trigger frame, a user information field of a sensing trigger frame, or a reserved field of a BRP.

Based on the foregoing two possible designs, a plurality of feasible solutions is provided for designing the third indication information.

According to a fifth aspect, an embodiment of this disclosure provides a communication apparatus. The communication apparatus may implement a function performed by the second device in the fourth aspect or the possible designs of the fourth aspect, and the function may be implemented by hardware executing corresponding software. The hardware or the software includes one or more modules corresponding to the foregoing function, for example, a transceiver module and a processing module. The transceiver module is configured to send a first frame for channel measurement to a first device. The transceiver module is further configured to receive a matrix Q from the first device, where the matrix Q is determined based on channel state information, the matrix Q indicates attribute information of a target path, and the target path is a path between the first device and the second device. The processing module is configured to perform target path sensing based on the matrix Q.

In a possible design, the matrix Q is a unitary matrix, or a matrix obtained by normalizing at least one column of the matrix Q is a unitary matrix.

In a possible design, a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers.

In a possible design, the attribute information of the target path includes one or more of the following: a delay of the target path, an AOD of the target path, or a Doppler shift of the target path.

In a possible design, the processing module is further configured to determine a first location and a second location, where the first location is a location, in the matrix R, of an element that is in the first L rows of the matrix R and that meets that plus or minus signs of elements on a corresponding diagonal are consistent in a subcarrier dimension, the second location is a location, in the matrix R, of an element that is in the first L rows of the matrix R and that meets that plus or minus signs of elements on a corresponding diagonal are consistent in a sample dimension, and L is a quantity of target paths.

In a possible design, that the processing module performs target path sensing based on the matrix Q includes one or more of the following: selecting, based on the first location, a column in which an element at the first location in the matrix Q is located, to perform angle sensing, selecting, based on the second location, a column in which an element at the second location in the matrix Q is located, to perform angle sensing, selecting, based on the first location, a column in which an element at the first location in the matrix Q is located, to perform Doppler shift sensing in a sample dimension, or selecting, based on the second location, a column in which an element at the second location in the matrix Q is located, to perform delay sensing in a subcarrier dimension.

In a possible design, the transceiver module is further configured to receive information about the first location and information about the second location from the first device, or the first location and the second location are predefined, or the first location and the second location are defined by the second device.

In a possible design, before receiving the matrix Q from the first device, the transceiver module is further configured to send information about the first location and information about the second location to the first device.

In a possible design, before sending the first frame to the first device, the transceiver module is further configured to receive first indication information from the first device, where the first indication information indicates whether the first device supports one or more of the following feedbacks: feedback of a compressed beamforming matrix based on subcarrier dimension consistency or feedback of a compressed beamforming matrix based on sample dimension consistency.

In a possible design, the first indication information is located in one or more of the following fields: a sensing capability field of an association request frame, a core capabilities field of an EDMG sensing capability field, or an optional subelements field of an EDMG sensing capability field.

In a possible design, before sending the first frame to the first device, the transceiver module is further configured to send second indication information to the first device, where the second indication information indicates whether the second device supports one or more of the following feedbacks: feedback of a compressed beamforming matrix based on subcarrier dimension consistency or feedback of a compressed beamforming matrix based on sample dimension consistency.

In a possible design, the second indication information is located in one or more of the following fields: a sensing capability field of an association response frame, a sensing capability field of a beacon frame, a core capabilities field of an EDMG sensing capability field, or an optional subelements field of an EDMG sensing capability field.

In a possible design, before sending the first frame to the first device, the transceiver module is further configured to send a sensing request frame to the first device, where the sensing request frame includes a feedback type indication, and the feedback type indication indicates to feed back channel state information for implementing sensing.

In a possible design, before sending the first frame to the first device, the transceiver module is further configured to receive a sensing response frame from the first device, where the sensing response frame includes a feedback type indication, and the feedback type indication indicates to feed back channel state information for implementing sensing.

In a possible design, before receiving the matrix Q from the first device, the transceiver module is further configured to send third indication information to the first device, where the third indication information indicates to use one or more of the following feedbacks: feedback of a compressed beamforming matrix based on subcarrier dimension consistency or feedback of a compressed beamforming matrix based on sample dimension consistency.

In a possible design, the third indication information is located in one or more of the following frames: a sensing NDPA, a sensing trigger frame, or a BRP.

In a possible design, the third indication information is located in one or more of the following fields: a user information field of a sensing NDPA, a common information field of a sensing NDPA, a common information field of a sensing trigger frame, a user information field of a sensing trigger frame, or a reserved field of a BRP.

It should be noted that for a specific implementation of the communication apparatus in the fifth aspect, refer to a behavior function of the second device in the communication method provided in any one of the fourth aspect or the possible designs of the fourth aspect.

According to a sixth aspect, an embodiment of this disclosure provides a communication apparatus. The communication apparatus may be a chip or a system on chip in a second device. The communication apparatus may implement a function performed by the second device in the foregoing aspects or the possible designs, and the function may be implemented by hardware. In a possible design, the communication apparatus may include a transceiver and a processor. The transceiver and the processor may be configured to support the communication apparatus in implementing the function in any one of the fourth aspect or the possible designs of the fourth aspect. For example, the transceiver may be configured to send a first frame for channel measurement to a first device. The transceiver may be further configured to receive a matrix Q from the first device, where the matrix Q is determined based on channel state information, the matrix Q indicates attribute information of a target path, and the target path is a path between the first device and the second device. The processor may be configured to perform target path sensing based on the matrix Q. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the fourth aspect or the possible designs of the fourth aspect.

For a specific implementation of the communication apparatus in the sixth aspect, refer to a behavior function of the second device in the communication method provided in any one of the fourth aspect or the possible designs of the fourth aspect.

According to a seventh aspect, an embodiment of this disclosure provides a communication method. The method may include a first device that receives a first frame for channel measurement from a second device, the first device determines channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers, the first device performs conjugate transpose and QR decomposition on the channel state information to obtain an upper right triangular matrix R and a matrix Q, and the first device sends the matrix Q and first information to the second device, where the first information includes one or more of the following: a plus or minus sign of a first reference element or a plus or minus sign of a second reference element, the first reference element is any one of the first L elements on a diagonal of the matrix R, the second reference element is any one of the first L elements on the diagonal of the matrix R, the plus or minus sign of the first reference element indicates to rotate the matrix Q in a subcarrier dimension, the plus or minus sign of the second reference element indicates to rotate the matrix Q in a sample dimension, L is a quantity of target paths between the first device and the second device, a sample is a plurality of pieces of channel state information obtained by performing a plurality of times of channel measurement in a time dimension, and the sample dimension is a sample dimension corresponding to the plurality of pieces of channel state information.

Based on the seventh aspect, the first device may perform conjugate transpose and QR decomposition on the channel state information to obtain the matrix Q and the upper right triangular matrix R, and send the matrix Q and the first information to the second device, so that the second device rotates the matrix Q based on the first information. A rotated matrix Q may reserve relative phase information between subcarriers and between pulses. In other words, attribute information such as a delay, an AOD, or a Doppler shift of the target path may be reserved in the matrix Q. Therefore, the second device may perform target path sensing based on the rotated matrix Q.

In a possible design, the matrix Q is a unitary matrix, or a matrix obtained by normalizing at least one column of the matrix Q is a unitary matrix.

In a possible design, the first device determines a third location and a fourth location, where the third location is a location of the first reference element in the matrix R, and the fourth location is a location of the second reference element in the matrix R.

In a possible design, the first device receives information about the third location and information about the fourth location from the second device, or the third location and the fourth location are predefined, or the third location and the fourth location are defined by the first device.

In a possible design, the first device sends information about the third location and information about the fourth location to the second device.

Based on the foregoing three possible designs, the third location and the fourth location may be specified by the second device, or may be specified in a protocol, or may be defined by the first device. When the third location and the fourth location are defined by the first device, the first device may further indicate the third location and the fourth location to the second device. A plurality of feasible solutions is provided for determining the third location and the fourth location.

In a possible design, before the first device receives the first frame from the second device, the first device sends fourth indication information to the second device, where the fourth indication information indicates whether the first device supports feedback of a compressed beamforming matrix based on QR decomposition and the first information.

Based on this possible design, the first device may indicate, to the second device by using the fourth indication information, whether the first device supports feedback of the compressed beamforming matrix based on QR decomposition and the first information. When the first device supports feedback, the first device may feed back the compressed beamforming matrix and the first information to the second device by using the method provided in this embodiment of this disclosure.

In a possible design, the fourth indication information is located in one or more of the following fields: a sensing capability field of an association request frame, a core capabilities field of an EDMG sensing capability field, or an optional subelements field of an EDMG sensing capability field.

Based on the possible design, a plurality of feasible solutions is provided for designing the fourth indication information.

In a possible design, before the first device receives the first frame from the second device, the first device receives fifth indication information from the second device, where the fifth indication information indicates whether the second device supports feedback of the compressed beamforming matrix based on QR decomposition and the first information.

Based on this possible design, the second device may indicate, to the first device by using the fifth indication information, whether the second device supports feedback of the compressed beamforming matrix based on QR decomposition and the first information. When the second device supports feedback, the second device may feed back the compressed beamforming matrix and the first information to the first device based on the function performed by the first device in the method provided in this embodiment of this disclosure, so that the first device performs target path sensing.

In a possible design, the fifth indication information is located in one or more of the following fields: a sensing capability field of an association response frame, a sensing capability field of a beacon frame, a core capabilities field of an EDMG sensing capability field, or an optional subelements field of an EDMG sensing capability field.

Based on the possible design, a plurality of feasible solutions is provided for designing the fifth indication information.

In a possible design, before the first device receives the first frame from the second device, the first device receives a sensing request frame from the second device, where the sensing request frame includes a feedback type indication, and the feedback type indication indicates to feed back channel state information for implementing sensing.

In a possible design, before the first device receives the first frame from the second device, the first device sends a sensing response frame to the second device, where the sensing response frame includes a feedback type indication, and the feedback type indication indicates to feed back channel state information for implementing sensing.

Based on the foregoing two possible designs, the first device and the second device may indicate, by using the sensing request frame or the sensing response frame, to feed back the channel state information for implementing sensing when the channel state information is fed back, to perform target path sensing based on the fed-back channel state information.

In a possible design, before the first device sends the matrix Q to the second device, the first device receives sixth indication information from the second device, where the sixth indication information indicates to use feedback of the compressed beamforming matrix based on QR decomposition and the first information.

Based on this possible design, the first device may further use, based on the sixth indication information sent by the second device, feedback of the compressed beamforming matrix based on QR decomposition and the first information, so that the second device performs target path sensing based on the compressed beamforming matrix and the first information that are fed back by the first device.

In a possible design, the sixth indication information is located in one or more of the following frames: a sensing NDPA, a sensing trigger frame, or a BRP.

In a possible design, the sixth indication information is located in one or more of the following fields: a user information field of a sensing NDPA, a common information field of a sensing NDPA, a common information field of a sensing trigger frame, a user information field of a sensing trigger frame, or a reserved field of a BRP.

Based on the foregoing two possible designs, a plurality of feasible solutions is provided for designing the sixth indication information.

According to an eighth aspect, an embodiment of this disclosure provides a communication apparatus. The communication apparatus may implement a function performed by the first device in the seventh aspect or the possible designs of the seventh aspect, and the function may be implemented by hardware executing corresponding software. The hardware or the software includes one or more modules corresponding to the foregoing function, for example, a transceiver module and a processing module. The transceiver module is configured to receive a first frame for channel measurement from a second device. The processing module is configured to determine channel state information based on the first frame, where a dimension of the channel state information is $N_r \times N_t \times K$, $N_r$ is a quantity of antennas of the first device, M, is a quantity of antennas of the second device, K is a quantity of subcarriers that carry the first frame, and $N_r$, $N_t$, and K are all positive integers. The processing module is further configured to perform conjugate transpose and QR decomposition on the channel state information to obtain an upper right triangular matrix R and a matrix Q. The transceiver module is further configured to send the matrix Q and first information to the second device, where the first information includes one or more of the following: a plus or minus sign of a first reference element or a plus or minus sign of a second reference element, the first reference element is any one of the first L elements on a diagonal of the matrix R, the second reference element is any one of the first L elements on the diagonal of the matrix R, the plus or minus sign of the first reference element indicates to rotate the matrix Q in a subcarrier dimension, the plus or minus sign of the second reference element indicates to rotate the matrix Q in a sample dimension, L is a quantity of target paths between the first device and the second device, a sample is a plurality of pieces of channel state information obtained by performing a plurality of times of channel measurement in a time dimension, and the sample dimension is a sample dimension corresponding to the plurality of pieces of channel state information.

In a possible design, the matrix Q is a unitary matrix, or a matrix obtained by normalizing at least one column of the matrix Q is a unitary matrix.

In a possible design, the processing module is further configured to determine a third location and a fourth location, where the third location is a location of the first reference element in the matrix R, and the fourth location is a location of the second reference element in the matrix R.

In a possible design, the transceiver module is further configured to receive information about the third location and information about the fourth location from the second device, or the third location and the fourth location are predefined, or the third location and the fourth location are defined by the first device.

In a possible design, the transceiver module is further configured to send information about the third location and information about the fourth location to the second device.

In a possible design, before receiving the first frame from the second device, the transceiver module is further configured to send fourth indication information to the second device, where the fourth indication information indicates whether the first device supports feedback of a compressed beamforming matrix based on QR decomposition and the first information.

In a possible design, the fourth indication information is located in one or more of the following fields: a sensing capability field of an association request frame, a core capabilities field of an EDMG sensing capability field, or an optional subelements field of an EDMG sensing capability field.

In a possible design, before receiving the first frame from the second device, the transceiver module is further configured to receive fifth indication information from the second device, where the fifth indication information indicates whether the second device supports feedback of the compressed beamforming matrix based on QR decomposition and the first information.

In a possible design, the fifth indication information is located in one or more of the following fields: a sensing capability field of an association response frame, a sensing capability field of a beacon frame, a core capabilities field of an EDMG sensing capability field, or an optional subelements field of an EDMG sensing capability field.

In a possible design, before receiving the first frame from the second device, the transceiver module is further configured to receive a sensing request frame from the second device, where the sensing request frame includes a feedback type indication, and the feedback type indication indicates to feed back channel state information for implementing sensing.

In a possible design, before receiving the first frame from the second device, the transceiver module is further configured to send a sensing response frame to the second device, where the sensing response frame includes a feedback type indication, and the feedback type indication indicates to feed back channel state information for implementing sensing.

In a possible design, before sending the matrix Q to the second device, the transceiver module is further configured to receive sixth indication information from the second device, where the sixth indication information indicates to use feedback of the compressed beamforming matrix based on QR decomposition and the first information.

In a possible design, the sixth indication information is located in one or more of the following frames: a sensing NDPA, a sensing trigger frame, or a BRP.

In a possible design, the sixth indication information is located in one or more of the following fields: a user information field of a sensing NDPA, a common information field of a sensing NDPA, a common information field of a sensing trigger frame, a user information field of a sensing trigger frame, or a reserved field of a BRP.

It should be noted that for a specific implementation of the communication apparatus in the eighth aspect, refer to a behavior function of the first device in the communication method provided in any one of the seventh aspect or the possible designs of the seventh aspect.

According to a ninth aspect, an embodiment of this disclosure provides a communication apparatus. The communication apparatus may be a first device or a chip or a system on chip in a first device. The communication apparatus may implement a function performed by the first device in the foregoing aspects or the possible designs, and the function may be implemented by hardware. In a possible design, the communication apparatus may include a transceiver and a processor. The transceiver and the processor may be configured to support the communication apparatus in implementing the function in any one of the seventh aspect or the possible designs of the seventh aspect. For example, the transceiver may be configured to receive a first frame for channel measurement from a second device. The processor may be configured to determine channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers. The processing module is further configured to perform conjugate transpose and QR decomposition on the channel state information to obtain an upper right triangular matrix R and a matrix Q. The transceiver may be further configured to send the matrix Q and first information to the second device, where the first information includes one or more of the following: a plus or minus sign of a first reference element or a plus or minus sign of a second reference element, the first reference element is any one of the first L elements on a diagonal of the matrix R, the second reference element is any one of the first L elements on the diagonal of the matrix R, the plus or minus sign of the first reference element indicates to rotate the matrix Q in a subcarrier dimension, the plus or minus sign of the second reference element indicates to rotate the matrix Q in a sample dimension, L is a quantity of target paths between the first device and the second device, a sample is a plurality of pieces of channel state information obtained by performing a plurality of times of channel measurement in a time dimension, and the sample dimension is a sample dimension corresponding to the plurality of pieces of channel state information. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the seventh aspect or the possible designs of the seventh aspect.

For a specific implementation of the communication apparatus in the ninth aspect, refer to a behavior function of the first device in the communication method provided in any one of the seventh aspect or the possible designs of the seventh aspect.

According to a tenth aspect, an embodiment of this disclosure provides a communication method. The method may include a second device that sends a first frame for channel measurement to a first device, the second device receives a matrix Q and first information from the first device, where the matrix Q is determined based on channel state information, the first information includes one or more of the following: a plus or minus sign of a first reference element or a plus or minus sign of a second reference element, the plus or minus sign of the first reference element indicates to rotate the matrix Q in a subcarrier dimension, the plus or minus sign of the second reference element indicates to rotate the matrix Q in a sample dimension, a sample is a plurality of pieces of channel state information obtained by performing a plurality of times of channel measurement in a time dimension, and the sample dimension is a sample dimension corresponding to the plurality of pieces of channel state information, the second device rotates the matrix Q based on the first information to obtain a rotated matrix Q, where in the first L columns of the rotated matrix Q, plus or minus signs of column vectors corresponding to the first reference element are consistent in a subcarrier dimension, or plus or minus signs of column vectors corresponding to the second reference element are consistent in a sample dimension, L is a quantity of target paths between the first device and the second device, and the rotated matrix Q indicates attribute information of the target path, and the second device performs target path sensing based on the rotated matrix Q.

Based on the tenth aspect, the second device may rotate the matrix Q based on the first information. Because the rotated matrix Q may reserve relative phase information between subcarriers and between pulses, that is, the attribute information such as a delay, an AOD, or a Doppler shift of the target path may be reserved in the matrix Q, the second device may perform target path sensing based on the rotated matrix Q.

In a possible design, the matrix Q is a unitary matrix, or a matrix obtained by normalizing at least one column of the matrix Q is a unitary matrix.

In a possible design, a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers.

In a possible design, when the first information includes the plus or minus sign of the first reference element, the second device rotates the matrix Q based on the plus or minus sign of the first reference element in a subcarrier dimension to obtain the rotated matrix Q, where in the first L columns of the rotated matrix Q, the plus or minus signs of the column vectors corresponding to the first reference element are consistent in a subcarrier dimension. When the first information includes the plus or minus sign of the second reference element, the second device rotates the matrix Q based on the plus or minus sign of the second reference element in a sample dimension to obtain the rotated matrix Q, where in the first L columns of the rotated matrix Q, the plus or minus signs of the column vectors corresponding to the second reference element are consistent in a sample dimension.

Based on this possible design, a plurality of feasible solutions is provided for the second device to rotate the matrix Q based on the first information.

In a possible design, the attribute information of the target path includes one or more of the following: a delay of the target path, an AOD of the target path, or a Doppler shift of the target path.

Based on this possible design, the attribute information such as the delay, the AOD, and the Doppler shift of the target path may be reserved in the matrix Q, so that the second device can perform target path sensing based on the attribute information.

In a possible design, the second device determines a third location and a fourth location, where the third location is a location of the first reference element in the matrix R, and the fourth location is a location of the second reference element in the matrix R.

In a possible design, that the second device performs target path sensing based on the rotated matrix Q includes one or more of the following. The second device selects, based on the third location, a column in which an element at the third location in the matrix Q that is rotated based on the plus or minus sign of the first reference element in a subcarrier dimension is located, to perform angle sensing, the second device selects, based on the fourth location, a column in which an element at the fourth location in the matrix Q that is rotated based on the plus or minus sign of the second reference element in a sample dimension is located, to perform angle sensing, the second device selects, based on the third location, a column in which an element at the third location in the matrix Q that is rotated based on the plus or minus sign of the first reference element in a subcarrier dimension is located, to perform Doppler shift sensing in a sample dimension, and the second device selects, based on the fourth location, a column in which an element at the fourth location in the matrix Q that is rotated based on the plus or minus sign of the second reference element in a sample dimension is located, to perform delay sensing in a subcarrier dimension.

Based on the foregoing two possible designs, the second device may implement angle sensing, Doppler shift sensing, and delay sensing based on the matrix Q and the third location and the fourth location. A plurality of feasible solutions are provided for the second device to perform target path sensing based on the matrix Q.

In a possible design, the second device receives information about the third location and information about the fourth location from the first device, or the third location and the fourth location are predefined, or the third location and the fourth location are defined by the second device.

In a possible design, the second device sends information about the third location and information about the fourth location to the first device.

Based on the foregoing two possible designs, the third location and the fourth location may be specified by the first device, or may be specified in a protocol, or may be defined by the second device. When the third location and the fourth location are defined by the second device, the second device may further indicate the third location and the fourth location to the first device. A plurality of feasible solutions is provided for determining the third location and the fourth location.

In a possible design, before the second device sends the first frame to the first device, the second device receives fourth indication information from the first device, where the fourth indication information indicates whether the first device supports feedback of a compressed beamforming matrix based on QR decomposition and the first information.

Based on this possible design, the first device may indicate, to the second device by using the fourth indication information, whether the first device supports feedback of the compressed beamforming matrix based on QR decomposition and the first information. When the first device supports feedback, the first device may feed back the compressed beamforming matrix and the first information to the second device by using the method provided in this embodiment of this disclosure.

In a possible design, the fourth indication information is located in one or more of the following fields: a sensing capability field of an association request frame, a core capabilities field of an EDMG sensing capability field, or an optional subelements field of an EDMG sensing capability field.

Based on the possible design, a plurality of feasible solutions is provided for designing the fourth indication information.

In a possible design, before the second device sends the first frame to the first device, the second device sends fifth indication information to the first device, where the fifth indication information indicates whether the second device supports feedback of the compressed beamforming matrix based on QR decomposition and the first information.

Based on this possible design, the second device may indicate, to the first device by using the fifth indication information, whether the second device supports feedback of the compressed beamforming matrix based on QR decomposition and the first information. When the second device supports feedback, the second device may feed back the compressed beamforming matrix and the first information to the first device based on the function performed by the first device in the method provided in this embodiment of this disclosure, so that the first device performs target path sensing.

In a possible design, the fifth indication information is located in one or more of the following fields: a sensing capability field of an association response frame, a sensing capability field of a beacon frame, a core capabilities field of an EDMG sensing capability field, or an optional subelements field of an EDMG sensing capability field.

Based on the possible design, a plurality of feasible solutions is provided for designing the fifth indication information.

In a possible design, before the second device sends the first frame to the first device, the second device sends a sensing request frame to the first device, where the sensing request frame includes a feedback type indication, and the feedback type indication indicates to feed back channel state information for implementing sensing.

In a possible design, before the second device sends the first frame to the first device, the second device receives a sensing response frame from the first device, where the sensing response frame includes a feedback type indication, and the feedback type indication indicates to feed back channel state information for implementing sensing.

Based on the foregoing two possible designs, the first device and the second device may indicate, by using the sensing request frame or the sensing response frame, to feed back the channel state information for implementing sensing when the channel state information is fed back, to perform target path sensing based on the fed-back channel state information.

In a possible design, before the second device receives the matrix Q and the first information from the first device, the second device receives sixth indication information from the first device, where the sixth indication information indicates to use feedback of the compressed beamforming matrix based on QR decomposition and the first information.

Based on this possible design, the first device may further use, based on the sixth indication information sent by the second device, feedback of the compressed beamforming matrix based on QR decomposition and the first information, so that the second device performs target path sensing based on the compressed beamforming matrix and the first information that are fed back by the first device.

In a possible design, the sixth indication information is located in one or more of the following frames: a sensing NDPA, a sensing trigger frame, or a BRP.

In a possible design, the sixth indication information is located in one or more of the following fields: a user information field of a sensing NDPA, a common information field of a sensing NDPA, a common information field of a sensing trigger frame, a user information field of a sensing trigger frame, or a reserved field of a BRP.

Based on the foregoing two possible designs, a plurality of feasible solutions is provided for designing the sixth indication information.

According to an eleventh aspect, an embodiment of this disclosure provides a communication apparatus. The communication apparatus may implement a function performed by the second device in the tenth aspect or the possible designs of the tenth aspect, and the function may be implemented by hardware executing corresponding software. The hardware or the software includes one or more modules corresponding to the foregoing function, for example, a transceiver module and a processing module. The transceiver module is configured to send a first frame for channel measurement to a first device. The transceiver module is further configured to receive a matrix Q and first information from the first device, where the matrix Q is determined based on channel state information, the first information includes one or more of the following: a plus or minus sign of a first reference element or a plus or minus sign of a second reference element, the plus or minus sign of the first reference element indicates to rotate the matrix Q in a subcarrier dimension, the plus or minus sign of the second reference element indicates to rotate the matrix Q in a sample dimension, a sample is a plurality of pieces of channel state information obtained by performing a plurality of times of channel measurement in a time dimension, and the sample dimension is a sample dimension corresponding to the plurality of pieces of channel state information. The processing module is configured to rotate the matrix Q based on the first information to obtain a rotated matrix Q, where in the first L columns of the rotated matrix Q, plus or minus signs of column vectors corresponding to the first reference element are consistent in a subcarrier dimension, or plus or minus signs of column vectors corresponding to the second reference element are consistent in a sample dimension, L is a quantity of target paths between the first device and the second device, and the rotated matrix Q indicates attribute information of the target path. The processing module is further configured to perform target path sensing based on the rotated matrix Q.

In a possible design, the matrix Q is a unitary matrix, or a matrix obtained by normalizing at least one column of the matrix Q is a unitary matrix.

In a possible design, a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers.

In a possible design, when the first information includes the plus or minus sign of the first reference element, the processing module rotates the matrix Q based on the plus or minus sign of the first reference element in a subcarrier dimension to obtain the rotated matrix Q, where in the first L columns of the rotated matrix Q, the plus or minus signs of the column vectors corresponding to the first reference element are consistent in a subcarrier dimension. When the first information includes the plus or minus sign of the second reference element, the processing module rotates the matrix Q based on the plus or minus sign of the second reference element in a sample dimension to obtain the rotated matrix Q, where in the first L columns of the rotated matrix Q, the plus or minus signs of the column vectors corresponding to the second reference element are consistent in a sample dimension.

In a possible design, the attribute information of the target path includes one or more of the following: a delay of the target path, an AOD of the target path, or a Doppler shift of the target path.

In a possible design, the processing module is further configured to determine a third location and a fourth location, where the third location is a location of the first reference element in the matrix R, and the fourth location is a location of the second reference element in the matrix R.

In a possible design, that the processing module performs target path sensing based on the rotated matrix Q includes one or more of the following: selecting, based on the third location, a column in which an element at the third location in the matrix Q that is rotated based on the plus or minus sign of the first reference element in a subcarrier dimension is located, to perform angle sensing, selecting, based on the fourth location, a column in which an element at the fourth location in the matrix Q that is rotated based on the plus or minus sign of the second reference element in a sample dimension is located, to perform angle sensing, selecting, based on the third location, a column in which an element at the third location in the matrix Q that is rotated based on the plus or minus sign of the first reference element in a subcarrier dimension is located, to perform Doppler shift sensing in a sample dimension, and selecting, based on the fourth location, a column in which an element at the fourth location in the matrix Q that is rotated based on the plus or minus sign of the second reference element in a sample dimension is located, to perform delay sensing in a subcarrier dimension.

In a possible design, the transceiver module is further configured to receive information about the third location and information about the fourth location from the first device, or the third location and the fourth location are predefined, or the third location and the fourth location are defined by the second device.

In a possible design, the second device sends information about the third location and information about the fourth location to the first device.

In a possible design, before sending the first frame to the first device, the transceiver module further receives fourth indication information from the first device, where the fourth indication information indicates whether the first device supports feedback of a compressed beamforming matrix based on QR decomposition and the first information.

In a possible design, the fourth indication information is located in one or more of the following fields: a sensing capability field of an association request frame, a core capabilities field of an EDMG sensing capability field, or an optional subelements field of an EDMG sensing capability field.

In a possible design, before sending the first frame to the first device, the transceiver module further sends fifth indication information to the first device, where the fifth indication information indicates whether the second device supports feedback of the compressed beamforming matrix based on QR decomposition and the first information.

In a possible design, the fifth indication information is located in one or more of the following fields: a sensing capability field of an association response frame, a sensing capability field of a beacon frame, a core capabilities field of an EDMG sensing capability field, or an optional subelements field of an EDMG sensing capability field.

In a possible design, before sending the first frame to the first device, the transceiver module further sends a sensing request frame to the first device, where the sensing request frame includes a feedback type indication, and the feedback type indication indicates to feed back channel state information for implementing sensing.

In a possible design, before sending the first frame to the first device, the transceiver module further receives a sensing response frame from the first device, where the sensing response frame includes a feedback type indication, and the feedback type indication indicates to feed back channel state information for implementing sensing.

In a possible design, before receiving the matrix Q and the first information from the first device, the transceiver module further receives sixth indication information from the first device, where the sixth indication information indicates to use feedback of the compressed beamforming matrix based on QR decomposition and the first information.

In a possible design, the sixth indication information is located in one or more of the following frames: a sensing NDPA, a sensing trigger frame, or a BRP.

In a possible design, the sixth indication information is located in one or more of the following fields: a user information field of a sensing NDPA, a common information field of a sensing NDPA, a common information field of a sensing trigger frame, a user information field of a sensing trigger frame, or a reserved field of a BRP.

It should be noted that for a specific implementation of the communication apparatus in the eleventh aspect, refer to a behavior function of the second device in the communication method provided in any one of the tenth aspect or the possible designs of the tenth aspect.

According to a twelfth aspect, an embodiment of this disclosure provides a communication apparatus. The communication apparatus may be a chip or a system on chip in a second device. The communication apparatus may implement a function performed by the second device in the foregoing aspects or the possible designs, and the function may be implemented by hardware. In a possible design, the communication apparatus may include a transceiver and a processor. The transceiver and the processor may be configured to support the communication apparatus in implementing the function in any one of the tenth aspect or the possible designs of the tenth aspect. For example, the transceiver may be configured to send a first frame for channel measurement to a first device. The transceiver may be further configured to receive a matrix Q and first information from the first device, where the matrix Q is determined based on channel state information, the first information includes one or more of the following: a plus or minus sign of a first reference element or a plus or minus sign of a second reference element, the plus or minus sign of the first reference element indicates to rotate the matrix Q in a subcarrier dimension, the plus or minus sign of the second reference element indicates to rotate the matrix Q in a sample dimension, a sample is a plurality of pieces of channel state information obtained by performing a plurality of times of channel measurement in a time dimension, and the sample dimension is a sample dimension corresponding to the plurality of pieces of channel state information. The processor may be configured to rotate the matrix Q based on the first information to obtain a rotated matrix Q, where in the first L columns of the rotated matrix Q, plus or minus signs of column vectors corresponding to the first reference element are consistent in a subcarrier dimension, or plus or minus signs of column vectors corresponding to the second reference element are consistent in a sample dimension, L is a quantity of target paths between the first device and the second device, and the rotated matrix Q indicates attribute information of the target path. The processor may be further configured to perform target path sensing based on the rotated matrix Q. In another possible design, the communication apparatus may further include a memory. The memory is configured to store computer-executable instructions and data that are necessary for the communication apparatus. When the communication apparatus runs, the transceiver and the processor execute the computer-executable instructions stored in the memory, so that the communication apparatus performs the communication method in any one of the tenth aspect or the possible designs of the tenth aspect.

For a specific implementation of the communication apparatus in the twelfth aspect, refer to a behavior function of the second device in the communication method provided in any one of the tenth aspect or the possible designs of the tenth aspect.

According to a thirteenth aspect, a communication apparatus is provided. The communication apparatus includes one or more processors. The one or more processors are configured to run a computer program or instructions. When the one or more processors execute the computer instructions or the instructions, the communication apparatus is enabled to perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, or the communication method according to any one of the tenth aspect or the possible designs of the tenth aspect.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In this embodiment of this disclosure, the processor and the memory may alternatively be integrated into one component. In other words, the processor and the memory may alternatively be integrated together. In a possible implementation, the communication apparatus further includes a transceiver. The transceiver is configured to receive information and/or send information.

In a possible design, the communication apparatus further includes one or more communication interfaces, the one or more communication interfaces are coupled to the one or more processors, and the one or more communication interfaces are configured to communicate with a module other than the communication apparatus.

According to a fourteenth aspect, a communication apparatus is provided. The communication apparatus includes an input/output interface and a logic circuit. The input/output interface is configured to input and/or output information. The logic circuit is configured to perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, or the communication method according to any one of the tenth aspect or the possible designs of the tenth aspect, and process and/or generate information based on the information.

According to a fifteenth aspect, a computer-readable storage medium is provided. The computer-readable storage medium stores computer instructions or a program. When the computer instructions or the program is run on a computer, the computer is enabled to perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, or the communication method according to any one of the tenth aspect or the possible designs of the tenth aspect.

According to a sixteenth aspect, a computer program product including computer instructions is provided. When the computer program product runs on a computer, the computer is enabled to perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, or the communication method according to any one of the tenth aspect or the possible designs of the tenth aspect.

According to a seventeenth aspect, an embodiment of this disclosure provides a computer program. When the computer program is run on a computer, the computer is enabled to perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, or the communication method according to any one of the tenth aspect or the possible designs of the tenth aspect.

For technical effects brought by any design in the thirteenth aspect to the seventeenth aspect, refer to technical effects brought by any possible design of the first aspect, technical effects brought by any possible design of the fourth aspect, technical effects brought by any possible design of the seventh aspect, or technical effects brought by any possible design of the tenth aspect.

According to an eighteenth aspect, a communication system is provided. The communication system includes the communication apparatus according to any one of the second aspect to the third aspect and the communication apparatus according to any one of the fifth aspect to the sixth aspect, or includes the communication apparatus according to any one of the eighth aspect to the ninth aspect and the communication apparatus according to any one of the eleventh aspect to the twelfth aspect.

BRIEF DESCRIPTION OF DRAWINGS

FIG. 16 is a diagram of a frame structure of a High Efficiency (HE) common information field according to an embodiment of this disclosure;

FIG. 18 is a diagram of a frame structure of a BRP request element field according to an embodiment of this disclosure;

DESCRIPTION OF EMBODIMENTS

Before embodiments of this disclosure are described, technical terms used in embodiments of this disclosure are described.

1. WLAN Sensing:

WLAN sensing is a technology in which wireless signals are used to sense a target. The target may be an object in a surrounding environment, for example, a person or an object. Based on a capability of radio measurement or environment sampling, WLAN sensing can provide an opportunity for each communication path between two physical devices to extract information about their surroundings.

2. WLAN Standards:

The WLAN standards may include the Institute of Electrical and Electronics Engineers (IEEE) 802.11 series standards. The IEEE 802.11 series standards may include mainstream standards related to low frequency bands (for example, 2.4 gigahertz (GHz), 5 GHZ, and 6 GHz) (for example, 802.11n, 802.11ac, 802.11ax, 802.11be, and the like) and standards related to high frequency bands (for example, 60 GHz) (for example, 802.11ad/directional multi-gigabit (DMG), 802.11ay/EDMG).

WLAN sensing may be performed based on the WLAN standards. A high-frequency signal (60 GHz) has a short wavelength, is sensitive to a moving object, and has a large transmission bandwidth, a high distance resolution, and a good sensing advantage.

3. Beamforming:

Beamforming is derived from a concept of an adaptive antenna. A receiving device may weight and combine signals received by a multi-antenna array element to form a required ideal signal. If a beamforming technology is used, a multi-antenna system needs to be used. For example, a multiple-input multiple-output (MIMO) system may use a plurality of receive antennas, and may also use a plurality of transmit antennas. Because a plurality of groups of antennas are used, a same spatial stream corresponding to a radio signal from a sending device to the receiving device may be transmitted by using a plurality of paths. The receiving device may process, by using a specific algorithm, signals received by using a plurality of receiving antennas, to increase a signal-to-noise ratio.

Based on the foregoing description of beamforming, the sending device may send a probe signal, for example, a null data packet (NDP), to the receiving device. The receiving device may perform channel measurement (or channel estimation) based on the received probe signal, to obtain channel state information. The receiving device may further feed back the channel state information to the sending device. The sending device may generate a steering matrix based on the received channel state information, to improve communication performance.

The probe signal may alternatively be a frame for indicating to perform channel measurement.

Figure 1:
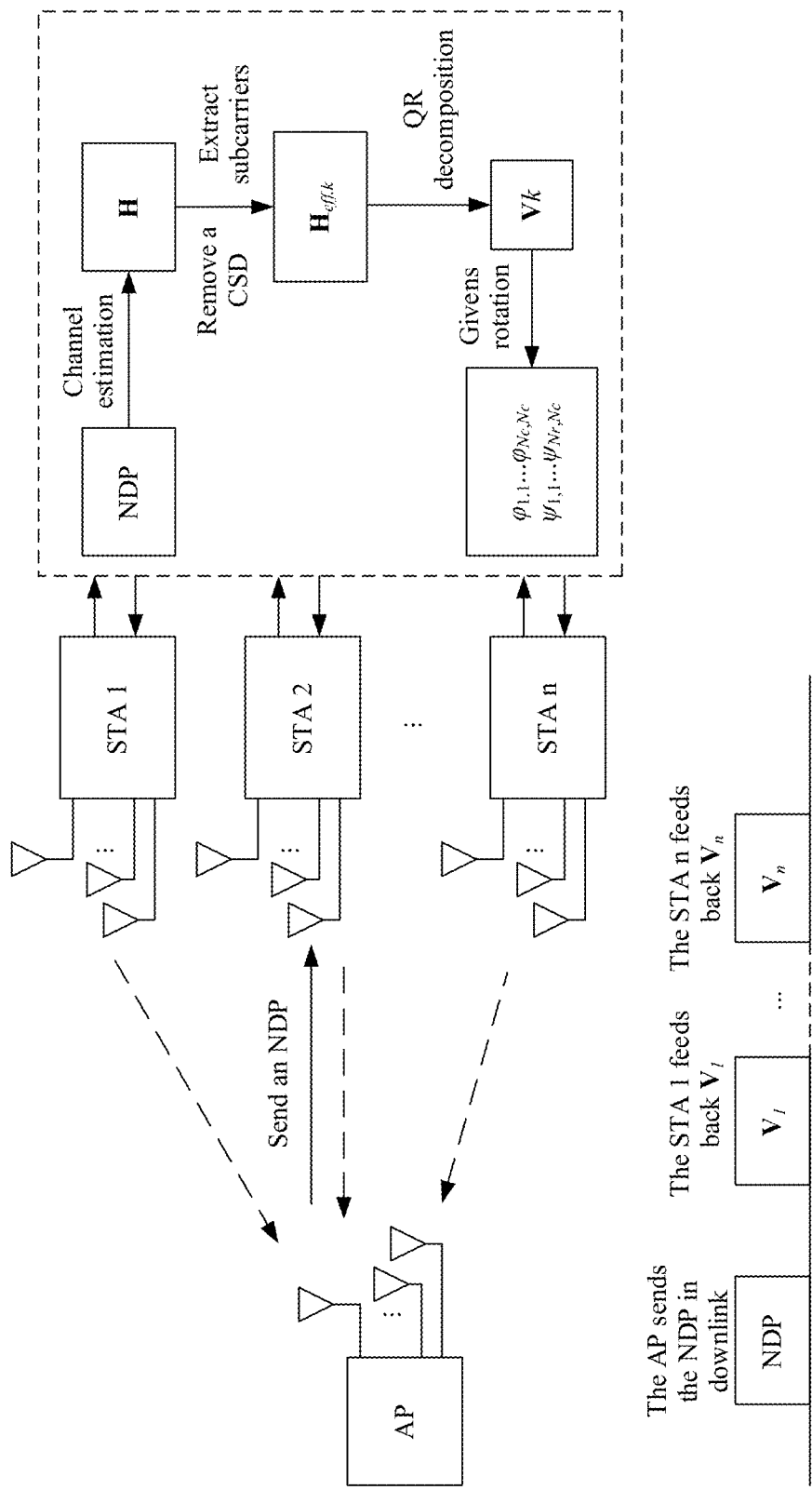
FIG. 1 is a diagram of a channel measurement and feedback process according to an embodiment of this disclosure.

For example, as shown in FIG. 1, the sending device (for example, an access point (AP)) may generate an NDP including a preamble, obtain a baseband digital signal after inverse fast Fourier transform (IFFT) modulation of an orthogonal frequency-division multiplexing (OFDM) signal, perform digital-to-analog conversion and up-conversion modulation on the baseband digital signal to obtain a radio frequency signal, and send the radio frequency signal to the receiving device (for example, a station (STA)) through an air interface. The receiving device (for example, the STA) may perform down-conversion, sampling, and OFDM demodulation to obtain the NDP sent by the sending device, and perform channel measurement based on the NDP to obtain the channel state information.

The NDP may include training sequences such as a short training field (STF) and a long training field (LTF), and these training sequences may be known fixed symbols.

A manner in which the receiving device feeds back the channel state information to the sending device may include an implicit feedback and an explicit feedback. The implicit feedback means that the receiving device does not feed back specific information of the channel state information, but feeds back a response data packet to the sending device, and the sending device estimates the specific information of the channel state information based on the received response data packet. The explicit feedback means that the receiving device performs channel measurement, generates specific information of the channel state information, and feeds back the specific information to the sending device. The specific information of the channel state information may include an effective channel matrix of each subcarrier that carries the probe signal.

The explicit feedback is used as a mainstream feedback manner, and the explicit feedback may be classified into the following three feedback manners based on different feedback content in the explicit feedback.

(1) Feedback of Original Channel State Information.

For example, the receiving device may feed back, to the sending device, the channel state information obtained after the receiving device performs channel measurement. The channel state information obtained after the receiving device performs channel measurement may also be described as original channel state information.

For example, as shown in FIG. 1, the receiving device (for example, the STA) may perform channel measurement based on the NDP sent by the sending device (for example, the AP), to obtain the channel state information, that is, a matrix H shown in FIG. 1. The receiving device may feed back the matrix H to the sending device.

A dimension of the matrix H may be a quantity of antennas of the receiving device×a quantity of antennas of the sending device×a quantity of subcarriers that carry the NDP. The matrix H may include effective channel matrices of the subcarriers that carry the NDP.

In another example, the receiving device may alternatively remove a cyclic shift delay (CSD) based on the channel state information obtained through channel measurement, extract effective channel matrices of some subcarriers, and feed back the extracted effective channel matrices of some subcarriers to the sending device, to reduce feedback overheads.

For example, as shown in FIG. 1, the receiving device may extract the effective channel matrices of some subcarriers from the matrix H, for example, extract a matrix $H_{eff,k}$. The receiving device may feed back the matrix $H_{eff,k}$ to the sending device.

k indicates a $k^{th}$ subcarrier, and the matrix $H_{eff,k}$ indicates an effective channel matrix of the $k^{th}$ subcarrier.

(2) Feedback of an Uncompressed Beamforming Matrix.

The receiving device may alternatively perform QR decomposition on an effective channel matrix of a subcarrier to obtain a beamforming matrix of the subcarrier, and feed back the beamforming matrix of the subcarrier to the sending device.

For example, as shown in FIG. 1, the effective channel matrix of the subcarrier is a matrix $H_{eff,k}$ of a $k^{th}$ subcarrier. The receiving device may perform QR decomposition on the matrix $H_{eff,k}$ to obtain a beamforming matrix $V_k$ of the $k^{th}$ subcarrier. The receiving device may feed back the beamforming matrix $V_k$ of the $k^{th}$ subcarrier to the sending device.

It should be noted that for specific descriptions of performing QR decomposition on the matrix $H_{eff,k}$ to obtain $V_k$, refer to the following descriptions of "4. QR decomposition". Details are not described herein again.

In addition, when feeding back the beamforming matrix of the subcarrier to the sending device, the receiving device may perform quantization encoding on the beamforming matrix of the subcarrier in an order of an imaginary part and a real part, to form an explicit feedback data frame, and feed back the data frame to the sending device.

For example, the 802.11 standard is the 802.11n standard, the receiving device is the STA, and a bandwidth is 20 megahertz (MHz). Refer to the following Table 1. Quantization encoding is performed on the beamforming matrix of the subcarrier in an order of an imaginary part and a real part, to form the explicit feedback data frame, where $N_b$ indicates a quantity of quantization bits of the real part and the imaginary part, $N_c$ indicates a quantity of columns of the beamforming matrix, and $N_r$ indicates a quantity of rows of the beamforming matrix.

TABLE 1

| Field | Size (bits) | Meaning |
|---|---|---|
| Signal-to-noise ratio (SNR) of a first space-time stream | 8 | Average signal-to-noise ratio of a space-time stream 1 report sent by the STA |
| ... | ... | ... |
| SNR of an $Nc^{th}$ space-time stream | 8 | Average signal-to-noise ratio in a space-time stream Nc report sent by the STA |
| Beamforming matrix of a subcarrier −28 | $2 \times N_b \times N_c \times N_r$ | Beamforming matrix V |
| ... | ... | ... |
| Beamforming matrix of a subcarrier −1 | $2 \times N_b \times N_c \times N_r$ | Beamforming matrix V |
| Beamforming matrix of a subcarrier 1 | $2 \times N_b \times N_c \times N_r$ | Beamforming matrix V |
| ... | ... | ... |
| Beamforming matrix of a subcarrier 28 | $2 \times N_b \times N_c \times N_r$ | Beamforming matrix V |

(3) Feedback of an Angle Value Obtained Through After-Compression Givens Rotation.

The receiving device may alternatively perform Givens rotation on a beamforming matrix of a subcarrier to obtain the angle value corresponding to the subcarrier, and compress the beamforming matrix of the subcarrier, to reduce feedback overheads.

For example, as shown in FIG. 1, the beamforming matrix of the subcarrier is a matrix $V_k$ of a $k^{th}$ subcarrier. The receiving device may perform Givens rotation on $V_k$ to obtain an angle value $\phi$ and an angle value $\psi$ that correspond to the $k^{th}$ subcarrier. The receiving device may feed back, to the sending device, the angle value $\phi$ and the angle value $\psi$ that correspond to the $k^{th}$ subcarrier.

The angle value $\phi$ may be $\phi_{1,1}, \ldots,$ or $\phi_{Nc,Nc}$. The angle value $\psi$ may be $\psi_{1,1}, \ldots,$ Or $\psi_{Nr,Nc}$. $N_r$ indicates a quantity of rows of the matrix $V_k$. $N_c$ indicates a quantity of columns of the matrix $V_k$.

It should be noted that for a specific process of performing Givens rotation on the beamforming matrix of the subcarrier to obtain the angle value corresponding to the subcarrier, refer to the following descriptions of "5. Givens rotation". Details are not described herein again.

In addition, when feeding back the compressed beamforming matrix of the subcarrier to the sending device, the receiving device may quantize the angle value $\phi$ and the angle value $\psi$ that are obtained through compression, to form an explicit feedback data frame, and feed back the data frame to the sending device.

For example, the 802.11 standard is the 802.11n standard, the receiving device is the STA, and the bandwidth is 20 MHz. Refer to the following Table 2. The angle value $\phi$ and the angle value $\psi$ that are obtained through compression are quantized, to form the explicit feedback data frame, where $b_\phi$ indicates a quantity of bits of quantized $\phi$, $b_\psi$ indicates a quantity of bits of quantized $\psi$, and $N_a$ is a quantity of total angle values in Givens rotation.

TABLE 2

| Field | Size (bits) | Meaning |
|---|---|---|
| SNR of a first space-time stream | 8 | Average signal-to-noise ratio of a space-time stream 1 report sent by the STA |
| ... | ... | ... |
| SNR of an $Nc^{th}$ space-time stream | 8 | Average signal-to-noise ratio in a space-time stream Nc report sent by the STA |
| Compressed beamforming matrix of a subcarrier −28 | $N_a \times (b_\phi + b_\psi)/2$ | Compressed beamforming matrix |
| ... | ... | ... |
| Compressed beamforming matrix of a subcarrier −1 | $N_a \times (b_\phi + b_\psi)/2$ | Compressed beamforming matrix |
| Compressed beamforming matrix of a subcarrier 1 | $N_a \times (b_\phi + b_\psi)/2$ | Compressed beamforming matrix |
| ... | ... | ... |
| Compressed beamforming matrix of a subcarrier 28 | $N_a \times (b_\phi + b_\psi)/2$ | Compressed beamforming matrix |

4. QR Decomposition:

The receiving device may decompose an equivalent channel matrix of a subcarrier by using the following solution 1, to obtain a beamforming matrix of the subcarrier. Alternatively, the receiving device may decompose a conjugate transpose matrix of an equivalent channel matrix of a subcarrier by using the following solution 2, to obtain a beamforming matrix of the subcarrier.

The following describes solution 1 and solution 2 by using an example in which QR decomposition is performed on a matrix $H_{eff,k}$ of a $k^{th}$ subcarrier to obtain a matrix $V_k$.

(1) Solution 1:

After obtaining the channel state information through measurement, the receiving device may perform QR decomposition on the matrix $H_{eff,k}$ of the $k^{th}$ subcarrier, to obtain the following formula (1.1):

$$H_{eff,k} = H_k Q_{mapping,k} = Q_k R_k \quad (1.1)$$

In formula (1.1), $Q_{mapping,k}$ is an orthogonal spatial stream mapping matrix, and is an identity matrix by default during channel listening. $H_{eff,k} = H_k Q_{mapping,k} = H_k$. $Q_k$ is a unitary matrix. $R_k$ is an upper right triangular matrix. In the presence of an upper right triangular matrix $A_k$, $R_k$ is diagonalized. That is, $A_k$ is a matrix that diagonalizes $R_k$. $R_k A_k = \Sigma_k$ is satisfied. $R_k$ is a beamforming matrix $V_k$ to be fed back to the sending device.

For the $k^{th}$ subcarrier, the sending device may construct, based on $V_k$ fed back by the receiving device, a steering matrix shown in the following formula (1.2):

$$Q_{steer,k} = Q_{mapping,k} A_k \quad (1.2)$$
$$= A_k$$

The sending device may modulate a to-be-sent signal based on the steering matrix shown in formula (1.2), to obtain a modulated to-be-sent signal shown in the following formula (1.3):

$$s = A_k s' \quad (1.3)$$

In formula (1.3), s' indicates the to-be-sent signal. The to-be-sent signal may be any signal to be sent by the sending device to the receiving device.

The sending device may precode the to-be-sent signal, and send a precoded signal to the receiving device through a channel. A signal received by the receiving device through the channel may be shown in the following formula (1.4):

$$r = Q_k R_k A_k s' + n = Q_k \sum_k s' + n \qquad (1.4)$$

In formula (1.4), n indicates noise.

The receiving device may left-multiply the received signal by a matrix $Q_k^H$ to obtain a result shown in the following formula (1.5):

$$Q_k^H r = Q_k^H Q_k \sum_k s' + Q_k^H n \qquad (1.5)$$

It is assumed that:

$$r' = Q_k^H r, \; n' = Q_k^H n \qquad (1.6)$$

In this case, $$r' = \sum s' + n' \qquad (1.7)$$

(2) Solution 2:

After obtaining the channel state information through measurement, the receiving device may perform conjugate transpose on the $H_{eff,k}$ of the 4th subcarrier to obtain $H_{eff,k}^H$, and perform QR decomposition on $H_{eff,k}^H$ to obtain the following formula (1.8):

$$H_{eff,k}^H = (H_k Q_{mapping,k})^H = Q_k R_k \qquad (1.8)$$

In formula (1.8), $Q_{mapping,k}$ is an orthogonal spatial stream mapping matrix, and is an identity matrix by default during channel listening. $H_{eff,k} = H_k Q_{mapping,k} = H_k$. $Q_k$ is a unitary matrix, and is a beamforming matrix $V_k$ to be fed back to the sending device. $R_k$ is an upper right triangular matrix. In the presence of an upper right triangular matrix $A_k$, $R_k$ is diagonalized. That is, $A_k$ is a matrix that diagonalizes $R_k$. $R_k A_k = \Sigma_k$ is satisfied.

For the $k^{th}$ subcarrier, the sending device may construct, based on $V_k$ fed back by the receiving device, a steering matrix shown in the following formula (1.9):

$$Q_{steer,k} = Q_{mapping,k} Q_k \qquad (1.9)$$
$$= Q_k$$

The sending device may modulate a to-be-sent signal based on the steering matrix shown in formula (1.9), to obtain a modulated to-be-sent signal shown in the following formula (1.10):

$$s = Q_k s' \qquad (1.10)$$

In formula (1.10), s' indicates the to-be-sent signal. The to-be-sent signal may be any signal to be sent by the sending device to the receiving device.

The sending device may precode the to-be-sent signal, and send a precoded signal to the receiving device through a channel. A signal received by the receiving device through the channel may be shown in the following formula (1.11):

$$r = R_k^H Q_k^H Q_k s' + n = R_k^H s' + n' \qquad (1.11)$$

In formula (1.11), n' indicates noise.

In this case, a signal of an $i^{th}$ data stream received by the receiving device may be shown in the following formula (1.12):

$$r_i = \phi_{ii}^H s_i' + \sum_{j>i} \phi_{ij}^H s_j' + n_i' \qquad (1.12)$$

The receiving device decodes the received signal from top to bottom according to the following formula (1.13) to complete continuous interference cancellation:

$$\hat{r}_i = r_i - \sum_{j>i} \phi_{ij}^H s_j = \phi_{ii}^H s_i + n_i' \qquad (1.13)$$

The process of obtaining the beamforming matrix through QR decomposition shown in the foregoing solution 1 and solution 2 is essentially a process of implementing zero-forcing reception. $\Sigma$ in formula (1.7) is a diagonal matrix. Continuous interference cancellation can also be completed according to formula (1.13). This means that a transformed MIMO system is equivalent to multiple parallel channels that do not interfere with each other.

5. Givens Rotation:

The receiving device may compress a beamforming matrix of a subcarrier through Givens rotation to obtain a series of an angle value $\phi$ and an angle value $\psi$, and send, to the sending device, the angle value $\phi$ and the angle value $\psi$ that are obtained through compression, to implement compression feedback and reduce feedback overheads. The sending device may reconstruct the beamforming matrix based on the received angle value, and complete MIMO precoding by using the beamforming matrix.

For example, a dimension of the beamforming matrix is $N_r \times N_c$. The beamforming matrix based on Givens rotation may be shown in the following formula (1.14):

$$V = \left[ \prod_{i=1}^{min(N_c, N_r-1)} \left[ D_i \left( 1_{i-1} e^{j\phi_{i,i}} \; \ldots \; e^{j\phi_{N_r-1,i}} 1 \right) \prod_{l=i+1}^{N_r} G_{li}^T(\psi_{li}) \right] \right] I_{N_r \times N_c} \qquad (1.14)$$

In formula (1.14), V may be a beamforming matrix of any subcarrier. That is, Givens rotation may be performed on a beamforming matrix of each subcarrier. $N_r$ indicates a quantity of rows of V. Nc indicates a quantity of columns of V. As shown in the following formula (1.15), $$D_i(1_{i-1} e^{j\phi_{i,i}} \ldots e^{j\phi_{N_r-1,i}} 1)$$

is a diagonal matrix of $N_r \times N_r$, and $1_{i-1}$ indicates a sequence 1 whose length is i–1. As shown in the following formula (1.16), $G_{li}(\psi)$ indicates a Givens rotation matrix. As shown in the following formula (1.17), $\tilde{I}_{N_r \times N_c}$ indicates a generalized identity matrix:

$$D_i(1_{i-1} e^{j\phi_{i,i}} \ldots e^{j\phi_{N_r-1,i}} 1) = \begin{bmatrix} I_{i-1} & 0 & 0 & \ldots & 0 \\ 0 & e^{j\phi_{i,i}} & 0 & \ldots & 0 \\ 0 & 0 & \ddots & \ldots & 0 \\ \vdots & \vdots & \vdots & e^{j\phi_{N_r-1,i}} & 0 \\ 0 & 0 & 0 & 0 & 1 \end{bmatrix} \quad (1.15)$$

$$G_{li}(\psi) = \begin{bmatrix} I_{i-1} & 0 & 0 & 0 & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_r-l} \end{bmatrix} \quad (1.16)$$

$$\tilde{I}_{N_r \times N_c} = \begin{bmatrix} 1 & 0 & \ldots & 0 \\ 0 & 1 & \ldots & 0 \\ \vdots & \vdots & \ddots & 0 \\ 0 & 0 & \ldots & 1 \\ 0 & 0 & \ldots & 0 \end{bmatrix} \quad (1.17)$$

The receiving device may determine an angle value $\phi$ and an angle value $\psi$ according to the foregoing formulas, and send, to the sending device, the angle value $\phi$ and the angle value $\psi$ that are obtained through compression, to implement compression feedback and reduce feedback overheads.

When the receiving device performs QR decomposition on the channel state information, relative phase information between subcarriers and between pulses cannot be reserved in the decomposed channel state information by using an existing QR decomposition rule. As a result, the sending device cannot extract attribute information of a target based on the reconstructed channel state information, and cannot implement effective sensing on the target.

The pulse may also be described as a sample. The attribute information of the target may include information such as a target delay, a target angle, and a target Doppler shift. The target delay may be used to determine a distance of the target. The delay may also be described as a propagation delay. This is not limited in this disclosure. The target angle may be used to determine a direction of the target. The target Doppler shift may be used to determine a speed of the target, and the like.

In conclusion, when the receiving device feeds back the channel state information to the sending device, how to reserve relative phase information between subcarriers and between pulses while reducing feedback overheads to implement effective sensing on a target becomes a technical problem urgent to be resolved.

To resolve the foregoing technical problem, an embodiment of this disclosure provides a communication method. The method may include the following. A first device receives a first frame for channel measurement from a second device, the first device determines channel state information based on the first frame, where a dimension of the channel state information is $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers, and the first device performs conjugate transpose and QR decomposition on the channel state information to obtain an upper right triangular matrix R and a matrix Q, and the first device sends the matrix Q to the second device, where in the first L rows of the matrix R, at least one row meets that plus or minus signs of elements on a corresponding diagonal are consistent in a subcarrier dimension, at least one row meets that plus or minus signs of elements on a corresponding diagonal are consistent in a sample dimension, L is a quantity of target paths between the first device and the second device, a sample is a plurality of pieces of channel state information obtained by performing a plurality of times of channel measurement in a time dimension, the sample dimension is a sample dimension corresponding to the plurality of pieces of channel state information, and the matrix Q indicates attribute information of the target path.

In this embodiment of this disclosure, the first device may perform conjugate transpose and QR decomposition on the channel state information to obtain the matrix Q and the matrix R, and the first device may send the matrix Q to the second device. In the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension. Correspondingly, the matrix Q obtained through QR decomposition of the matrix R may indicate attribute information of the target path. The second device may determine the attribute information of the target path based on the matrix Q, to implement effective sensing on the target path.

The following describes implementations of embodiments of this disclosure in detail with reference to the accompanying drawings in this specification.

The communication method provided in embodiments of this disclosure may be applied to any communication system. The communication system may be a system using the 802.11 series standards. For example, the 802.11 series standards include but are not limited to mainstream standards (for example, 802.11n, 802.11ac, 802.11ax, 802.11be, and the like) related to low frequency bands (for example, 2.4 GHz and 5 GHZ) and standards (for example, 802.11ad/DMG and 802.11ay/EDMG) related to high frequency bands (for example, 60 GHz) in the IEEE 802.11 series standards and future WLAN standards.

The communication method provided in embodiments of this disclosure may be further applied to a cellular communication system, for example, a Long-Term Evolution (LTE) system, may also be applied to a New Radio (NR) system in a 5th generation (5G) communication system or an NR vehicle-to-everything (V2X) system, may be further applied to an LTE and 5G hybrid networking system, or a device-to-device (D2D) communication system, a machine-to-machine (M2M) communication system, an Internet of things (IoT), a narrow band IoT (NB-IoT), a frequency-division duplex (FDD) system, a time-division duplex (TDD) system, a satellite communication system, a wireless projection communication system, an integrated access and backhaul communication system, another next-generation communication system (for example, a sixth generation (6G) communication system), and the like. This is not limited in this disclosure.

The communication method provided in embodiments of this disclosure may be applied to one or more of the following communication scenarios: a communication scenario in which the first device communicates with the second device, a communication scenario in which the first device communicates with the first device, and a communication scenario in which the second device communicates with the second device. In embodiments of this disclosure, the communication method provided in embodiments of this disclosure is mainly described by using the communication scenario in which the first device communicates with the second device as an example. For a communication method in another scenario, refer to the communication scenario in which the first device communicates with the second device.

Figure 2:
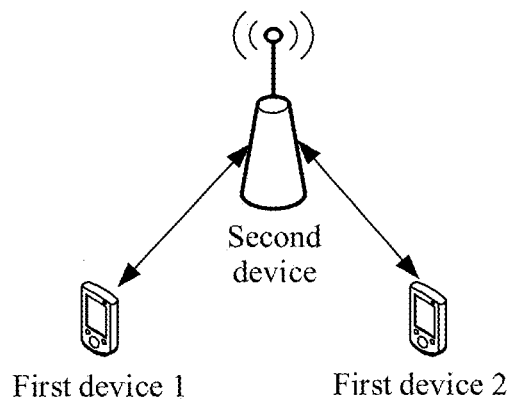
FIG. 2 is a diagram of a communication system according to an embodiment of this disclosure.

For example, the communication system is a communication system using the 802.11 series standards. FIG. 2 is a diagram of a communication system according to an embodiment of this disclosure. As shown in FIG. 2, the communication system may include at least one first device and at least one second device.

The second device may be an access point device, and the first device may be a station device.

The access point device may be an AP, or may be a chip or a processing system installed in an AP. The station device may be a STA, or may be a chip or a processing system installed in a STA.

For example, the AP may be a device that supports a plurality of WLAN standards such as the 802.11 series standards or the next-generation 802.11 standard.

The AP is an apparatus having a wireless communication function, supports communication by using a WLAN protocol, has a function of communicating with another device (for example, a station or another access point) in a WLAN network, and certainly may further have a function of communicating with another device. In a WLAN communication system, the access point may also be referred to as an AP STA. The apparatus having a wireless communication function may be an entire device, or may be a chip, a processing system, or the like installed in an entire device, or the like. The device in which the chip or the processing system is installed may implement the method and the function in embodiments of this disclosure under control of the chip or the processing system. The AP in embodiments of this disclosure is an apparatus that provides a service for the STA, and may support the 802.11 series protocols.

For example, the AP may be a communication entity, for example, a communication server, a router, a switch, or a bridge. The AP may alternatively be a macro base station, a micro base station, a relay station, or the like in various forms. The AP may alternatively be a chip and a processing system in these various forms of devices. The AP may alternatively be a terminal device or a network device with a WI-FI chip. The AP may alternatively be an access point for a mobile user to enter a wired network, and is mainly deployed in a home, inside a building, and inside a park. A typical coverage radius is tens of meters to 100-odd meters. Certainly, the AP may alternatively be deployed outdoors. The AP is equivalent to a bridge that connects a wired network and a wireless network, and has a main function of connecting various wireless network clients together and then connecting the wireless network to the Ethernet.

For example, the STA may be a device that supports a plurality of WLAN standards such as the 802.11 series standards or the next-generation 802.11 standard.

The STA is an apparatus having a wireless communication function, supports communication by using a WLAN protocol, and has a capability of communicating with another station or an access point in the WLAN network. In the WLAN system, the station may be referred to as a non-AP STA. The STA is any user communication device that allows a user to communicate with the AP and further communicate with the WLAN. The apparatus having a wireless communication function may be an entire device, or may be a chip, a processing system, or the like installed in an entire device. The device in which the chip or the processing system is installed may implement the method and the function in embodiments of this disclosure under control of the chip or the processing system.

For example, the STA may be user equipment that can be connected to the Internet, such as a tablet computer, a desktop computer, a laptop computer, a notebook computer, an ultra-mobile personal computer (UMPC), a handheld computer, a netbook, a personal digital assistant (PDA), a mobile phone, a set-top box, a smart television, or a smart wearable device, or may be an internet of things node in the internet of things, or may be a vehicle-mounted communication apparatus in the internet of vehicles, or may be an entertainment device, a game device or a system, a Global Positioning System (GPS) device, or the like. The STA may alternatively be a chip and a processing system in the foregoing terminals. Alternatively, the STA may be a wireless communication chip, a wireless sensor, or a wireless communication terminal.

It should be noted that the communication method provided in this embodiment of this disclosure is applicable to the first device and the second device shown in FIG. 2. For specific implementation, refer to the following method embodiments. Details are not described herein again.

It should be noted that the solutions in this embodiment of this disclosure may be further applied to another communication system, and a corresponding name may also be replaced with a name of a corresponding function in the other communication system.

It should be understood that FIG. 2 is merely a simplified diagram of an example for ease of understanding. The communication system may further include another device that is not drawn in FIG. 2.

Before describing the communication method provided in embodiments of this disclosure, the following first describes a simulation analysis process of the communication method provided in embodiments of this disclosure.

In the foregoing descriptions of QR decomposition, the receiving device may perform QR decomposition on a channel matrix of a subcarrier to obtain a matrix Q and a matrix R, or the receiving device may perform QR decomposition on a conjugate transpose matrix of a channel matrix of a subcarrier to obtain a matrix Q and a matrix R.

For example, the receiving device may perform QR decomposition on the channel matrix of the subcarrier or the conjugate apparatus matrix of the channel matrix of the subcarrier in any one of the following manner 1 to manner 4, to obtain the matrix Q and the matrix R. The following describes manner 1 to manner 4 by using an example in which the receiving device performs QR decomposition on the channel matrix of the subcarrier to obtain the matrix Q and the matrix R.

Manner 1: QR Decomposition Based on Classical Schmidt Orthogonalization:

QR decomposition based on classical Schmitt orthogonalization described in manner 1 is applicable to a case in which the channel matrix is column H full rank.

For example, QR decomposition based on classical Schmitt orthogonalization is described by using an example in which the receiving device performs QR decomposition on a channel matrix $H_k$ of a $k^{th}$ subcarrier, where $H_k$ may be shown in the following formula (2.1):

$$H_k = [h_1, \ldots, h_n] \quad (2.1)$$

In formula (2.1), $h_n$ indicates an $n^{th}$ column vector of the channel matrix $H_k$.

According to $H_k$, each element of the matrix Q and each element of the matrix R that are shown in the following formula (2.2) and formula (2.3) may be obtained:

$$R_{11} = \|h_1\| \quad (2.2)$$

$$q_1 = h_1/R_{11}$$

$$R_{jk} = q_j^H h_k, \ 1 \leq j \leq k-1, \ 2 \leq k \leq n$$

$$R_{kk} = \left\| h_k - \sum_{j=1}^{k-1} q_j R_{jk} \right\| \quad (2.3)$$

$$q_k = \left( h_k - \sum_{j=1}^{k-1} q_j R_{jk} \right) / R_{kk}$$

In formula (2.2), $R_{11}$ indicates an element at a location (1, 1) of the matrix R, and $q_1$ indicates a first column vector of the matrix Q. In formula (2.3), $R_{jk}$ indicates an element at a location (j, k) of the matrix R, namely, an element on a non-diagonal line of the matrix R, $q_j$ indicates a $j^{th}$ column vector of the matrix Q, h indicates a $k^{th}$ column vector of $H_k$, $R_{kk}$ indicates an element at a location (k, k) of the matrix R, namely, an element on a diagonal line of the matrix R, and $q_k$ indicates a $k^{th}$ column vector of the matrix Q.

QR decomposition based on classical Schmitt orthogonalization is to calculate the matrix R by column. Classical Schmitt orthogonalization is actually to project the channel matrix to orthogonal space in a column dimension. During specific calculation, if the first column vector is used as a reference item, when remaining orthogonal vectors are calculated, components parallel to the previous vectors may be subtracted in sequence, and finally the matrix Q may be obtained through unified unitization. Then, the matrix R is obtained based on the obtained matrix Q and the channel matrix.

It should be noted that when QR decomposition is performed on the conjugate transpose matrix of the channel matrix $H_k$ of the $k^{th}$ subcarrier, the channel matrix $H_k$ in formula (2.1) may be replaced with the conjugate transpose matrix of the channel matrix $H_k$, and then the matrix Q and the matrix R are obtained according to the foregoing formula (2.2) and formula (2.3).

Manner 2: QR Decomposition Based on Modified Schmitt Orthogonalization:

Similar to the foregoing manner 1, QR decomposition based on modified Schmitt orthogonalization shown in manner 2 is applicable to a case in which the channel matrix is column H full rank.

For example, QR decomposition based on modified Schmitt orthogonalization is described by using an example in which the receiving device performs QR decomposition on a channel matrix $H_k$ of a $k^{th}$ subcarrier, where $H_k$ may be shown in the following formula (2.1):

$$H_k = [h_1, \ldots, h_n] \quad (2.1)$$

In formula (2.1), $h_n$ indicates an $n^{th}$ column vector of the channel matrix $H_k$.

According to $H_k$, each element of the matrix Q and each element of the matrix R that are shown in the following formula (2.4) and formula (2.5) may be obtained:

$$R_{11} = \|h_1\|, \ q_1 = h_1/R_{11} \quad (2.4)$$

$$R_{1j} = q_1^H h_j, \ h_j^{(1)} = h_j - q_1 R_{1j}, \ 2 \leq j \leq n$$

$$R_{22} = \|h_2^{(1)}\|, \ q_2 = h_2/R_{22} \quad (2.5)$$

$$R_{2j} = q_2^H h_j^{(1)}, \ h_j^{(2)} = h_j^{(1)} - q_2 R_{2j}, \ 3 \leq j \leq n$$

In formula (2.4), $R_{11}$ indicates an element at a location (1, 1) of the matrix R, $q_1$ indicates a first column vector of the matrix Q, $R_{1j}$ indicates an element at a location (1, j) of the matrix R, $h_j$ indicates a $j^{th}$ column vector of $H_k$, and $h_j^{(1)}$ indicates a $j^{th}$ column vector obtained through the first transformation.

In formula (2.5), $R_{22}$ indicates an element at a location (2,2) of the matrix R, $h_2^{(1)}$ indicates a second column vector obtained through the first transformation, $q_2$ indicates a second column vector of the matrix Q, $h_2$ indicates a second column vector of $H_k$, $R_{2j}$ indicates an element at a location (2, j) of the matrix R, and $h_j^{(2)}$ indicates a $j^{th}$ column vector obtained through the second transformation.

QR decomposition based on modified Schmitt orthogonalization is to calculate the matrix R by row, and a rounding error is smaller than that of classical Schmitt orthogonalization.

It should be noted that when QR decomposition is performed on the conjugate transpose matrix of the channel matrix $H_k$ of the $k^{th}$ subcarrier, the channel matrix $H_k$ in formula (2.1) may be replaced with the conjugate transpose matrix of the channel matrix $H_k$, and then the matrix Q and the matrix R are obtained according to the foregoing formula (2.4) and formula (2.5).

Manner 3: QR Decomposition Based on Householder Transformation:

Householder transformation is essentially to perform specular reflection on a vector on a specific hyperplane.

For example, QR decomposition based on Householder transformation is described by using an example in which the receiving device performs QR decomposition on a channel matrix $H_k$ of a $k^{th}$ subcarrier, where $H_k$ may be shown in the following formula (2.1):

$$H_k = [h_1, \ldots, h_n] \quad (2.1)$$

In formula (2.1), $h_n$ indicates an $n^{th}$ column vector of the channel matrix $H_k$.

According to $H_k$, a first column vector $h_1$ may be transformed to obtain a transformed vector $h_1^{(1)}$ shown in the following formula (2.6), and a Householder transformation matrix $H_{h_1}$ shown in the following formula (2.7) may be obtained based on the transformed vector $h_1^{(1)}$ $$h_1^{(1)} = \begin{pmatrix} norm(h_1) \\ 0 \\ \vdots \\ 0 \end{pmatrix} \quad (2.6)$$

$$H_{h_1} = I + \frac{(h_1 - h_1^{(1)})(h_1 - h_1^{(1)})^H}{h_1^{H(1)}(h_1 - h_1^{(1)})} \text{ or } I - \frac{(h_1 - h_1^{(1)})(h_1 - h_1^{(1)})^H}{(h_1 - h_1^{(1)})^H h_1} \quad (2.7)$$

Each column vector in $H_k$ is transformed according to the foregoing formula (2.6) and formula (2.7), and a transformed signal matrix $H_k^{(1)}$ shown in the following formula (2.8) may be obtained:

$$H_k^{(1)} = \begin{bmatrix} norm(h_1)^{(1)} & h_{12}^{(1)} & \cdots & h_{1n}^{(1)} \\ 0 & & & \\ \vdots & & H^{(1)} & \\ 0 & & & \end{bmatrix} \quad (2.8)$$

Elements other than the first row and the first column are selected as a matrix $H^{(1)}$, and then the foregoing transformation is performed on the matrix. The process is repeated until QR decomposition is completed, to obtain a matrix Q shown in the following formula (2.9) and a matrix R shown in the following formula (2.10):

$$Q_k = (H_{h_{n-1}} \cdots H_{h_2} H_{h_1})^{-1} \quad (2.9)$$

$$R_k = H_k^{(n)} \quad (2.10)$$

It should be noted that when QR decomposition is performed on the conjugate transpose matrix of the channel matrix $H_k$ of the $k^{th}$ subcarrier, the channel matrix $H_k$ in formula (2.1) may be replaced with the conjugate transpose matrix of the channel matrix $H_k$, and then the matrix Q and the matrix R are obtained according to the foregoing formula (2.6) to formula (2.10).

Manner 4: QR Decomposition Based on Givens Rotation:

Similar to Householder transformation, Givens rotation is performed on one column vector of the channel matrix each time. However, only one element is transformed to zero each time through Givens rotation until QR decomposition is completed.

For example, QR decomposition based on Givens rotation is described by using an example in which the receiving device performs QR decomposition on a channel matrix $H_k$ of a $k^{th}$ subcarrier. It is assumed that the channel matrix $H_k$ is a 4×4 matrix shown in the following formula (2.11), a Givens rotation matrix may be a matrix shown in the following formula (2.12):

$$H_k = \begin{bmatrix} |h_{11}|e^{j\theta_{11}} & h_{12} & h_{13} & h_{14} \\ |h_{21}|e^{j\theta_{21}} & h_{22} & h_{23} & h_{24} \\ h_{31} & h_{32} & h_{33} & h_{34} \\ h_{41} & h_{42} & h_{43} & h_{44} \end{bmatrix} \quad (2.11)$$

$$G_{12} = \begin{bmatrix} ce^{j\theta_1} & se^{j\theta_2} & 0 & 0 \\ -se^{-j\theta_2} & ce^{-j\theta_1} & 0 & 0 \\ 0 & 0 & 1 & 0 \\ 0 & 0 & 0 & 1 \end{bmatrix} \quad (2.12)$$

In formula (2.12), C and S may be results shown in the following formula (2.13), and $\theta_1$ and $\theta_2$ may be results shown in the following formula (2.14):

$$c = \frac{|h_{11}|}{\sqrt{|h_{11}|^2 + |h_{21}|^2}}, s = \frac{|h_{21}|}{\sqrt{|h_{11}|^2 + |h_{21}|^2}} \quad (2.13)$$

$$\theta_1 = -\arg h_{11}, \theta_2 = -\arg h_{21} \quad (2.14)$$

After the first Givens rotation is performed on the channel matrix $H_k$, a matrix $H_k^{(1)}$ shown in the following formula (2.15) may be obtained:

$$H_k^{(1)} = \begin{bmatrix} h_{11}^{(1)} & h_{12}^{(1)} & h_{13}^{(1)} & h_{14}^{(1)} \\ 0 & h_{22}^{(1)} & h_{23}^{(1)} & h_{24}^{(1)} \\ h_{31}^{(1)} & h_{32}^{(1)} & h_{33}^{(1)} & h_{34}^{(1)} \\ h_{41}^{(1)} & h_{42}^{(1)} & h_{43}^{(1)} & h_{44}^{(1)} \end{bmatrix} \quad (2.15)$$

In formula (2.15), $h_{ij}^{(k)}$ indicates an element at a location (i, j) after the $k^{th}$ rotation.

After Givens rotation is performed on elements in the first column in formula (2.15), a matrix $G_{14}G_{13}G_{12}H$ shown in the following formula (2.16) and a matrix $G_1$ shown in the following formula (2.17) may be obtained:

$$G_{14}G_{13}G_{12}H = \begin{bmatrix} \sqrt{|h_{11}|^2 + |h_{21}|^2 + |h_{31}|^2 + |h_{41}|^2} & h_{12}^{(4)} & h_{13}^{(4)} & h_{14}^{(4)} \\ 0 & h_{22}^{(1)} & h_{23}^{(1)} & h_{24}^{(1)} \\ 0 & h_{32}^{(2)} & h_{33}^{(2)} & h_{34}^{(2)} \\ 0 & h_{42}^{(3)} & h_{43}^{(3)} & h_{44}^{(3)} \end{bmatrix} \quad (2.16)$$

$$G_1 = G_{14}G_{13}G_{12} \quad (2.17)$$

Then, a submatrix of the matrix is transformed through the foregoing transformation. The process is repeated until QR decomposition is completed, to obtain a matrix Q shown in the following formula (2.18) and a matrix R shown in the following formula (2.19):

$$Q = (G_3 G_2 G_1)^- \quad (2.18)$$

$$R = G_3 G_2 G_1 H \quad (2.19)$$

It should be noted that when QR decomposition is performed on the conjugate transpose matrix of the channel matrix $H_k$ of the $k^{th}$ subcarrier, the channel matrix $H_k$ in formula (2.11) may be replaced with the conjugate transpose matrix of the channel matrix $H_k$, and then the matrix Q and the matrix R are obtained according to the foregoing formula (2.12) to formula (2.19).

Based on QR decomposition shown in manner 1 to manner 4, an example in which the channel matrix is a channel response matrix that is caused by parameters such as a target distance, an angle, and a Doppler shift and that is shown in the following formula (2.20) is used, and the foregoing solution 1 of performing QR decomposition on the channel matrix and solution 2 of performing QR decomposition on the conjugate transpose matrix of the channel matrix are compared and analyzed:

$$H_{k,i} = \sum_{l=1}^{L} \underbrace{\exp(-j2\pi k\Delta f \tau_l)\exp(j2\pi f_{dl} i\Delta t)}_{\text{Linear phase corresponding to a distance and Doppler}} . \tilde{H}_l \quad (2.20)$$

In formula (2.20), k indicates the $k^{th}$ subcarrier, i indicates an $i^{th}$ pulse, L indicates a quantity of targets, $\tau_l$ indicates a delay of an $l^{th}$ target, $f_{dl}$ indicates a Doppler frequency of the $l^{th}$ target, and $\tilde{H}_l$ is a MIMO channel matrix corresponding to the $l^{th}$ target, and may be shown according to the following formula (2.21):

$$\tilde{H}_l = \underbrace{\exp[-j2\pi d\sin\theta_{tl}\cdot(1:N_t)/\lambda]\otimes\exp[-j2\pi d\sin\theta_{rl}\cdot(1:N_r)/\lambda]}_{\text{Two-dimensional directional vector formed by a transmit angle and a receive angle}} \quad (2.21)$$

Figure 3:
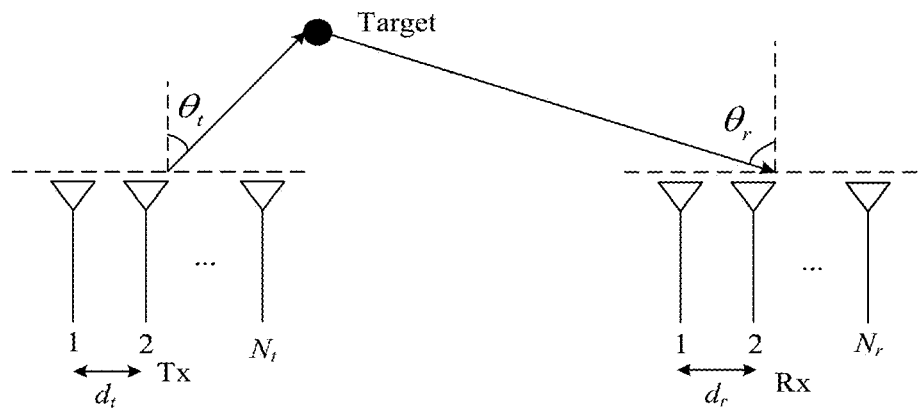
FIG. 3 is a diagram of a transmit angle and a receive angle corresponding to a target according to an embodiment of this disclosure.

In formula (2.21), d indicates an antenna spacing, $\theta_{tl}$ indicates a transmit angle corresponding to the $l^{th}$ target, $N_t$ indicates a quantity of transmit antennas, $\theta_{rl}$ indicates a receive angle corresponding to the $l^{th}$ target, $N_r$ indicates a quantity of transmit antennas, and $\lambda$ indicates a carrier wavelength. The transmit angle and the receive angle that correspond to the target may be the transmit angle and the receive angle that are shown in FIG. 3, $\theta_t$ indicates the transmit angle corresponding to the target, and $\theta_r$ indicates the receive angle corresponding to the target.

It is assumed that the channel response matrix is a 2×2 matrix H shown in the following formula (2.22). Using QR decomposition based on Householder transformation as an example, QR decomposition is performed on the channel response matrix by using solution 1 according to the following formula (2.23) to formula (2.29):

$$H = (h_1 \quad h_2) = \quad (2.22)$$

$$\begin{pmatrix} A & C \\ B & D \end{pmatrix} = \sum_{l=1}^{L} \alpha_l \underbrace{e^{-j2\pi(\tau_l k\Delta f + f_{d_l} i\Delta t)}}_{\text{Doppler and delay information}} \underbrace{\begin{pmatrix} 1 & e^{-j2\pi\sin\varphi_l\Delta d} \\ e^{-j2\pi\sin\theta_l\Delta d} & e^{-j2\pi\Delta d(\sin\theta_l+\sin\varphi_l)} \end{pmatrix}}_{\text{AOD and AOA information}}$$

In formula (2.22), the matrix H may include information related to an AOD and an angle of arrival (AOA).

A process of QR decomposition based on Householder transformation in solution 1 is as follows:

$$h_1^{(1)} = \begin{pmatrix} norm(h_1) \\ 0 \end{pmatrix} \quad (2.23)$$

In formula (2.23), $h_1^{(1)}$ indicates a vector obtained by transforming the first column vector $h_1$, or may be described as the first column vector obtained through the first Householder transformation. In this case, a first Householder transformation matrix $H_{h_1}$ may be shown according to the following formula (2.24):

$$H_{h_1} = I + \frac{(h_1 - h_1^{(1)})(h_1 - h_1^{(1)})^H}{h_1^{H(1)}(h_1 - h_1^{(1)})} = \quad (2.24)$$

$$\frac{1}{norm(h_1)}\begin{pmatrix} A^H & B^H \\ \frac{BA^H - norm(h_1)B}{A - norm(h_1)} & \frac{BB^H + norm(h_1)A - norm^2(h_1)}{A - norm(h_1)} \end{pmatrix}$$

After the first Householder transformation, the matrix H may be transformed into a matrix $H_{h_1}H$ shown in the following formula (2.25):

$$H_{h_1}H = \begin{pmatrix} h_1^{(1)} & h_3^{(1)} \\ h_2^{(1)} & h_4^{(1)} \end{pmatrix} = \quad (2.25)$$

$$\frac{1}{norm(h_1)}\begin{pmatrix} norm^2(h_1) & A^HC + B^HD \\ & B(A^H - norm(h_1))C + (BB^H + \\ & norm(h_1)A - norm^2(h_1))D \\ 0 & \overline{A - norm(h_1)} \end{pmatrix}$$

$h_4^{(2)}$ shown in the following formula (2.26) is the first column vector of the submatrix obtained through the second Householder transformation:

$$h_4^{(2)} = (norm(h_4^{(1)})) \quad (2.26)$$

According to formula (2.26), it may be determined that a second Householder transformation matrix is a matrix $H_{h_2}$ shown in the following formula (2.27):

$$H_{h_2} = I + \frac{(h_4^{(1)} - h_4^{(2)})(h_4^{(1)} - h_4^{(2)})^H}{h_4^{H(2)}(h_4^{(1)} - h_4^{(2)})} = \begin{pmatrix} 1 & 0 \\ 0 & 1 + \frac{(h_4^{(1)} - h_4^{(2)})^H}{h_4^{(2)}} \end{pmatrix} \quad (2.27)$$

Further, a matrix Q shown in the following formula (2.28) and a matrix R shown in the following formula (2.29) are obtained:

$$Q = (q_1 \quad q_2) = (H_{h_2}*H_{h_1})^H = \quad (2.28)$$

$$\frac{1}{norm(h_1)}\begin{pmatrix} A & \frac{B^HA - norm(h_1)B^H}{A^H - norm(h_1)}\left(1 + \frac{h_4^{(1)} - h_4^{(2)}}{norm(h_4^{(1)})}\right) \\ B & \frac{B^HB + norm(h_1)A^H - norm^2(h_1)}{A^H - norm(h_1)}\left(1 + \frac{h_4^{(1)} - h_4^{(2)}}{norm(h_4^{(1)})}\right) \end{pmatrix}$$

$$R = \frac{1}{norm(h_1)}\begin{pmatrix} norm^2(h_1) & A^HC + B^HD \\ 0 & norm(h_1)norm(h_4^{(1)}) \end{pmatrix} \quad (2.29)$$

$$A^HC + B^HD =$$

$$a_1^2 e^{-j2\pi\sin\varphi_1\Delta d}(1 + e^{j2\pi\sin\theta_1\Delta d}) + a_2^2 e^{-j2\pi\sin\varphi_2\Delta d}(1 + e^{j2\pi\sin\theta_2\Delta d}) +$$

$$a_1 a_2 e^{-j2\pi(\Delta\tau\Delta f + \Delta f_d\Delta t)} e^{-j2\pi\sin\varphi_1\Delta d}(1 + e^{j2\pi\sin\theta_2\Delta d}).$$

According to the matrix Q described in the foregoing formula (2.28) and the matrix R shown in formula (2.29), it may be learned that in solution 1 in which QR decomposition is performed on the matrix H, the matrix Q may completely reserve the first column vector in the matrix H. Therefore, the Doppler shift, the delay, and the AOA may be obtained based on the matrix Q, and the matrix R may reserve the AOD, a Doppler shift difference, and a delay difference.

Correspondingly, because QR decomposition is performed on the conjugate transpose matrix of the matrix H in solution 2, when QR decomposition is performed by using solution 2, because conjugate transpose is performed on the matrix H, the original first row vector may be completely reserved in the first column vector of the matrix Q. That is, the matrix Q may reserve the Doppler shift, the delay, and the AOD, and the matrix R may reserve the AOA, the Doppler shift difference, and the delay difference.

The Doppler shift difference is a difference between Doppler shifts of any two of the plurality of targets, and the delay difference is a difference between delays of any two of the plurality of targets.

Similarly, as shown in the following Table 3, for QR decomposition based on different manners, information reserved by the matrix R obtained by the receiving device by using solution 1 and information reserved by the matrix Q obtained by using solution 2 may be shown in the following Table 3:

TABLE 3

|  | Solution 1 | Solution 2 |
|---|---|---|
| QR decomposition based on Schmitt orthogonalization | R includes $\Delta f_d$ and $\Delta \tau$. | Q includes $f_d$ and $\tau$. |
| QR decomposition based on Householder transformation | R includes $\Delta f_d$, $\Delta \tau$, and AOD. | Q includes $f_d$, $\tau$, and AOD. |
| QR decomposition based on Givens rotation | R includes $\Delta f_d$, $\Delta \tau$, and AOD. | Q includes $f_d$, $\tau$, and AOD. |
| Feedback matrix | R | Q |

$\Delta f_d$ indicates a difference between Doppler shifts of targets, $\Delta \tau$ indicates a difference between delays of targets, $f_d$ indicates a Doppler shift of a target, and $\tau$ indicates a delay of a target.

It may be learned from Table 3 that the Doppler shift difference, the delay difference, and the AOD are reserved in the matrix R obtained by using solution 1, and the Doppler shift, the delay, and the AOD are reserved in the matrix Q obtained by using solution 2. That is, attribute information of a target may be directly obtained by using solution 2.

The following uses an example in which a line of sight (LOS) path and a non-LOS (NLOS) path exist between the sending device and the receiving device. A signal may be linearly transmitted between the sending device and the receiving device through the LOS path, or may be transmitted in a reflection or diffraction manner through the NLOS path. When the signal is transmitted in the reflection manner through the NLOS path, the NLOS path may also be described as a reflection path. Simulation analysis is performed on the foregoing solution 1 and solution 2 based on a simulation parameter table 4 shown in the following Table 4:

TABLE 4

| Simulation parameter | | |
|---|---|---|
| Parameter | Symbol | Value |
| Quantity of transmit antennas | $N_t$ | 4 |
| Quantity of receive antennas | $N_r$ | 4 |
| Bandwidth | B | 20 MHz |
| Quantity of subcarriers | N | 256 |
| Pulse repetition frequency | PRF | 1 kilohertz (kHz) |
| LOS path distance | d | 15 m |
| LOS path angle | $(\theta_t, \theta_r)$ | 45°, −40° |
| LOS path Doppler shift | $f_d$ | 20 hertz (Hz) |
| LOS path attenuation factor | a | 1 |
| Target distance | d | 45 m |
| Target angle | $(\theta_t, \theta_r)$ | −30°, 50° |
| Target Doppler shift | $f_d$ | 50 Hz |
| Target path attenuation factor | a | 0.1 |

When the quantity of transmit antennas is 4, the quantity of receive antennas is 4, and the quantity of subcarriers is 256, the channel matrix obtained by the receiving device through measurement may be a 4×4×256 matrix, where the channel matrix of the $k^{th}$ subcarrier may be a 4×4 matrix. When QR decomposition is performed on the channel matrix of the subcarrier by using the foregoing solution 1 and solution 2, a matrix $Q_{k,i}$ obtained through decomposition may include four orthogonal vectors, and first two column vectors are respectively denoted as $q_1$ and $q_2$. $R_{k,i}$ obtained through decomposition is an upper right triangular matrix, and a first row vector and a fourth column vector are respectively denoted as $r_1$ and $r_2$. A target distance, a target angle, and a target Doppler shift are extracted from a vector r obtained in solution 1, and a result may be shown in FIG. 4A to FIG. 4C. A target distance, a target angle, and a target Doppler shift are extracted from a vector 9 obtained in solution 2, and a result may be shown in FIG. 5A to FIG. 5G.

Figure 4A:
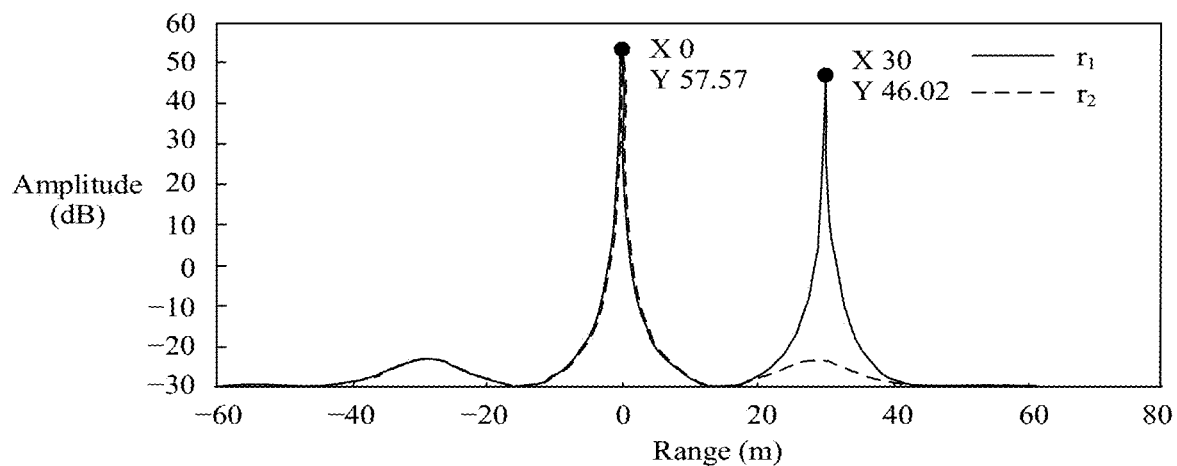
FIG. 4A shows a distance spectrum of a vector r according to an embodiment of this disclosure.
Figure 4B:
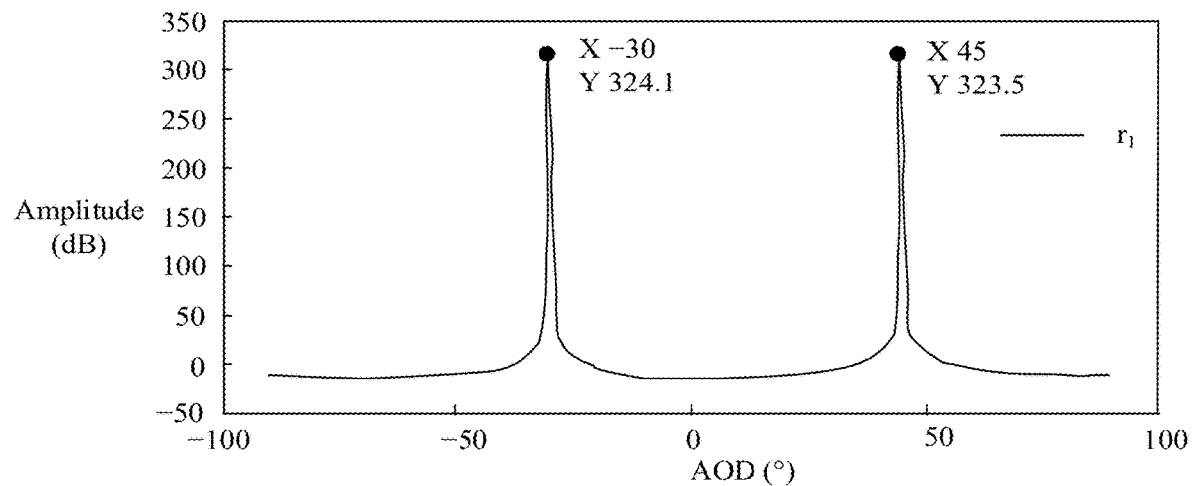
FIG. 4B shows an angle spectrum of a vector r according to an embodiment of this disclosure.
Figure 4C:
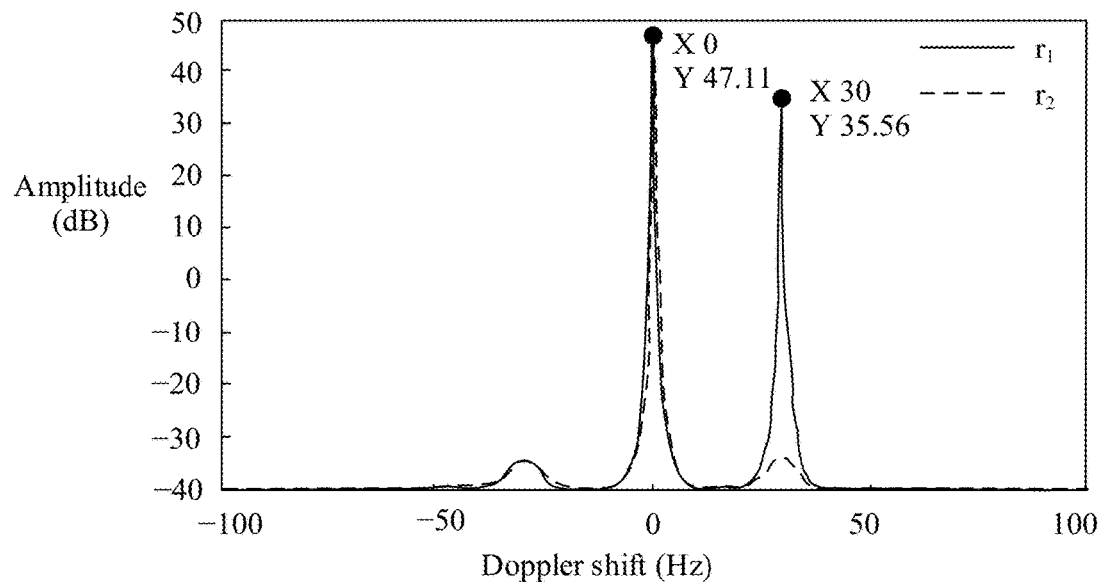
FIG. 4C shows a Doppler shift spectrum of a vector r according to an embodiment of this disclosure.

FIG. 4A shows a distance spectrum of a vector r. FIG. 4B shows an angle spectrum of a vector r. FIG. 4C shows a Doppler shift spectrum of a vector r.

Figure 5A:
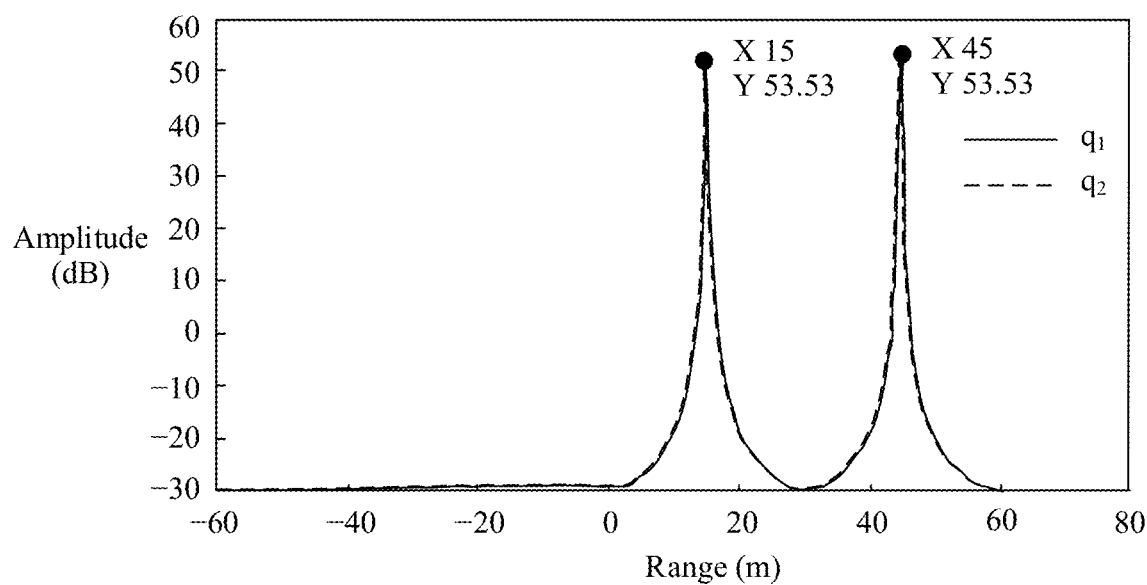
FIG. 5A shows a distance spectrum of a vector q according to an embodiment of this disclosure.
Figure 5B:
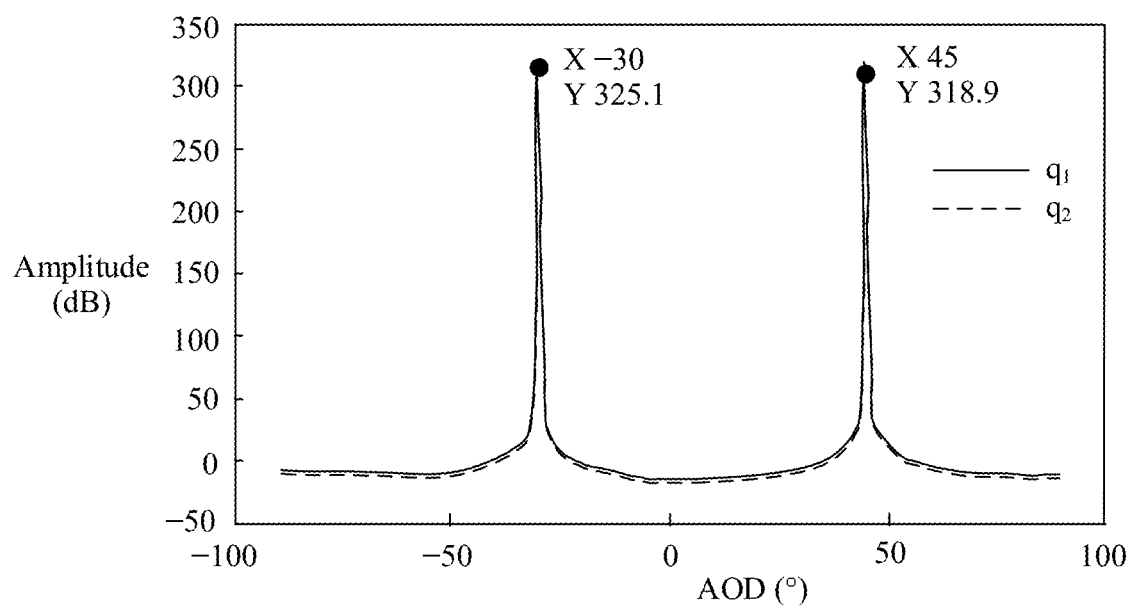
FIG. 5B shows an angle spectrum of a vector q according to an embodiment of this disclosure.
Figure 5C:
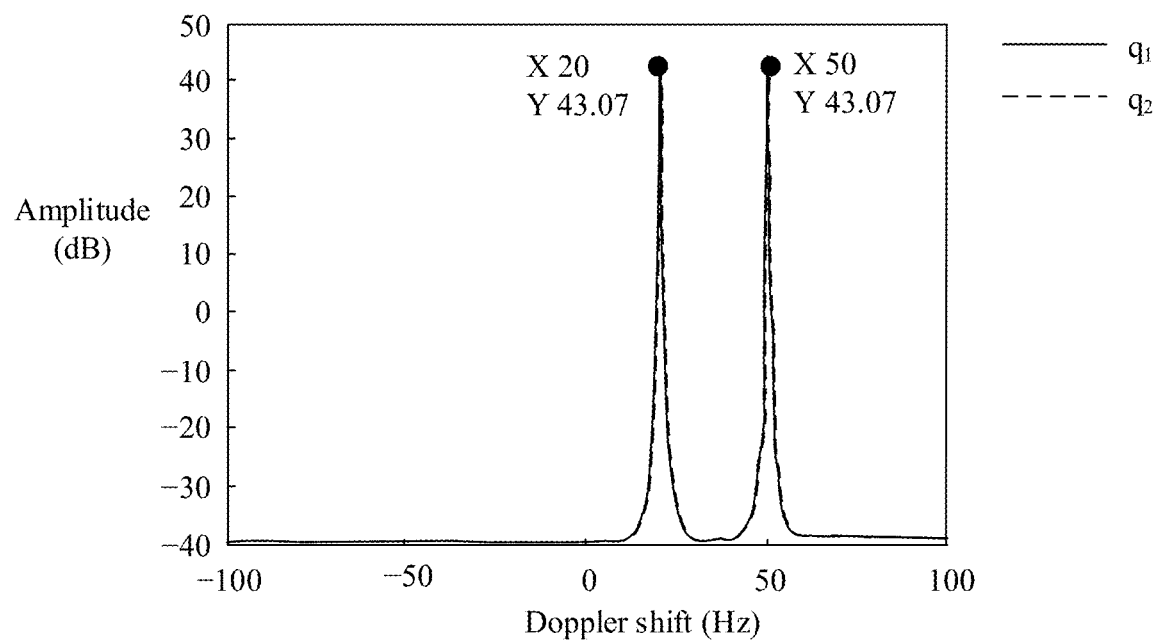
FIG. 5C shows a Doppler shift spectrum of a vector q according to an embodiment of this disclosure.
Figure 5D:
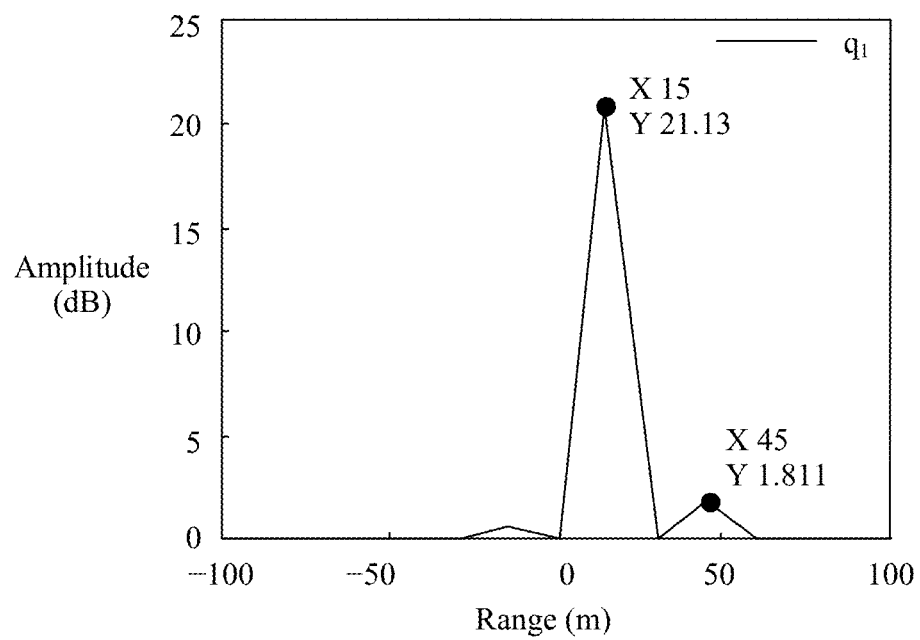
FIG. 5D shows a distance spectrum of a vector $q_1$ according to an embodiment of this disclosure.
Figure 5E:
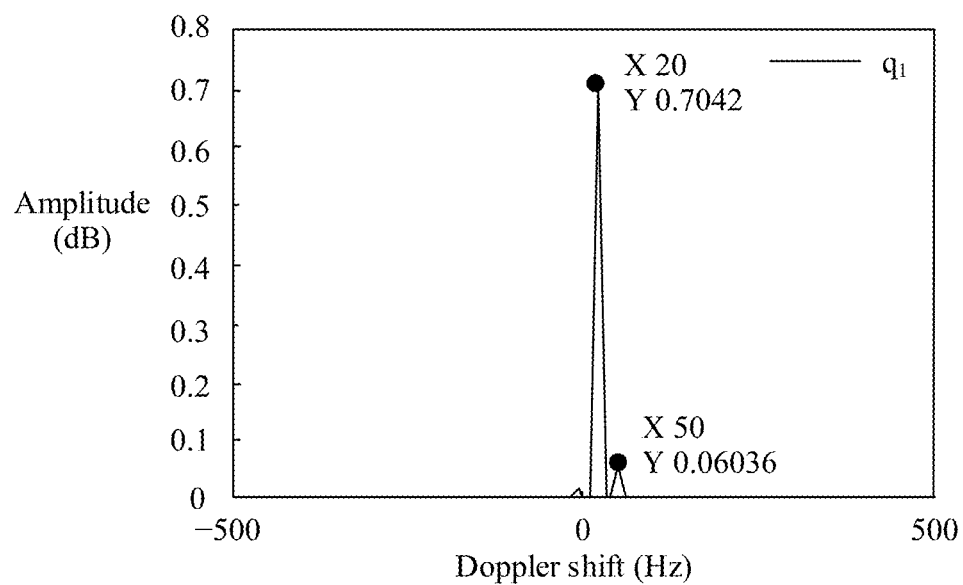
FIG. 5E shows a Doppler shift spectrum of a vector $q_2$ according to an embodiment of this disclosure.
Figure 5F:
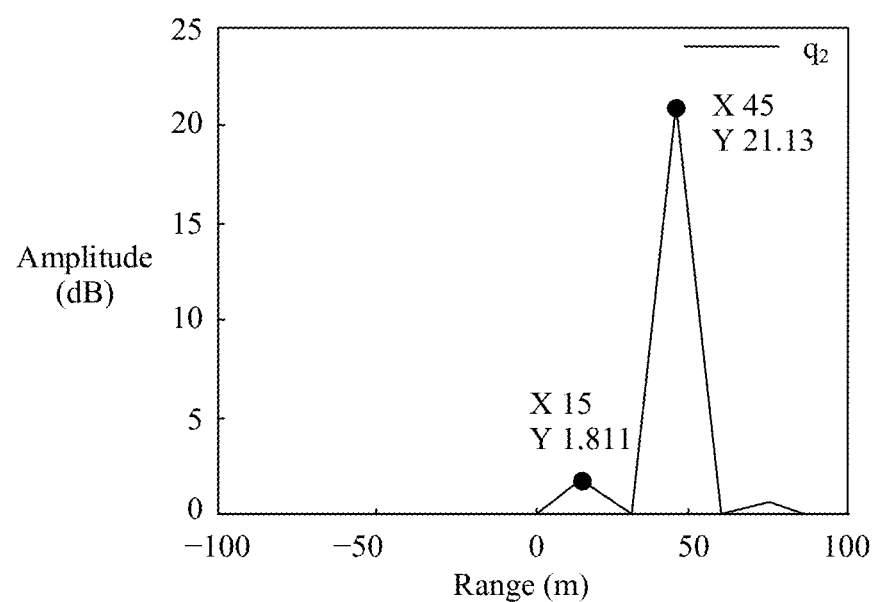
FIG. 5F shows a distance spectrum of a vector $q_2$ according to an embodiment of this disclosure.
Figure 5G:
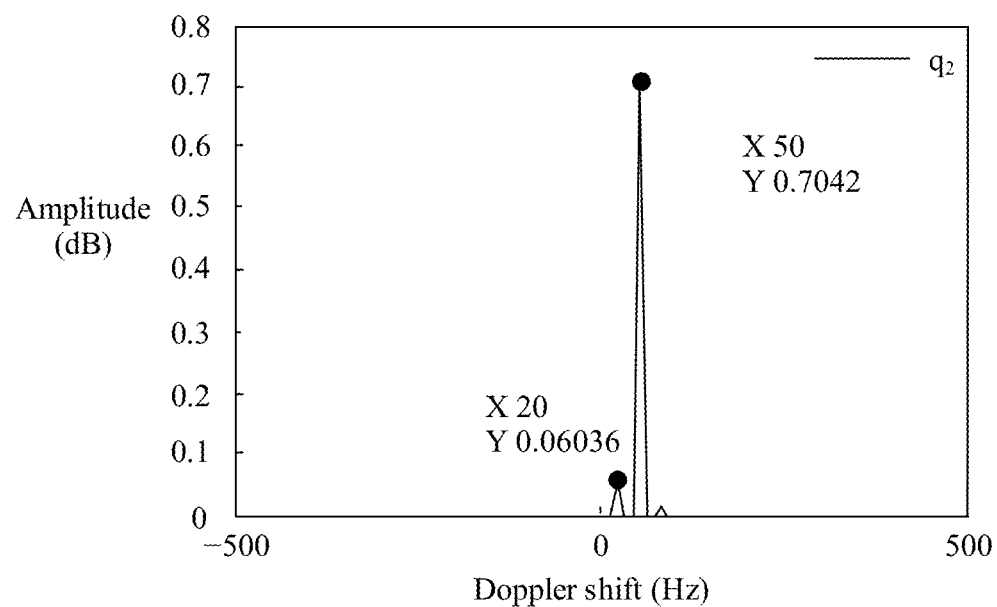
FIG. 5G shows a Doppler shift spectrum of a vector $q_2$ according to an embodiment of this disclosure.

FIG. 5A shows a distance spectrum of a vector 9. FIG. 5B shows an angle spectrum of a vector 9. FIG. 5C shows a Doppler shift spectrum of a vector 9. FIG. 5D shows a distance spectrum of a vector $q_1$. FIG. 5E shows a Doppler shift spectrum of a vector $q_1$. FIG. 5F shows a distance spectrum of a vector $q_2$. FIG. 5G shows a Doppler shift spectrum of a vector $q_2$.

Optionally, the target distance, the target angle, and the target Doppler shift may be extracted by using a multiple signal classification (MUSIC) algorithm. The distance spectrum of the vector $q_1$, the Doppler shift spectrum of the vector $q_1$, the distance spectrum of the vector $q_2$, and the Doppler shift spectrum of the vector $q_2$ may be extracted by using an IFFT algorithm.

By comparing processing results in FIG. 4A to FIG. 4C and processing results in FIG. 5A to FIG. 5G, it may be learned that an effective target distance and an effective target Doppler shift cannot be extracted from the matrix R through QR decomposition in solution 1. Through QR decomposition in solution 2, when a quantity of targets and LOS paths is less than a dimension of the channel matrix, each vector in the matrix Q corresponds to one target, and the distance, the angle, and the Doppler shift of the target can be effectively extracted.

In another example, one LOS path and two target paths exist between the sending device and the receiving device. Simulation analysis is performed on the foregoing solution 1 and solution 2 based on a simulation parameter table 5 shown in the following Table 5.

TABLE 5

| Simulation parameter | | |
|---|---|---|
| Parameter | Symbol | Value |
| Quantity of transmit antennas | $N_t$ | 8 |
| Quantity of receive antennas | $N_r$ | 8 |
| Bandwidth | B | 20 MHz |
| Quantity of subcarriers | N | 256 |
| Pulse repetition frequency | PRF | 1 kHz |
| LOS path distance | d | 15 m |
| LOS path angle | $(\theta_t, \theta_r)$ | 45°, −40° |
| LOS path Doppler shift | $f_d$ | 20 Hz |
| LOS path attenuation factor | a | 1 |
| Target 1 distance | d | 45 m |
| Target 1 angle | $(\theta_t, \theta_r)$ | −30°, 50° |
| Target 1 Doppler shift | $f_d$ | 50 Hz |
| Target 1 attenuation factor | a | 0.1 |
| Target 2 distance | d | 60 m |
| Target 2 angle | $(\theta_t, \theta_r)$ | 75°, 0° |
| Target 2 Doppler shift | $f_d$ | 70 Hz |
| Target 2 attenuation factor | a | 0.1 |

Similar processing is performed on the simulation parameters in Table 5 based on the foregoing processing of the simulation parameters in Table 4. In this case, because there are three effective paths in the channel, a rank of the entire channel matrix is 3, and the first three orthogonal vectors in $Q_{k,i}$ obtained through decomposition are denoted as $q_1$, $q_2$, and $q_3$. The target distance, the target angle, and the target Doppler shift are extracted from the first three orthogonal vectors obtained through QR decomposition in solution 2, and results may be shown in FIG. 6A to FIG. 6F.

Figure 6A:
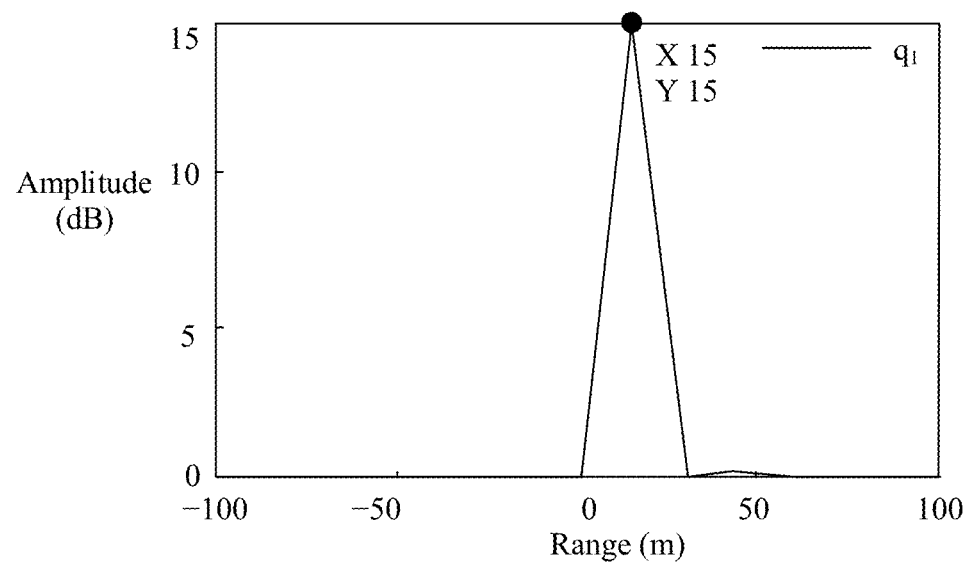
FIG. 6A shows a distance spectrum of a vector $q_1$ according to an embodiment of this disclosure.
Figure 6B:
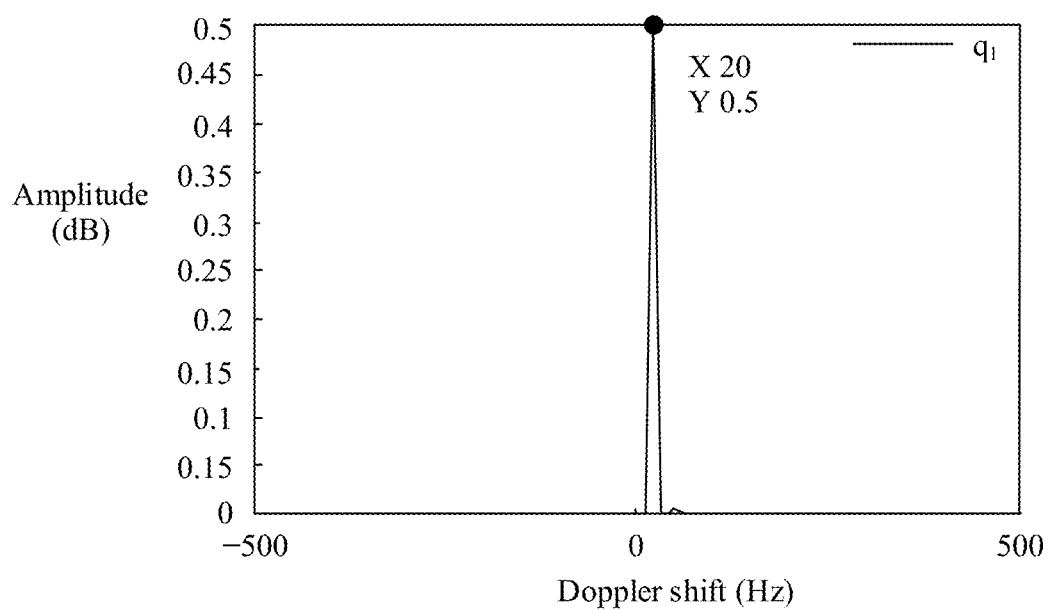
FIG. 6B shows a Doppler shift spectrum of a vector $q_1$ according to an embodiment of this disclosure.
Figure 6C:
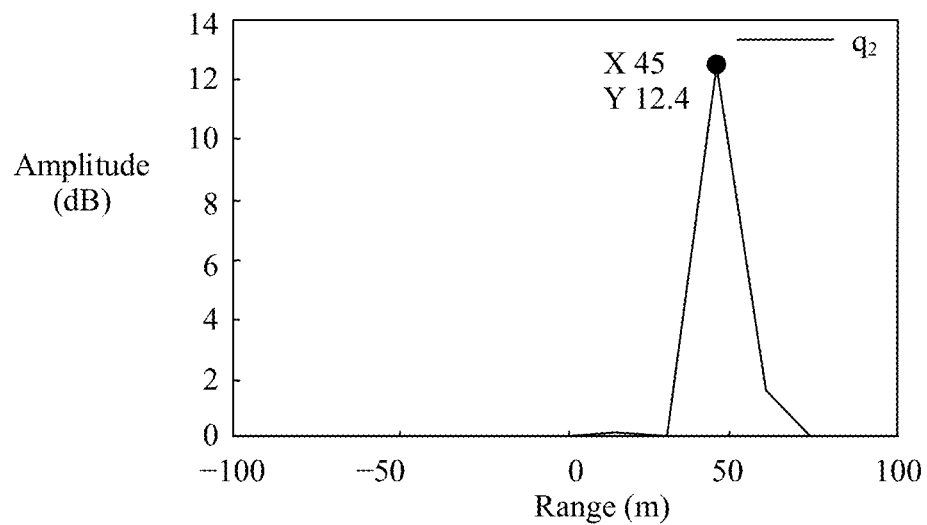
FIG. 6C shows a distance spectrum of a vector $q_2$ according to an embodiment of this disclosure.
Figure 6D:
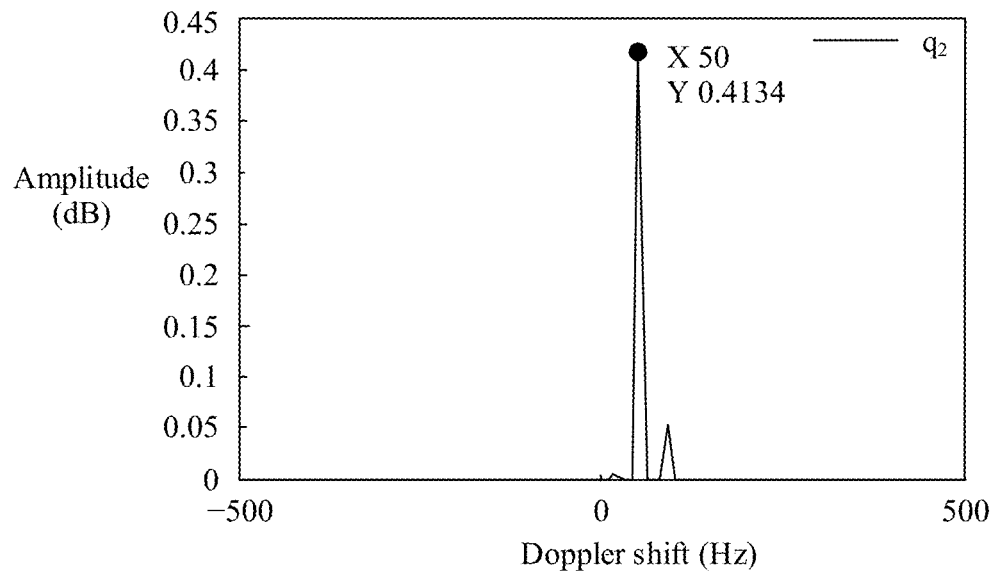
FIG. 6D shows a Doppler shift spectrum of a vector $q_2$ according to an embodiment of this disclosure.
Figure 6E:
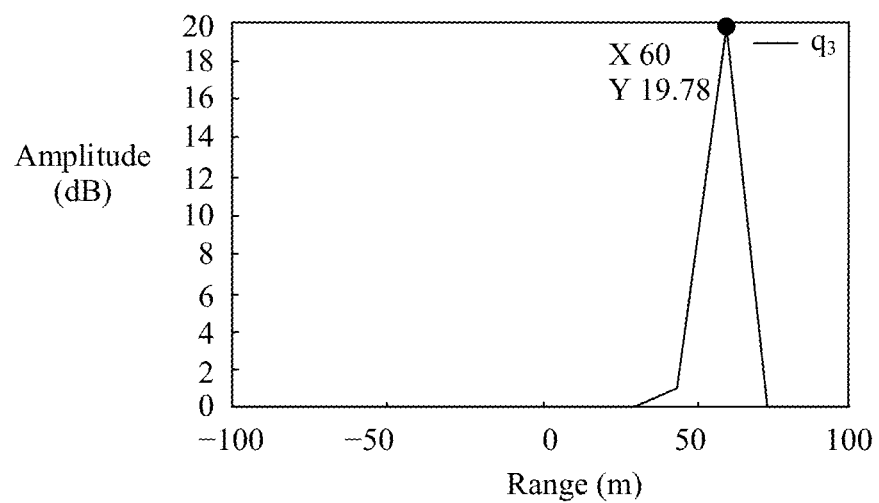
FIG. 6E shows a distance spectrum of a vector $q_3$ according to an embodiment of this disclosure.
Figure 6F:
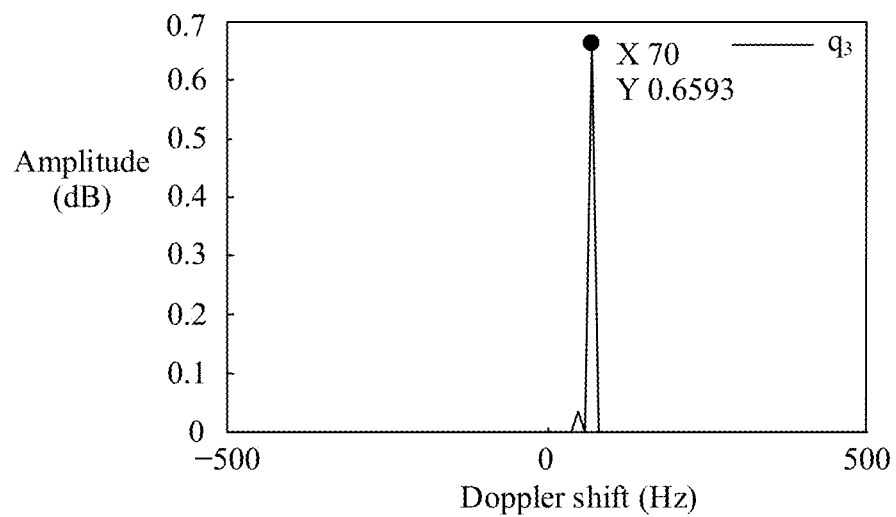
FIG. 6F shows a Doppler shift spectrum of a vector $q_3$ according to an embodiment of this disclosure.

FIG. 6A shows a distance spectrum of a vector $q_1$. FIG. 6B shows a Doppler shift spectrum of a vector $q_1$. FIG. 6C shows a distance spectrum of a vector $q_2$. FIG. 6D shows a Doppler shift spectrum of a vector $q_2$. FIG. 6E shows a distance spectrum of a vector $q_3$. FIG. 6F shows a Doppler shift spectrum of a vector $q_3$.

According to the processing results in FIG. 6A to FIG. 6F, the target distance, the target angle, and the target Doppler shift can be effectively extracted through QR decomposition in solution 2.

Figure 7A:
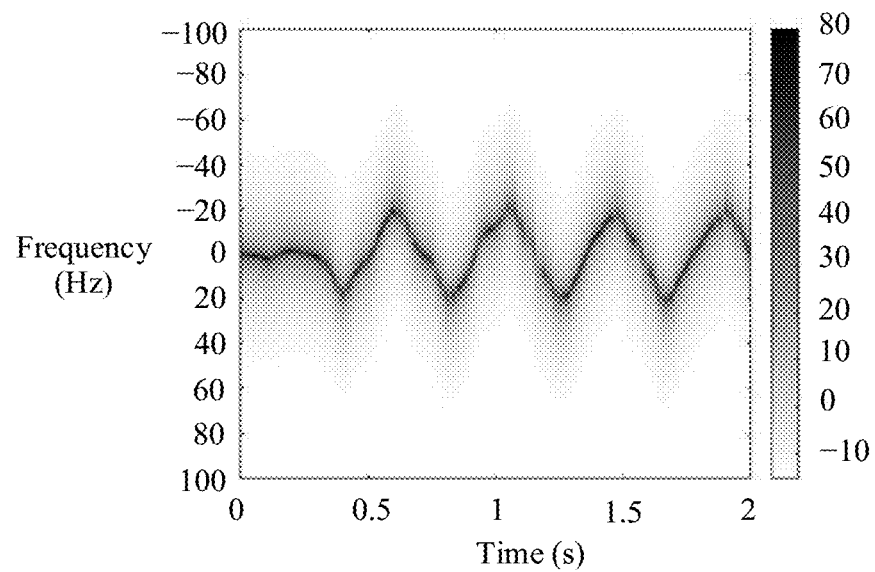
FIG. 7A shows a short-time Fourier transform (STFT) spectrum of a channel matrix according to an embodiment of this disclosure.
Figure 7B:
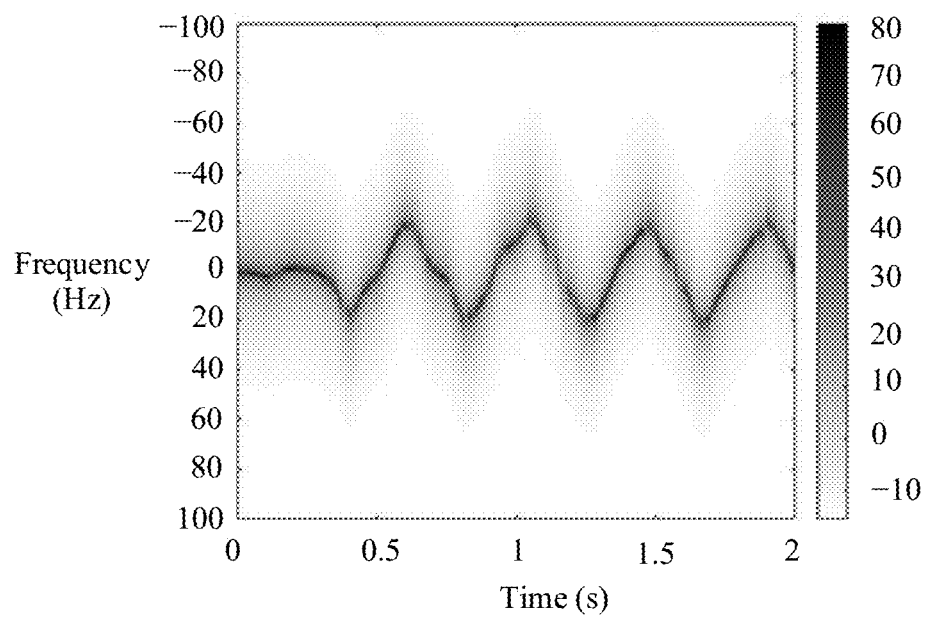
FIG. 7B shows an STFT spectrum of a matrix Q according to an embodiment of this disclosure.

In still another example, an actually measured data is used as an example. It is assumed that an STFT spectrum of a channel matrix is shown in FIG. 7A, and an STFT spectrum of a matrix Q obtained through QR decomposition in solution 2 may be shown in FIG. 7B. Under an actual measurement condition, the matrix Q may completely reserve the first column vector in the channel matrix, and may be used to remove a phase offset of an antenna conjugate phase of the sending device when a CSD is removed. That is, the target distance, the target angle, and the target Doppler shift can be effectively extracted through QR decomposition in solution 2.

Based on the foregoing analysis, it may be learned that when the receiving device decomposes the conjugate transpose matrix of the channel matrix through QR decomposition described in solution 2, the matrix Q obtained through decomposition may completely reserve the first column vector of the channel matrix, and the target distance, the target angle, and the target Doppler shift can be effectively extracted based on the matrix Q.

Based on this, an embodiment of this disclosure provides a communication method. A receiving device may feed back, to a sending device, a matrix Q obtained through conjugate transpose and QR decomposition on a channel matrix of a subcarrier. The sending device may effectively extract a target distance, a target angle, and a target Doppler shift based on the matrix Q, to implement target sensing.

Figure 8:
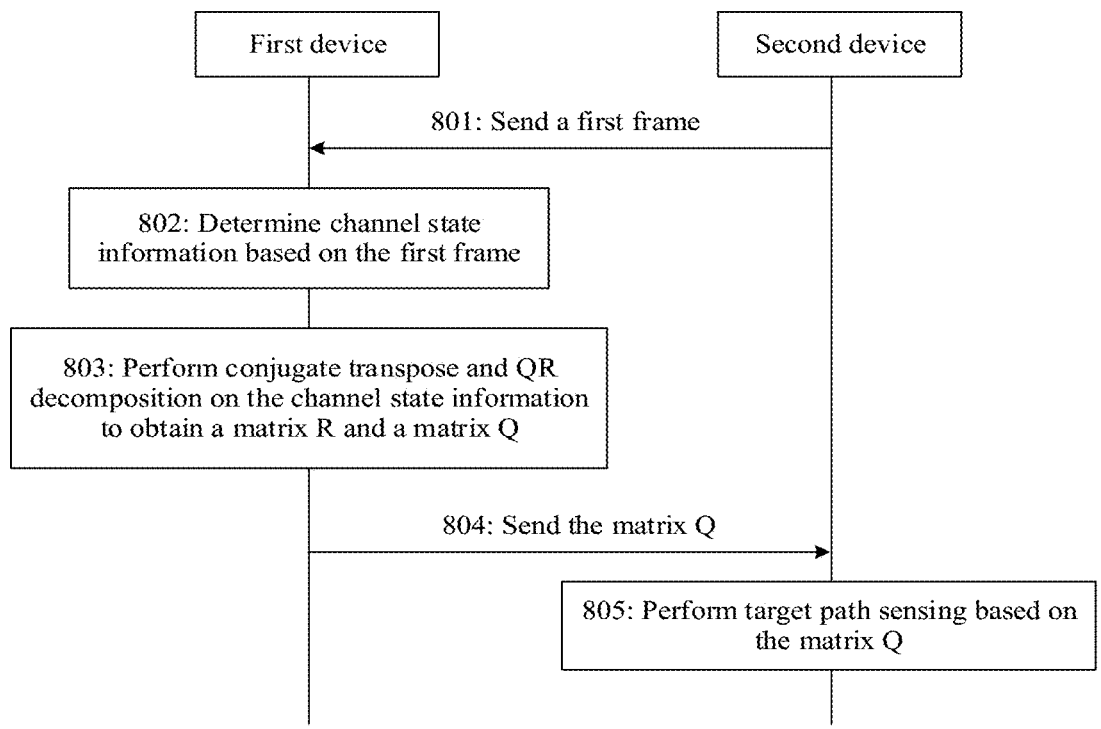
FIG. 8 is a flowchart of a communication method according to an embodiment of this disclosure.

An example in which the sending device is a second device and the receiving device is a first device is used below. As shown in FIG. 8, a communication method provided in an embodiment of this disclosure is further described below.

FIG. 8 is a flowchart of a communication method according to an embodiment of this disclosure. As shown in FIG. 8, the method may include the following steps.

Step 801: The second device sends a first frame to the first device. Correspondingly, the first device receives the first frame from the second device.

The first frame may be used for channel measurement.

For example, the first frame may be a channel sounding frame, a frame having a trigger function, an NDP, a BRP, or the like. This is not limited in this disclosure.

When the first frame is the frame having the trigger function, the first frame may be a trigger frame, or may be a sensing trigger frame shown in Table 17 below, or another frame having a trigger function. Details are not described herein. When the first frame is the NDP, before sending the NDP to the first device, the second device may further send an NDPA to the first device. When performing channel measurement after receiving the NDP, the first device may perform channel measurement based on related information in the NDPA.

Step 802: The first device determines channel state information based on the first frame.

The first device may perform channel measurement based on the first frame, to obtain the channel state information.

For example, when performing channel measurement, the first device may perform channel measurement based on samples obtained through sampling, to obtain channel state information corresponding to each sample.

For example, a quantity of samples obtained through sampling in a channel measurement process is eight. The first device may perform channel measurement based on the eight samples, to obtain channel state information corresponding to each sample.

A dimension of the channel state information may be $N_r \times N_t \times K$, $N_r$ is a quantity of antennas of the first device, $N_t$ is a quantity of antennas of the second device, K is a quantity of subcarriers that carry the first frame, and $N_r$, $N_t$, and K are all positive integers. The channel state information may include a channel matrix that carries each subcarrier of the first frame.

It should be noted that for descriptions of performing channel measurement on the first device to obtain the channel state information, refer to related descriptions of channel measurement in other approaches. Details are not described herein again.

Step 803: The first device performs conjugate transpose and QR decomposition on the channel state information to obtain an upper right triangular matrix R and a matrix Q.

Because the channel state information may include the channel matrix of each subcarrier that carries the first frame, the first device may remove a CSD from the channel state information, extract channel matrices of some or all subcarriers, and perform conjugate transpose and QR decomposition on the extracted channel matrices of the subcarriers by using the foregoing solution 2, to obtain a matrix R and a matrix Q that correspond to each subcarrier. The matrix Q may also be described as a beamforming matrix corresponding to the subcarrier.

Further, when the first device performs QR decomposition on a conjugate transpose matrix of a channel matrix of a subcarrier to obtain the matrix R and the matrix Q, in the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension.

L is a quantity of target paths between the first device and the second device. The plus or minus signs are the same, and are all plus signs or are all minus signs. The sample is a plurality of pieces of channel state information obtained by performing a plurality of times of channel measurement in a time dimension, and the sample dimension is a sample dimension corresponding to the plurality of pieces of channel state information.

In a first possible design, the matrix Q is a unitary matrix.

When the matrix Q is the unitary matrix, the first column of the matrix Q may reserve a scaled version of the first row in a CSI matrix, where the scaled factor may be a reciprocal of an element at a location of the first row and the first column in the matrix R. In this case, the matrix Q may be used in a beamforming program in the foregoing communication.

In a second possible design, a matrix obtained by normalizing at least one column of the matrix Q is a unitary matrix.

When the matrix Q is the unitary matrix, each beamforming weight is multiplied by a random scaling factor, so that amplitude information cannot be applied to sensing. Based on this, the matrix R may be transformed/specified, so that elements in at least one row and at least one column in the matrix R are 1. In this case, at least one row in the CSI matrix may be completely reserved in at least one column of the obtained matrix Q, to reserve parameter information that can be used for sensing in a phase and to further reserve the original amplitude information that can be used for sensing.

In addition, the unitary matrix may be obtained by normalizing the at least one column of the matrix Q, and the unitary matrix may be further used for precoding of communication.

For example, the matrix R may be transformed/specified, so that an element in the first row and the first column in the matrix R is 1. In this case, the first column of the obtained matrix Q may completely reserve the first row in the CSI matrix. Therefore, the reserved amplitude information may also be further used for sensing. After the first column of the matrix Q is normalized, the matrix Q may be restored to a unitary matrix further used for precoding of communication.

For example, when performing QR decomposition on the conjugate transpose matrix of the channel matrix of the subcarrier to obtain the matrix R and the matrix Q, the first device may perform QR decomposition on the conjugate transpose matrix of the channel matrix of the subcarrier based on a first location and a second location, so that in the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension.

The first location is a location, in the matrix R, of an element that is in the first L rows of the matrix R and that meets that plus or minus signs of elements on a corresponding diagonal are consistent in a subcarrier dimension, and the second location is a location, in the matrix R, of an element that is in the first L rows of the matrix R and that meets that plus or minus signs of elements on a corresponding diagonal are consistent in a sample dimension.

For example, the first device may perform QR decomposition on the conjugate transpose matrix of the channel matrix of the subcarrier based on the first location, so that in the first L rows of the matrix R, a row corresponding to the first location meets that plus or minus signs of elements on a corresponding diagonal are consistent in a subcarrier dimension. Alternatively, the first device may perform QR decomposition on the conjugate transpose matrix of the channel matrix of the subcarrier based on the second location, so that in the first L rows of the matrix R, a row corresponding to the second location meets that plus or minus signs of elements on a corresponding diagonal are consistent in a sample dimension.

Optionally, the first location and the second location may be determined by the second device and sent to the first device, or may be predefined in a protocol, or may be defined by the first device. This is not limited in this disclosure.

It should be noted that when the first location and the second location are defined by the first device, the first device may send information about the first location and information about the second location to the second device, and the second device performs target path sensing based on the first location and the second location.

That at least one row in the first L rows of the matrix R meets that plus or minus signs of elements on a corresponding diagonal are consistent in a subcarrier dimension may also be described as follows. In the first L rows of the matrix R, plus or minus signs of elements on a diagonal of the at least one row are consistent in a subcarrier dimension. That at least one row in the first L rows of the matrix R meets that plus or minus signs of elements on a corresponding diagonal are consistent in a sample dimension may also be described as follows. In the first L rows of the matrix R, plus or minus signs of elements on a diagonal of the at least one row are consistent in a sample dimension.

For example, a quantity L of target paths between the first device and the second device is two, the samples obtained through sampling in the channel measurement process include a sample 1, a sample 2, a sample 3, and a sample 4, and a quantity of subcarriers that carry the first frame is 256. The first device may perform conjugate transpose and QR decomposition on the channel state information of each sample. It is assumed that subcarriers extracted by the first device are a subcarrier 1, a subcarrier 2, . . . , and a subcarrier 64. In this case, the first device may obtain matrices R and matrices Q of 64 subcarriers corresponding to each sample. For each subcarrier, in the first two rows of the four matrices R corresponding to the four samples, plus or minus signs of elements on a diagonal in at least one row are consistent on the current subcarrier. For each sample, in the first two rows of the 64 matrices R corresponding to the 64 subcarriers, plus or minus signs of diagonal elements in at least one row are consistent on the current sample.

For example, the subcarrier 1 is used as an example. It is assumed that in the first two rows of the four matrices R corresponding to the four samples, plus or minus signs of elements on a diagonal in the first row are consistent on the subcarrier 1. That is, plus or minus signs of elements on a diagonal in the first row of the matrix R corresponding to the subcarrier 1 in the sample 1, plus or minus signs of elements on a diagonal in the first row of the matrix R corresponding to the subcarrier 1 in the sample 2, plus or minus signs of elements on a diagonal in the first row of the matrix R corresponding to the subcarrier 1 in the sample 3, and plus or minus signs of elements on a diagonal in the first row of the matrix R corresponding to the subcarrier 1 in the sample 4 are consistent, and both are plus signs, or both are minus signs.

For another example, the sample 1 is used as an example. It is assumed that in the first two rows of the 64 matrices R corresponding to the 64 subcarriers, plus or minus signs of elements on a diagonal in the second row are consistent on the sample 1. That is, plus or minus signs of elements on a diagonal in the second row of the matrix R corresponding to the subcarrier 1 in the sample 1, plus or minus signs of elements on a diagonal in the second row of the matrix R corresponding to the subcarrier 2 in the sample 1, . . . , and plus or minus signs of elements on a diagonal in the second row of the matrix R corresponding to the subcarrier 64 in the sample 1 are consistent, and are all plus signs, or are all minus signs.

It should be noted that when only Doppler shift sensing is performed, for different subcarriers, plus or minus signs corresponding to the subcarriers may be consistent, or may be inconsistent. This is not limited in this disclosure.

Plus or minus signs corresponding to subcarriers are plus or minus signs corresponding to elements on a diagonal in at least one row in the first L rows of the matrix R when the plus or minus signs of the elements on the diagonal in the at least one row are consistent in a subcarrier dimension on the current subcarrier.

For example, the subcarrier 1 is used as an example. It is assumed that in the first L rows of the matrix R corresponding to each sample, plus or minus signs of elements on a diagonal in at least one row are consistent on the subcarrier 1. In this case, the plus or minus signs corresponding to the elements on the diagonal in the at least one row are plus or minus signs corresponding to the subcarrier 1. When the elements on the diagonal in the at least one row correspond to a plus sign, the subcarrier 1 corresponds to a plus sign.

When the elements on the diagonal in the at least one row correspond to a minus sign, the subcarrier 1 corresponds to a minus sign.

For example, different subcarriers are the subcarrier 1 and the subcarrier 2. Plus or minus signs corresponding to the subcarrier 1 may be plus or minus signs corresponding to elements on a diagonal in at least one row in the first L rows of the matrix R corresponding to each sample when the plus or minus signs of the elements on the diagonal in the at least one row are consistent on the subcarrier 1. Plus or minus signs corresponding to the subcarrier 2 may be plus or minus signs corresponding to elements on a diagonal in at least one row in the first L rows of the matrix R corresponding to each sample when the plus or minus signs of the elements on the diagonal in the at least one row are consistent on the subcarrier 2. Plus or minus signs corresponding to the subcarrier 1 and plus or minus signs corresponding to the subcarrier 2 may be consistent, or may be inconsistent. To be specific, both the subcarrier 1 and the subcarrier 2 correspond to plus signs, both the subcarrier 1 and the subcarrier 2 correspond to minus signs, the subcarrier 1 corresponds to a plus sign, and the subcarrier 2 corresponds to a minus sign, or the subcarrier 1 corresponds to a minus sign, and the subcarrier 2 corresponds to a plus sign. This is not limited in this disclosure.

Similarly, when only delay sensing is performed, for different samples, plus or minus signs corresponding to the samples may be consistent, or may be inconsistent. This is not limited in this disclosure.

Plus or minus signs corresponding to samples are plus or minus signs corresponding to elements on a diagonal in at least one row in the first L rows of the matrix R when the plus or minus signs of the elements on the diagonal in the at least one row are consistent in a sample dimension on the current sample.

For example, the sample 1 is used as an example. It is assumed that in the first L rows of the matrix R corresponding to each subcarrier, plus or minus signs of elements on a diagonal in at least one row are consistent on the sample 1. In this case, the plus or minus signs corresponding to the elements on the diagonal in the at least one row are plus or minus signs corresponding to the sample 1. When the elements on the diagonal in the at least one row correspond to a plus sign, the sample 1 corresponds to a plus sign. When the elements on the diagonal in the at least one row correspond to a minus sign, the sample 1 corresponds to a minus sign.

For example, different samples are the sample 1 and the sample 2. Plus or minus signs corresponding to the sample 1 may be plus or minus signs corresponding to elements on a diagonal in at least one row in the first L rows of the matrix R corresponding to each subcarrier when the plus or minus signs of the elements on the diagonal in the at least one row are consistent on the sample 1. Plus or minus signs corresponding to the sample 2 may be plus or minus signs corresponding to elements on a diagonal in at least one row in the first L rows of the matrix R corresponding to each subcarrier when the plus or minus signs of the elements on the diagonal in the at least one row are consistent on the sample 2. Plus or minus signs corresponding to the sample 1 and plus or minus signs corresponding to the sample 2 may be consistent, or may be inconsistent. To be specific, both the sample 1 and the sample 2 correspond to plus signs, both the sample 1 and the sample 2 correspond to minus signs, the sample 1 corresponds to a plus sign, and the sample 2 corresponds to a minus sign, or the sample 1 corresponds to a minus sign, and the sample 2 corresponds to a plus sign. This is not limited in this disclosure.

In addition, in the first L rows of the matrix R, a row in which plus or minus signs of elements on a corresponding diagonal are consistent in a subcarrier dimension and a row in which plus or minus signs of elements on a corresponding diagonal are consistent in a sample dimension may be the same row or different rows. This is not limited in this disclosure.

For example, in the first L rows of the matrix R, one row in which plus or minus signs of elements on a corresponding diagonal are consistent in a subcarrier dimension exists, another row in which plus or minus signs of elements on a corresponding diagonal are consistent in a sample dimension exists, and the one row and the other row may be the same row or different rows. This is not limited in this disclosure.

When the first device performs conjugate transpose and QR decomposition on the channel matrix of the subcarrier by using solution 2, when the matrix R meets subcarrier dimension consistency and sample dimension consistency, the matrix Q may indicate attribute information of the target path.

Subcarrier dimension consistency means that in the first L rows of the matrix R, at least one row meets that plus or minus signs of elements on a corresponding diagonal are consistent in a subcarrier dimension. Sample dimension consistency means that in the first L rows of the matrix R, at least one row meets that plus or minus signs of elements on a corresponding diagonal are consistent in a sample dimension. The target path may be a path between the first device and the second device.

The attribute information of the target path may include one or more of the following: a delay of the target path, an AOD of the target path, or a Doppler shift of the target path.

Step 804: The first device sends the matrix Q to the second device. Correspondingly, the second device receives the matrix Q from the first device.

The matrix Q may also be described as a beamforming matrix. When sending the matrix Q to the second device, the first device may directly send the matrix Q to the second device, or may compress the matrix Q and send a compressed matrix Q to the second device, to reduce feedback overheads.

For example, the first device may compress the matrix Q through Givens rotation to obtain a series of an angle value ¢ and an angle value W, and send, to the second device, the angle value ¢ and the angle value Y that are obtained through compression, to implement compression feedback and reduce feedback overheads.

For descriptions of compressing the matrix Q based on Givens rotation, refer to the related descriptions of compressing the beamforming matrix of the subcarrier through Givens rotation in "5. Givens rotation". Details are not described herein again.

Step 805: The second device performs target path sensing based on the matrix Q.

For example, the second device may perform target path sensing on the received matrix Q based on the first location and the second location, to obtain the attribute information of the target path.

The first location may be a location, in the matrix R, of an element that is in the first L rows of the matrix R and that meets that plus or minus signs of elements on a corresponding diagonal are consistent in a subcarrier dimension, and the second location may be a location, in the matrix R, of an element that is in the first L rows of the matrix R and that meets that plus or minus signs of elements on a corresponding diagonal are consistent in a sample dimension.

The first location and the second location may be a same location, or may be different locations. This is not limited in this disclosure.

For example, when an element that meets that plus or minus signs of elements on a corresponding diagonal are consistent in a subcarrier dimension in the first L rows of the matrix R is an element on a diagonal in the first row of the matrix R, the first location may be (1, 1). When an element that meets that plus or minus signs of elements on a corresponding diagonal are consistent in a sample dimension in the first L rows of the matrix R is an element on a diagonal in the first row of the matrix R, the second location may be (1, 1). Alternatively, when an element that meets that plus or minus signs of elements on a corresponding diagonal are consistent in a sample dimension in the first L rows of the matrix R is an element on a diagonal in the second row of the matrix R, the second location may be (2, 2).

Optionally, the first location and the second location may be determined by the second device, or may be predefined in a protocol, or may be defined by the first device. This is not limited in this disclosure.

It should be noted that when the first location and the second location are determined by the second device, the second device may send the information about the first location and the information about the second location to the first device before the first device performs channel measurement, and the first device processes the channel state information based on the first location and the second location to obtain the matrix Q.

When the first location and the second location are defined by the first device, the first device may send the information about the first location and the information about the second location to the second device, and the second device performs target path sensing based on the first location and the second location.

For example, when performing target path sensing based on the matrix Q, the second device may select, based on the first location and the second location, a corresponding column in the matrix Q to perform angle sensing, perform delay sensing in a subcarrier dimension, and perform Doppler shift sensing in a sample dimension.

For example, the second device may perform target path sensing based on the matrix Q by using one or more of the following method 1 to method 4, to obtain the attribute information of the target path.

Method 1: The second device may select, based on the first location, a column in which an element at the first location in the matrix Q is located, to perform angle sensing.

The second device may select any subcarrier, and extract, in a sample dimension, a column in which an element at a first location in a matrix Q corresponding to the subcarrier in each sample is located, to form a signal matrix whose dimension is T×S, where T indicates a quantity of transmit antennas, or may be described as a quantity of antennas of the second device, and S indicates a quantity of samples. The second device may perform angle sensing based on the signal matrix by using a parameter estimation algorithm, to obtain the AOD of the target path.

The parameter estimation algorithm may be an algorithm that can perform parameter estimation, for example, a MUSIC algorithm.

For example, the first location is (1, 1). The column in which the element at the first location is located is the first column. The second device may select any subcarrier, and extract, in a sample dimension, elements in the first column of the matrix Q corresponding to the subcarrier in each sample, to form a signal matrix whose dimension is T×S, to implement angle sensing.

Method 2: The second device may select, based on the second location, a column in which an element at the second location in the matrix Q is located, to perform angle sensing.

The second device may select any sample, and extract, in a subcarrier dimension, a column in which an element at the second location in the matrix Q corresponding to each subcarrier in the sample is located, to form a signal matrix whose dimension is T×K, where T indicates a quantity of transmit antennas, or may be described as a quantity of antennas of the second device, and K indicates a quantity of subcarriers. The second device may perform angle sensing based on the signal matrix by using a parameter estimation algorithm, to obtain the AOD of the target path.

The parameter estimation algorithm may be an algorithm that can perform parameter estimation, for example, a MUSIC algorithm.

For example, the second location is (1, 1). The column in which the element at the second location is located is the first column. The second device may select any sample, and extract, in a subcarrier dimension, elements in the first column of the matrix Q corresponding to each subcarrier in the sample, to form a signal matrix whose dimension is T×K, to implement angle sensing.

Method 3: The second device may select, based on the first location, a column in which an element at the first location in the matrix Q is located, to perform Doppler shift sensing in a sample dimension.

The second device may select any subcarrier, and extract, in a sample dimension, a column in which an element at a first location in a matrix Q corresponding to the subcarrier in each sample is located, to form a signal matrix whose dimension is S×T, where S indicates a quantity of samples, and T indicates a quantity of transmit antennas, or may be described as a quantity of antennas of the second device. The second device may perform Doppler shift sensing based on the signal matrix by using a parameter estimation algorithm, to obtain the Doppler shift of the target path.

The parameter estimation algorithm may be an algorithm that can perform parameter estimation, for example, a MUSIC algorithm.

For example, the first location is (1, 1). The column in which the element at the first location is located is the first column. The second device may select any subcarrier, and extract, in a sample dimension, elements in the first column of the matrix Q corresponding to the subcarrier in each sample, to form a signal matrix whose dimension is S×T, to implement Doppler shift sensing.

Method 4: The second device may select, based on the second location, a column in which an element at the second location in the matrix Q is located, to perform delay sensing in a subcarrier dimension.

The second device may select any sample, and extract, in a subcarrier dimension, a column in which an element at the second location in the matrix Q corresponding to each subcarrier in the sample is located, to form a signal matrix whose dimension is K×T, where K indicates a quantity of subcarriers, and T indicates a quantity of transmit antennas, or may be described as a quantity of antennas of the second device. The second device may perform delay sensing based on the signal matrix by using a parameter estimation algorithm, to obtain the delay of the target path.

The parameter estimation algorithm may be an algorithm that can perform parameter estimation, for example, a MUSIC algorithm.

For example, the second location is (1, 1). The column in which the element at the second location is located is the first column. The second device may select any sample, and extract, in a subcarrier dimension, elements in the first column of the matrix Q corresponding to each subcarrier in the sample, to form a signal matrix whose dimension is K×T, to implement delay sensing.

It should be noted that delay information and Doppler shift information are carried on a plurality of subcarriers and a plurality of samples respectively. To ensure that the delay information and the Doppler shift information are correctly reserved, when the first device performs conjugate transpose and QR decomposition on the channel state information, in the first L rows of the matrix R, at least one row needs to meet that plus or minus signs of elements on a corresponding diagonal are consistent in a subcarrier dimension, and at least one row needs to meet that plus or minus signs of elements on a corresponding diagonal are consistent in a sample dimension. In this case, the second device may obtain the delay information and the Doppler shift information based on the corresponding matrix Q.

It may be understood that to ensure that the delay information is correctly reserved, when the first device performs conjugate transpose and QR decomposition on the channel state information, in the first L rows of the matrix R, at least one row needs to meet that plus or minus signs of elements on a corresponding diagonal are consistent in a subcarrier dimension. In this case, the second device may obtain the delay information based on the corresponding matrix Q. In this case, in the first L rows of the matrix R obtained by the first device through decomposition, that "at least one row meets that plus or minus signs of elements on a corresponding diagonal are consistent in a sample dimension" may be met, or that "at least one row meets that plus or minus signs of elements on a corresponding diagonal are consistent in a sample dimension" may not be met.

To ensure that the Doppler shift information is correctly reserved, when the first device performs conjugate transpose and QR decomposition on the channel state information, in the first L rows of the matrix R, at least one row needs to meet that plus or minus signs of elements on a corresponding diagonal are consistent in a sample dimension. In this case, the second device may obtain the Doppler shift information based on the corresponding matrix Q. In this case, in the first L rows of the matrix R obtained by the first device through decomposition, that "at least one row meets that plus or minus signs of elements on a corresponding diagonal are consistent in a subcarrier dimension" may be met, or that "at least one row meets that plus or minus signs of elements on a corresponding diagonal are consistent in a subcarrier dimension" may not be met.

In addition, based on the foregoing description of angle sensing in step 805, it may be learned that the second device may perform angle sensing in a sample dimension, or may perform angle sensing in a subcarrier dimension.

Optionally, the second device may further use the matrix Q as a precoding matrix, precode a signal sent to the first device, and send a precoded signal to the first device.

Based on the communication method shown in FIG. 8, the first device may perform conjugate transpose and QR decomposition on the channel state information to obtain the matrix Q and the upper right triangular matrix R, and send the matrix Q to the second device. The second device may perform target path sensing based on the matrix Q. In the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension. Correspondingly, the matrix Q obtained through QR decomposition of the matrix R may indicate the attribute information of the target path. In other words, the attribute information such as the delay, the AOD, and the Doppler shift of the target path may be reserved in the matrix Q. The second device may determine the attribute information of the target path based on the matrix Q, to implement effective sensing on the target path based on a channel matrix diagonalization principle.

FIG. 8 mainly describes a process in which the first device performs channel measurement and feeds back the matrix Q, and the second device performs target path sensing based on the matrix Q. Optionally, before the first device performs channel measurement, the first device may send first indication information to the second device.

The first indication information indicates whether the first device supports one or more of the following feedbacks: feedback of a compressed beamforming matrix based on subcarrier dimension consistency or feedback of a compressed beamforming matrix based on sample dimension consistency.

When the first device supports feedback of the compressed beamforming matrix based on subcarrier dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a subcarrier dimension. When feeding back the matrix Q to the second device, the first device feeds back the compressed matrix Q to the second device.

When the first device supports feedback of the compressed beamforming matrix based on sample dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a sample dimension. When feeding back the matrix Q to the second device, the first device feeds back the compressed matrix Q to the second device.

When the first device supports feedback of the compressed beamforming matrix based on subcarrier dimension consistency and feedback of the compressed beamforming matrix based on sample dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension. When feeding back the matrix Q to the second device, the first device feeds back the compressed matrix Q to the second device.

The following describes a frame structure of the first indication information by using a low frequency scenario as an example.

Figure 9:
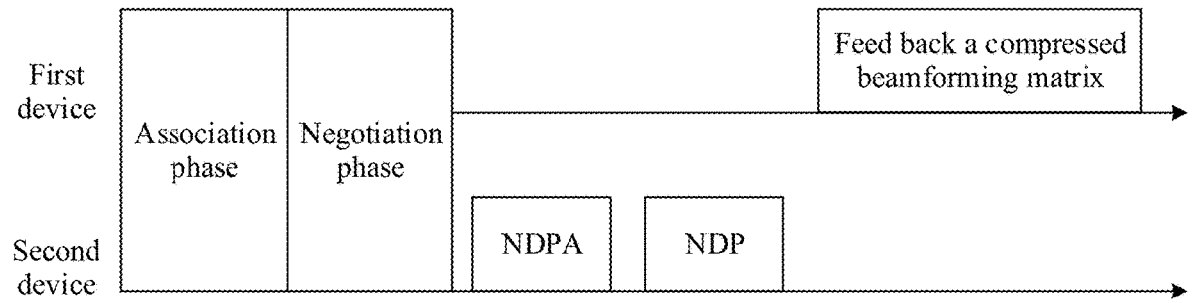
FIG. 9 is a typical flowchart of low-frequency communication according to an embodiment of this disclosure.

FIG. 9 is a typical flowchart of low frequency communication. As shown in FIG. 9, a communication process may include an association phase, a negotiation phase, a measurement phase, and a feedback phase. In the association phase, the first device and the second device may exchange information such as device information and a basic capability. In the negotiation phase, the first device and the second device may negotiate a subsequent sensing parameter, and set a measurement bandwidth, a period, a direction, and the like of the first device and the second device. In the measurement phase, the second device may send the NDPA and the NDP to the first device, and the first device may perform channel measurement after receiving the NDP. In the feedback phase, the first device may feed back the compressed beamforming matrix to the second device.

In a possible design, the first device includes the first indication information in a sensing capability field, and sends the sensing capability field to the second device in the association phase.

That is, in the association phase, the first device may send the sensing capability field to the second device, where the sensing capability field may include the first indication information.

For example, the first device may set a bit value of the first indication information to different values, to indicate whether the first device supports one or more of the foregoing feedbacks. For example, the first indication information is one bit. The bit may be set to 0 to indicate that the first device supports one or more of the foregoing feedbacks, or the bit may be set to 1 to indicate that the first device does not support one or more of the foregoing feedbacks. Alternatively, as shown in the following Table 6, the bit is set to 1 to indicate that the first device supports one or more of the foregoing feedbacks, or the bit is set to 0 to indicate that the first device does not support one or more of the foregoing feedbacks.

TABLE 6

Example of a bit of the first indication information in the sensing capability field

| Bit | Meaning (or referred to as information, description, or the like) |
|---|---|
| x | When the bit is set to 1, it indicates that one or more of the following feedbacks are supported: feedback of the compressed beamforming matrix based on subcarrier dimension consistency or feedback of the compressed beamforming matrix based on sample dimension consistency. When the bit is set to 0, it indicates that one or more of the following feedbacks are not supported: feedback of the compressed beamforming matrix based on subcarrier dimension consistency or feedback of the compressed beamforming matrix based on sample dimension consistency. |

The first indication information may occupy one bit, for example, an $x^{th}$ bit in the sensing capability field shown in Table 6. Alternatively, the first indication information may occupy a plurality of bits. This is not limited in this disclosure.

Optionally, the first device may include the sensing capability field in an association request frame or another related frame that may carry the sensing capability field, and send the association request frame or the other related frame to the second device. This is not limited in embodiments of this disclosure.

The following describes a frame structure of the first indication information by using a high frequency scenario as an example.

Figure 10:
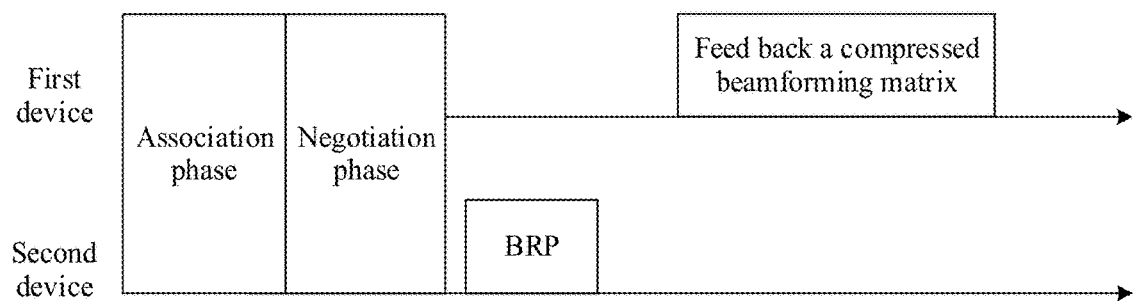
FIG. 10 is a typical flowchart of high-frequency communication according to an embodiment of this disclosure.

FIG. 10 is a typical flowchart of high frequency communication. As shown in FIG. 10, a communication process may include an association phase, a negotiation phase, a measurement phase, and a feedback phase. In the association phase, the first device and the second device may exchange information such as device information and a basic capability. In the negotiation phase, the first device and the second device may negotiate a subsequent sensing parameter, and set a measurement bandwidth, a period, a direction, and the like of the first device and the second device. In the measurement phase, the second device may send the BRP to the first device, and the first device may perform channel measurement after receiving the BRP. In the feedback phase, the first device may feed back the compressed beamforming matrix to the second device.

In the association phase, the first device may send the EDMG sensing capability field to the second device, where the EDMG sensing capability field may include the first indication information.

For example, the first device may set a bit value of the first indication information to different values, to indicate whether the first device supports one or more of the foregoing feedbacks. For example, the first indication information is one bit. The bit may be set to 0 to indicate that the first device supports one or more of the foregoing feedbacks, or the bit may be set to 1 to indicate that the first device does not support one or more of the foregoing feedbacks. Alternatively, as shown in the following Table 7, the bit is set to 1 to indicate that the first device supports one or more of the foregoing feedbacks, or the bit is set to 0 to indicate that the first device does not support one or more of the foregoing feedbacks.

TABLE 7

Example of a bit of the first indication information in the EDMG sensing capability field

| Bit | Meaning |
|---|---|
| x | When the bit is set to 1, it indicates that one or more of the following feedbacks are supported: feedback of the compressed beamforming matrix based on subcarrier dimension consistency or feedback of the compressed beamforming matrix based on sample dimension consistency. When the bit is set to 0, it indicates that one or more of the following feedbacks are not supported: feedback of the compressed beamforming matrix based on subcarrier dimension consistency or feedback of the compressed beamforming matrix based on sample dimension consistency. |

The first indication information may occupy one bit, for example, an $x^{th}$ bit in the EDMG sensing capability field shown in Table 7. Alternatively, the first indication information may occupy a plurality of bits. This is not limited in this disclosure.

Figure 11:
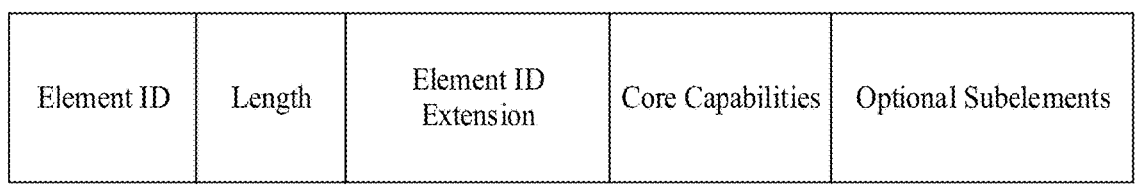
FIG. 11 is a diagram of a frame structure of an EDMG sensing capability field according to an embodiment of this disclosure.

Optionally, as shown in FIG. 11, the first device may include the first indication information in a core capabilities field of the EDMG sensing capability field or an optional subelements field of the EDMG sensing capability field, and send the core capabilities field or the optional subelements field to the second device. This is not limited in embodiments of this disclosure.

When the first indication information is carried in the core capabilities field of the EDMG sensing capability field, a reserved bit of the core capabilities field may indicate the first indication information.

When the first indication information is carried in the optional subelements field of the EDMG sensing capability field, as shown in the following Table 8, a new field may be designed to carry the first indication information. For example, the new field is named as a subelement (subelement) field of a sensing capability (sensing capability). The new field may alternatively have another name. This is not limited in embodiments of this disclosure.

TABLE 8

Optional subelements field

| Subelement ID | Name | Extensible |
|---|---|---|
| 0 | Beamforming capability | Yes |
| 1 | Antenna polarization capability | Yes |
| ... | | |
| 4 | MAC capability | Yes |
| 5 | Sensing capability | Yes |
| 6-255 | Reserved | |

Optionally, in the high frequency scenario, a new field may be further designed. The field may carry a plurality of types of capability indication information (for example, the first indication information) related to sensing, and the field may be a capability element field (for example, the sensing capability field (sensing capability element)).

Optionally, when sending the first indication information to the second device, the first device may further send seventh indication information to the second device.

The seventh indication information may indicate whether the first device supports feedback of a compressed beamforming matrix based on singular value decomposition (SVD).

When the first device supports feedback of the compressed beamforming matrix based on SVD, the first device may perform eigenvalue decomposition on a covariance matrix of a channel matrix of a subcarrier, to obtain an eigenvector matrix and an eigenvalue matrix, and the beamforming matrix is determined based on the channel matrix, the eigenvector matrix, and the eigenvalue matrix that are of the subcarrier. The beamforming matrix may indicate the attribute information of the target path. The first device may send the compressed beamforming matrix to the second device.

For SVD, to ensure that delay information and Doppler information are correctly reserved, when SVD is performed on channel matrices corresponding to different subcarriers in different first frames, elements at a same location need to be selected as reference items when column vectors in the eigenvector matrix are calculated. For example, assuming that an $a^{th}$ element in a first column vector in the eigenvector matrix is used as a reference item, for another column vector, an $a^{th}$ element should also be selected as a reference item. In addition, a same value needs to be assigned to these reference items. For example, first elements of all column vectors in the eigenvector matrix may be used as reference items, and 1 is assigned to the first elements, to solve the column vectors in the eigenvector matrix.

The assigning a same value to the reference items may also be described as assigning a same plus or minus sign to the reference items.

The following describes frame structures of the first indication information and the seventh indication information by using a low frequency scenario as an example.

In a possible design, the first device includes the first indication information and the seventh indication information in a sensing capability field, and sends the sensing capability field to the second device in the association phase.

For example, the first device may set a bit value of the seventh indication information to different values, to indicate whether the first device supports feedback of the compressed beamforming matrix based on SVD. For example, the seventh indication information is one bit. The bit may be set to 0 to indicate that the first device supports feedback of the compressed beamforming matrix based on SVD, or the bit may be set to 1 to indicate that the first device does not support feedback of the compressed beamforming matrix based on SVD. Alternatively, as shown in the following Table 9, the bit is set to 1 to indicate that the first device supports feedback of the compressed beamforming matrix based on SVD, or the bit is set to 0 to indicate that the first device does not support feedback of the compressed beamforming matrix based on SVD.

TABLE 9

Example of bits of the first indication information and the seventh indication information in the sensing capability field

| Bit | Meaning |
|---|---|
| x | When the bit is set to 1, it indicates that one or more of the following feedbacks are supported: feedback of the compressed beamforming matrix based on subcarrier dimension consistency or feedback of the compressed beamforming matrix based on sample dimension consistency. When the bit is set to 0, it indicates that one or more of the following feedbacks are not supported: feedback of the compressed beamforming matrix based on subcarrier dimension consistency or feedback of the compressed beamforming matrix based on sample dimension consistency. |
| x + 1 | When the bit is set to 1, it indicates that feedback of the compressed beamforming matrix based on SVD is supported. When the bit is set to 0, it indicates that feedback of the compressed beamforming matrix based on SVD is not supported. |

The first indication information may occupy one bit, for example, an $x^{th}$ bit in the sensing capability field shown in Table 9. The seventh indication information may occupy one bit, for example, an $(x+1)^{th}$ bit in the sensing capability field shown in Table 9. Alternatively, the first indication information may occupy a plurality of bits, and the seventh indication information may occupy a plurality of bits. This is not limited in this disclosure.

Optionally, the first device may include the sensing capability field in an association request frame or another related frame that may carry the sensing capability field, and send the association request frame or the other related frame to the second device. This is not limited in this disclosure.

The following describes frame structures of the first indication information and the seventh indication information by using a high frequency scenario as an example.

In the association phase, the first device may send the EDMG sensing capability field to the second device, where the EDMG sensing capability field may include the first indication information and the seventh indication information.

For example, the first device may set a bit value of the seventh indication information to different values, to indicate whether the first device supports feedback of the compressed beamforming matrix based on SVD. For example, the seventh indication information is one bit. The bit may be set to 0 to indicate that the first device supports feedback of the compressed beamforming matrix based on SVD, or the bit may be set to 1 to indicate that the first device does not support feedback of the compressed beamforming matrix based on SVD. Alternatively, as shown in the following Table 10, the bit is set to 1 to indicate that the first device supports feedback of the compressed beamforming matrix based on SVD, or the bit is set to 0 to indicate that the first device does not support feedback of the compressed beamforming matrix based on SVD.

TABLE 10

Example of bits of the first indication information and the seventh
indication information in the EDMG sensing capability field

| Bit | Meaning |
|---|---|
| x | When the bit is set to 1, it indicates that one or more of the following feedbacks are supported: feedback of the compressed beamforming matrix based on subcarrier dimension consistency or feedback of the compressed beamforming matrix based on sample dimension consistency. When the bit is set to 0, it indicates that one or more of the following feedbacks are not supported: feedback of the compressed beamforming matrix based on subcarrier dimension consistency or feedback of the compressed beamforming matrix based on sample dimension consistency. |
| x + 1 | When the bit is set to 1, it indicates that feedback of the compressed beamforming matrix based on SVD is supported. When the bit is set to 0, it indicates that feedback of the compressed beamforming matrix based on SVD is not supported. |

The first indication information may occupy one bit, for example, an $x^{th}$ bit in the EDMG sensing capability field shown in Table 10. The seventh indication information may occupy one bit, for example, an $(x+1)^{th}$ bit in the EDMG sensing capability field shown in Table 10. Alternatively, the first indication information may occupy a plurality of bits, and the seventh indication information may occupy a plurality of bits. This is not limited in this disclosure.

Optionally, as shown in FIG. 11, the first device may include the first indication information and the seventh indication information in a core capabilities field of the EDMG sensing capability field or an optional subelements field of the EDMG sensing capability field, and send the core capabilities field or the optional subelements field to the second device. This is not limited in this disclosure.

When the first indication information and the seventh indication information are carried in the core capabilities field of the EDMG sensing capability field, a reserved bit of the core capabilities field may indicate the first indication information.

When the first indication information and the seventh indication information are carried in the EDMG sensing capability field, as shown in Table 8, the first indication information and the seventh indication information may be carried in the subelement field of the sensing capability.

Optionally, in the high frequency scenario, a field may be further designed and may carry a plurality of types of capability indication information (for example, the first indication information and the seventh indication information) related to sensing, and the field may be a capability element field (for example, the sensing capability field (sensing capability element)).

Optionally, before the first device performs channel measurement, the first device may further send eighth indication information to the second device, where the eighth indication information may indicate whether the first device supports feedback of a compressed beamforming matrix for implementing sensing.

When the first device supports feedback of the compressed beamforming matrix for implementing sensing, the first device may feed back the compressed beamforming matrix to the second device by using the method shown in FIG. 8, or the first device may feed back the compressed beamforming matrix to the second device based on SVD.

The following describes a frame structure of the eighth indication information by using a low frequency scenario as an example.

In a possible design, the first device includes the eighth indication information in a sensing capability field, and sends the sensing capability field to the second device in the association phase.

In the association phase, the first device may send the sensing capability field to the second device, where the sensing capability field may include the eighth indication information.

For example, the first device may set a bit value of the eighth indication information to different values, to indicate whether the first device supports feedback of the compressed beamforming matrix for implementing sensing. For example, the eighth indication information is one bit. The bit may be set to 0 to indicate that the first device supports feedback of the compressed beamforming matrix for implementing sensing, or the bit may be set to 1 to indicate that the first device does not support feedback of the compressed beamforming matrix for implementing sensing. Alternatively, as shown in the following Table 11, the bit is set to 1 to indicate that the first device supports feedback of the compressed beamforming matrix for implementing sensing, or the bit is set to 0 to indicate that the first device does not support feedback of the compressed beamforming matrix for implementing sensing.

TABLE 11

Example of a bit of the eighth indication information
in the sensing capability field

| Bit | Meaning |
|---|---|
| x | When the bit is set to 1, it indicates that feedback of the compressed beamforming matrix for implementing sensing is supported. When the bit is set to 0, it indicates that feedback of the compressed beamforming matrix for implementing sensing is not supported. |

The eighth indication information may occupy one bit, for example, an $x^{th}$ bit in the sensing capability field shown in Table 11. Alternatively, the eighth indication information may occupy a plurality of bits. This is not limited in this disclosure.

Optionally, the first device may include the sensing capability field in an association request frame or another related frame that may carry the sensing capability field, and send the association request frame or the other related frame to the second device. This is not limited in this disclosure.

The following describes a frame structure of the eighth indication information by using a high frequency scenario as an example.

In the association phase, the first device may send the EDMG sensing capability field to the second device, where the EDMG sensing capability field may include the eighth indication information.

For example, the first device may set a bit value of the eighth indication information to different values, to indicate whether the first device supports feedback of the compressed beamforming matrix for implementing sensing. For example, the eighth indication information is one bit. The bit may be set to 0 to indicate that the first device supports feedback of the compressed beamforming matrix for implementing sensing, or the bit may be set to 1 to indicate that the first device does not support feedback of the compressed beamforming matrix for implementing sensing. Alternatively, as shown in the following Table 12, the bit is set to 1 to indicate that the first device supports feedback of the compressed beamforming matrix for implementing sensing, or the bit is set to 0 to indicate that the first device does not support feedback of the compressed beamforming matrix for implementing sensing.

TABLE 12

Example of a bit of the eighth indication information in the EDMG sensing capability field

| Bit | Meaning |
|---|---|
| x | When the bit is set to 1, it indicates that feedback of the compressed beamforming matrix for implementing sensing is supported. When the bit is set to 0, it indicates that feedback of the compressed beamforming matrix for implementing sensing is not supported. |

The eighth indication information may occupy one bit, for example, an $x^{th}$ bit in the EDMG sensing capability field shown in Table 12. Alternatively, the eighth indication information may occupy a plurality of bits. This is not limited in this disclosure.

Optionally, as shown in FIG. 11, the first device may include the eighth indication information in a core capabilities field of the EDMG sensing capability field or an optional subelements field of the EDMG sensing capability field, and send the core capabilities field or the optional subelements field to the second device. This is not limited in this disclosure.

When the eighth indication information is carried in the core capabilities field of the EDMG sensing capability field, a reserved bit of the core capabilities field may indicate the eighth indication information.

When the eighth indication information is carried in the optional subelements field of the EDMG sensing capability field, the eighth indication information may be carried in the subelement field of the sensing capability.

Optionally, in the high frequency scenario, a field may be further designed and carry a plurality of types of capability indication information (for example, the eighth indication information) related to sensing, and the field may be a capability element field (for example, the sensing capability field (sensing capability element)).

Optionally, the second device may send second indication information to the first device.

The second indication information indicates whether the second device supports one or more of the following feedbacks: feedback of a compressed beamforming matrix based on subcarrier dimension consistency or feedback of a compressed beamforming matrix based on sample dimension consistency.

It should be noted that for descriptions of the foregoing one or more types of feedbacks, refer to the descriptions of the foregoing one or more types of feedbacks in the first indication information. Details are not described herein again.

The second device may send the second indication information to the first device in the association phase. When the second device performs channel measurement and feeds back channel state information to the first device, if the second device supports the foregoing one or more of feedbacks, the second device may perform channel measurement through the action performed by the first device in FIG. 8, and feed back the compressed beamforming matrix to the first device. The first device may perform target path sensing through the action performed by the second device in FIG. 8.

The following describes a frame structure of the second indication information by using a low frequency scenario as an example.

In a possible design, the second device includes the second indication information in a sensing capability field, and sends the sensing capability field to the first device in the association phase.

For descriptions of carrying the second indication information in the sensing capability field, refer to the foregoing descriptions of carrying the first indication information in the sensing capability field. Details are not described herein again.

Optionally, the second device may include the sensing capability field in an association response frame, a beacon frame, or another related frame that may carry the sensing capability field, and send the association response frame, the beacon frame, or the other related frame to the first device. This is not limited in this disclosure.

The following describes a frame structure of the second indication information by using a high frequency scenario as an example.

In the association phase, the second device may send the EDMG sensing capability field to the first device, where the EDMG sensing capability field may include the second indication information.

For descriptions that the EDMG sensing capability field includes the second indication information, refer to the related descriptions that the EDMG sensing capability field includes the first indication information. Details are not described herein again.

Optionally, as shown in FIG. 11, the second device may include the second indication information in a core capabilities field of the EDMG sensing capability field or an optional subelements field of the EDMG sensing capability field, and send the core capabilities field or the optional subelements field to the first device. This is not limited in this disclosure.

When the second indication information is carried in the core capabilities field of the EDMG sensing capability field, a reserved bit of the core capabilities field may indicate the second indication information.

When the second indication information is carried in the optional subelements field of the EDMG sensing capability field, as shown in Table 8, the second indication information may be carried in the subelement field of the sensing capability.

Optionally, in the high frequency scenario, a field may be further designed and carry a plurality of types of capability indication information (for example, the second indication information) related to sensing, and the field may be a capability element field (for example, the sensing capability field (sensing capability element)).

Optionally, when sending the second indication information to the first device, the second device may further send ninth indication information to the first device.

The ninth indication information may indicate whether the second device supports feedback of the compressed beamforming matrix based on SVD.

For descriptions of feedback of the compressed beamforming matrix based on SVD, refer to the descriptions of feedback of the compressed beamforming matrix based on SVD in the seventh indication information. Details are not described herein again.

The following describes frame structures of the second indication information and the ninth indication information by using a low frequency scenario as an example.

In a possible design, the second device includes the second indication information and the ninth indication information in a sensing capability field, and sends the sensing capability field to the second device in the association phase.

For descriptions of carrying the second indication information and the ninth indication information in the sensing capability field, refer to the descriptions of carrying the first indication information and the seventh indication information in the sensing capability field. Details are not described herein again.

Optionally, the second device may include the sensing capability field in an association response frame, a beacon frame, or another related frame that may carry the sensing capability field, and send the association response frame, the beacon frame, or the other related frame to the first device. This is not limited in this disclosure.

The following describes frame structures of the second indication information and the ninth indication information by using a high frequency scenario as an example.

In the association phase, the second device may send the EDMG sensing capability field to the first device, where the EDMG sensing capability field may include the second indication information and the ninth indication information.

For descriptions that the EDMG sensing capability field includes the second indication information and the ninth indication information, refer to the descriptions that the EDMG sensing capability field includes the first indication information and the seventh indication information. Details are not described herein again.

Optionally, as shown in FIG. 11, the second device may include the second indication information and the ninth indication information in a core capabilities field of the EDMG sensing capability field or an optional subelements field of the EDMG sensing capability field, and send the core capabilities field or the optional subelements field to the first device. This is not limited in this disclosure.

When the second indication information and the ninth indication information are carried in the core capabilities field of the EDMG sensing capability field, a reserved bit in the core capabilities field may indicate the second indication information.

When the second indication information and the ninth indication information are carried in the EDMG sensing capability field, as shown in Table 8, the second indication information and the ninth indication information may be carried in the subelement field of the sensing capability.

Optionally, in the high frequency scenario, a field may be further designed and carry a plurality of types of capability indication information (for example, the second indication information and the ninth indication information) related to sensing, and the field may be a capability element field (for example, the sensing capability field (sensing capability element)).

Optionally, the second device may further send tenth indication information to the first device, where the tenth indication information may indicate whether the second device supports feedback of a compressed beamforming matrix for implementing sensing.

For descriptions about whether the second device supports feedback of the compressed beamforming matrix for implementing sensing, refer to the descriptions about whether the first device supports feedback of the compressed beamforming matrix for implementing sensing in the eighth indication information. Details are not described herein again.

The following describes a frame structure of the tenth indication information by using a low frequency scenario as an example.

In a possible design, the second device includes the tenth indication information in a sensing capability field, and sends the sensing capability field to the first device in the association phase.

For descriptions of carrying the tenth indication information in the sensing capability field, refer to the descriptions of carrying the eighth indication information in the sensing capability field. Details are not described herein again.

Optionally, the second device may include the sensing capability field in an association response frame, a beacon frame, or another related frame that may carry the sensing capability field, and send the association response frame, the beacon frame, or the other related frame to the first device. Details are not described herein again.

The following describes a frame structure of the tenth indication information by using a high frequency scenario as an example.

In the association phase, the second device may send the EDMG sensing capability field to the first device, where the EDMG sensing capability field may include the tenth indication information.

For descriptions that the EDMG sensing capability field includes the tenth indication information, refer to the descriptions that the EDMG sensing capability field includes the eighth indication information. Details are not described herein again.

Optionally, as shown in FIG. 11, the second device may include the tenth indication information in a core capabilities field of the EDMG sensing capability field or an optional subelements field of the EDMG sensing capability field, and send the core capabilities field or the optional subelements field to the first device. This is not limited in this disclosure.

When the tenth indication information is carried in the core capabilities field of the EDMG sensing capability field, a reserved bit of the core capabilities field may indicate the tenth indication information.

When the tenth indication information is carried in the optional subelements field of the EDMG sensing capability field, the tenth indication information may be carried in the subelement field of the sensing capability.

Optionally, in the high frequency scenario, a field may be further designed. The field may carry a plurality of types of capability indication information (for example, the tenth indication information) related to sensing. For example, the field may be a capability element field (for example, the sensing capability field (sensing capability element)).

Optionally, before the first device performs channel measurement, the second device may send a sensing request frame to the first device.

The sensing request frame may include a feedback type indication. The feedback type indication may indicate to feed back channel state information for implementing sensing.

When the feedback type indication indicates to feed back the channel state information for implementing sensing, the first device may feed back the compressed beamforming matrix to the second device by using the method described in FIG. 8, and the second device may perform sensing based on the received compressed beamforming matrix.

The following describes a frame structure of the sensing request frame by using a low frequency scenario as an example. A frame structure of the sensing request frame in a high frequency scenario is similar to that in the low frequency scenario. Details are not described herein again.

The second device may send the sensing request frame to the first device in the negotiation phase. The sensing request frame may include a feedback type indication field. The feedback type indication field may also be described as a sensing feedback type subfield. As shown in Table 13, the sensing feedback type subfield may be set to 00 to indicate to feed back the channel state information for implementing sensing, or the sensing feedback type subfield may be set to one of 01 to 11 to indicate another feedback type.

TABLE 13

| Sensing feedback type subfield | |
|---|---|
| Bit | Meaning |
| 00 | Indicating to feed back the compressed beamforming matrix for implementing sensing |
| 01-11 | Feedback type in other WLAN sensing |

Table 13 is merely an example for description. A specific value of a bit occupied by the sensing feedback type subfield and a quantity of occupied bits are not limited in embodiments of this disclosure. For example, the sensing feedback type subfield may alternatively be set to 01 to indicate to feed back the channel state information for implementing sensing, or the sensing feedback type subfield may be set to one of 00, 10, or 11 to indicate another feedback type. Alternatively, the sensing feedback type subfield may be set to 10 to indicate to feed back the channel state information for implementing sensing, or the sensing feedback type subfield may be set to one of 00, 01, or 11 to indicate another feedback type or the like. This is not limited in this disclosure.

It should be noted that the sensing request frame may also be described as a measurement setup request frame, or may be described as a sensing setup request frame. This is not limited in this disclosure.

Optionally, before the first device performs channel measurement, the first device may send a sensing response frame to the second device.

The sensing response frame may include a feedback type indication. The feedback type indication may indicate to feed back the channel state information for implementing sensing.

When the feedback type indication indicates to feed back the channel state information for implementing sensing, the first device may feed back the compressed beamforming matrix to the second device by using the method described in FIG. 8, and the second device may perform sensing based on the received compressed beamforming matrix.

The following describes a frame structure of the sensing response frame by using a low frequency scenario as an example. A frame structure of the sensing response frame in a high frequency scenario is similar to that in the low frequency scenario. Details are not described herein again.

The first device may send the sensing response frame to the second device in the negotiation phase. The sensing response frame may include a feedback type indication field shown in Table 13. The feedback type indication field may also be described as a sensing feedback type subfield. As shown in Table 13, the feedback type indication field may be set to 00 to indicate to feed back the channel state information for implementing sensing, or the feedback type indication field may be set to one of 01 to 11 to indicate another feedback type.

Table 13 is merely an example for description. A specific value of a bit occupied by the sensing feedback type subfield and a quantity of occupied bits are not limited in embodiments of this disclosure. For example, the sensing feedback type subfield may alternatively be set to 01 to indicate to feed back the channel state information for implementing sensing, or the sensing feedback type subfield may be set to one of 00, 10, or 11 to indicate another feedback type. Alternatively, the sensing feedback type subfield may be set to 10 to indicate to feed back the channel state information for implementing sensing, or the sensing feedback type subfield may be set to one of 00, 01, or 11 to indicate another feedback type or the like. This is not limited in this disclosure.

It should be noted that the sensing response frame may also be described as a measurement setup response frame, or may be described as a sensing setup response frame. This is not limited in this disclosure.

Optionally, before the first device performs channel measurement, the second device may send third indication information to the first device.

The third indication information may indicate to use one or more of the following feedbacks: feedback of a compressed beamforming matrix based on subcarrier dimension consistency or feedback of a compressed beamforming matrix based on sample dimension consistency.

When the third indication information indicates to use feedback of the compressed beamforming matrix based on subcarrier dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a subcarrier dimension. When feeding back the matrix Q to the second device, the first device feeds back the compressed matrix Q to the second device.

When the third indication information indicates to use feedback of the compressed beamforming matrix based on sample dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a sample dimension. When feeding back the matrix Q to the second device, the first device feeds back the compressed matrix Q to the second device.

When the third indication information indicates to use feedback of the compressed beamforming matrix based on subcarrier dimension consistency and feedback of the compressed beamforming matrix based on sample dimension consistency, and the first device performs conjugate transpose and QR decomposition on the channel state information, the obtained matrix R satisfies: in the first L rows of the matrix R, at least one row meets that plus or minus signs of elements on a corresponding diagonal are consistent in a subcarrier dimension, and at least one row meets that plus or minus signs of elements on a corresponding diagonal are consistent in a sample dimension. When feeding back the matrix Q to the second device, the first device feeds back the compressed matrix Q to the second device.

The following describes a frame structure of the third indication information by using a low frequency scenario as an example.

In a possible design, the third indication information is located in a sensing NDPA.

Figure 12:
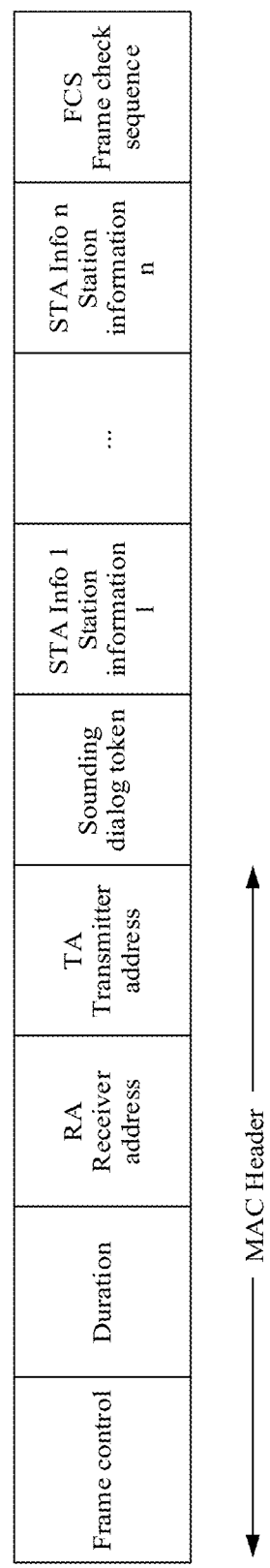
FIG. 12 is a diagram of a frame structure of an NDPA according to an embodiment of this disclosure.

The second device may send the NDPA shown in FIG. 12 to the first device in the measurement phase. The NDPA may include a MAC header, a sounding dialog token field, a station information field, and a frame check sequence field.

The MAC header may include a frame control field, a duration field, a receiver address field, and a transmitter address field.

The second device may adjust the frame control field, the sounding dialog token field, or the station information field to turn the NDPA into the sensing NDPA.

Figure 13:
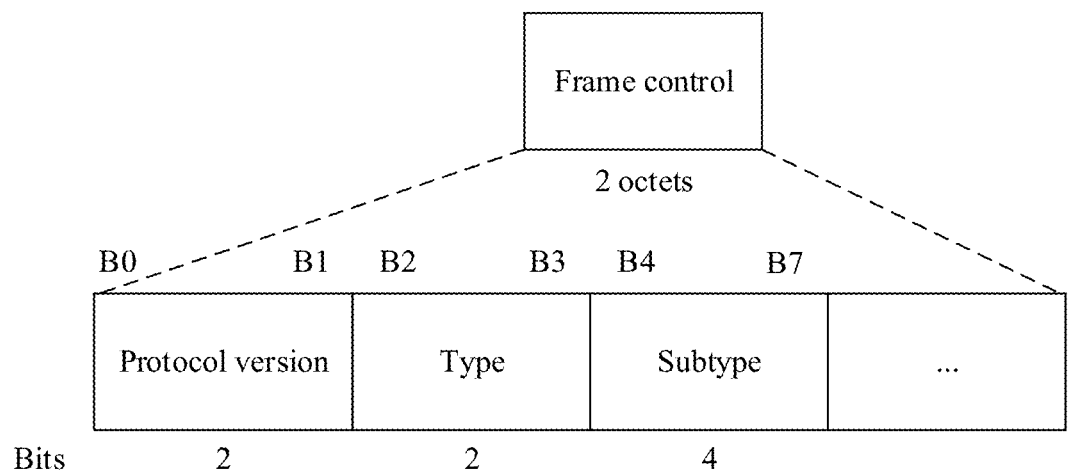
FIG. 13 is a diagram of a frame structure of a frame control field according to an embodiment of this disclosure.

When the second device adjusts the frame control field to turn the NDPA into the sensing NDPA, as shown in FIG. 13, the second device may adjust values of a type field and a subtype field to indicate a new type in the frame control field, indicating that the NDPA is the sensing NDPA.

For example, as shown in Table 14, the type field may be set to 01, and the subtype field may be set to 0010 or another value, indicating that the NDPA is a new NDPA (the new NDPA may be the sensing NDPA). The type field may be set to 01, and the subtype field may be set to 0101, indicating that the NDPA is a VHT NDPA.

TABLE 14

| Type field | Meaning | Subtype field | Meaning |
|---|---|---|---|
| 01 | Control frame | 0101 | Very High Throughput (VHT) NDPA |
| 01 | Control frame | 0010 or another value | New NDPA The frame may include an NDPA variant field. One variant is the sensing NDPA. A related field (the sensing feedback type subfield) in the sensing NDPA may indicate the third indication information. |

When the second device adjusts the sounding dialog token field to turn the NDPA into the sensing NDPA, as shown in the following Table 15, the second device may combine the first two bits of the sounding dialog token field with another manner, to indicate that the NDPA is a new NDPA. A field (for example, four bits) is added to the new NDPA to divide NDPA types, to indicate that the NDPA is the sensing NDPA.

Optionally, the sensing NDPA may include one common information field (common info field) and/or one or more user information fields (user info field). The sensing feedback type subfield shown in Table 13 may be included in a common information field or a corresponding user information field. For example, if feedback types of a plurality of first devices are the same, the sensing feedback type subfield may be included in a common information field in the sensing NPDA sent by the second device. If feedback types of a plurality of first devices are different, a sensing feedback type subfield corresponding to each first device may be included in each user information field that is in a one-to-one correspondence with the first device and that is in the sensing NPDA sent by the second device.

TABLE 15

| Field name | Meaning |
|---|---|
| Sounding dialog token field | Meaning of the first two bits:<br>00: VHT NDPA<br>01: HE NDPA<br>10: Ranging NDPA<br>11: EHT NDPA<br>In this embodiment of this disclosure, the field may be set to 00. In this case, all devices identify the NDPA as a result VHT NDPA (a length of a station information field of the VHT NDPA is two bytes). Then, a disambiguation bit is added to a corresponding location B11 in each two bytes (16 bits), to indicate a new NDPA type. In addition, a field (for example, four bits) may be added to the new NDPA to divide NDPA types. When one NDPA of a new extension type is selected as the sensing NDPA, the sensing feedback type subfield in the NDPA may be used to carry the third indication information. |

Optionally, the sensing NDPA may include one common information field (common info field) and/or one or more user information fields (user info field). The sensing feedback type subfield shown in Table 13 may be included in a common information field or a corresponding user information field. For example, if feedback types of a plurality of first devices are the same, the sensing feedback type subfield may be included in a common information field in the sensing NPDA sent by the second device. If feedback types of a plurality of first devices are different, a sensing feedback type subfield corresponding to each first device may be included in each user information field that is in a one-to-one correspondence with the first device and that is in the sensing NPDA sent by the second device.

Figure 14:
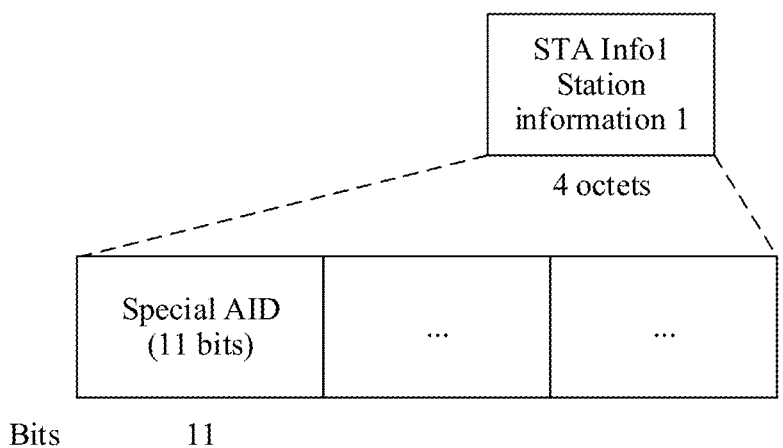
FIG. 14 is a diagram of a frame structure of station information according to an embodiment of this disclosure.

When the second device adjusts the station information field to turn the NDPA into the sensing NDPA, as shown in the following Table 16, the second device may indicate, by using a special AID in the station information shown in FIG. 14, that the NDPA is the sensing NDPA.

TABLE 16

| Field name | Meaning |
|---|---|
| Station information 1 | In a manner, in the station information 1, a special AID (for example, AID = 2045, or another AID, where a value range of the special AID is [2008, 2047]) may indicate that the NDPA is a sensing NDPA in a corresponding version (HE/Ranging/ EHT). A related bit of the NDPA may be used to carry the third indication information.<br>In another manner, the first two bits of the sounding dialog token field may be 01 (HE NDPA)/10 (Ranging NDPA)/11 (EHT NDPA). A special AID (with a same value range as above) indicates a general NDPA, and a field (for example, an NDPA variant, four bits) is added to the general NDPA to distinguish NDPA types. An NDPA under the general NDPA is a sensing NDPA. In this case, the sensing feedback type subfield in the sensing NDPA may carry the third indication information. |

Optionally, the third indication information is located in the sensing feedback type subfield in the user information field of the sensing NDPA.

It should be noted that if the second device indicates a plurality of first devices to use different feedback types, the third indication information of each first device may be located in a user information field (user info field) corresponding to each first device. If the second device indicates a plurality of first devices to use a same feedback type, the third indication information may be present in a user information field starting with a special AID. In this case, the user information field may be used as a common information field. That is, all the first devices perform feedback based on the third indication information in the common information field.

In another possible design, the third indication information is located in a sensing trigger frame.

Figure 15:
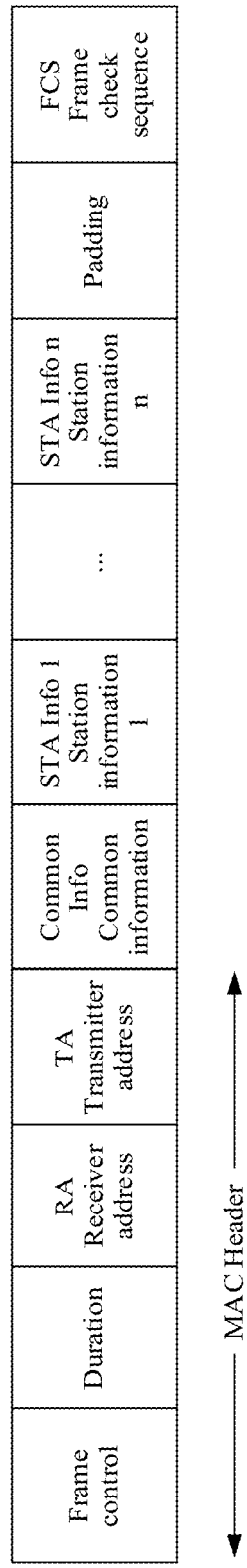
FIG. 15 is a diagram of a frame structure of a trigger frame according to an embodiment of this disclosure.

The second device may send the trigger frame shown in FIG. 15 to the first device in the feedback phase. The trigger frame may include a MAC header, a common information field, a station information field, a padding field, and a frame check sequence field. The MAC header may include a frame control field, a duration field, a receiver address field, and a transmitter address field.

The second device may adjust the common information field to turn the trigger frame into the sensing trigger frame.

For example, as shown in the following Table 17, the second device may add a new type to a trigger type in the common information field. For example, a value of a trigger type field is set to 8 to indicate sensing beamforming report poll, to indicate that the trigger frame is the sensing trigger frame. Alternatively, an existing beamforming report poll may be directly reused to indicate that the trigger frame is the sensing trigger frame.

Figure 17:
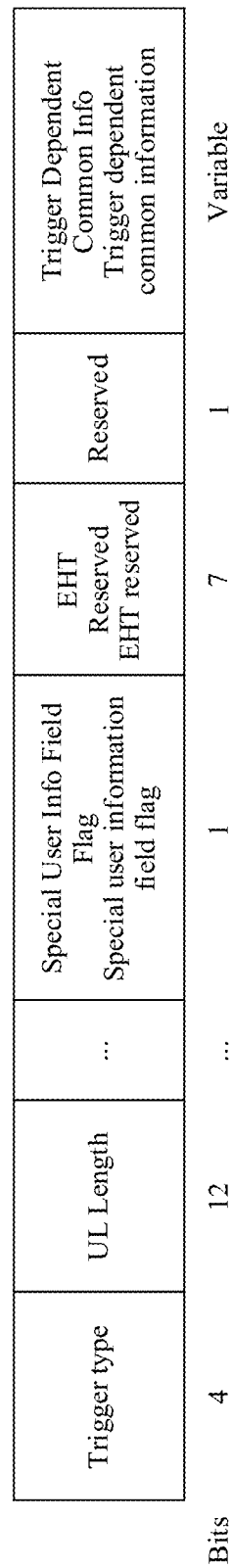
FIG. 17 is a diagram of a frame structure of an Extremely High Throughput (EHT) common information field according to an embodiment of this disclosure.

For example, the HE common information field shown in FIG. 16 and the EHT common information field shown in FIG. 17 are used as examples. The new type may be added to the trigger type, to indicate that the trigger frame is the sensing trigger frame.

TABLE 17

| Value of the trigger type field | Meaning of the trigger frame |
| --- | --- |
| 0 | Basic |
| 1 | Beamforming report poll |
| ... | ... |
| 7 | NDP feedback report poll (Dull data packet feedback report poll) |
| 8 | Sensing beamforming report poll |
| 9-15 | Reserved |

Optionally, the third indication information may be located in the common information field of the sensing trigger frame or the user information field of the sensing trigger frame. This is not limited in this disclosure.

It should be noted that if the second device indicates a plurality of first devices to use different feedback types, the third indication information of each first device may be located in a user information field (user info field) corresponding to each first device in the sensing trigger frame. If the second device indicates a plurality of first devices to use a same feedback type, the third indication information may be present in a common information field of the sensing trigger frame. That is, all the first devices perform feedback based on the third indication information in the common information field.

The following describes a frame structure of the third indication information by using a high frequency scenario as an example.

In a possible design, the third indication information is located in the BRP.

The second device may send the BRP to the first device in the feedback phase, where the BRP may include a BRP request field and a BRP request element field. The BRP request field is designed in the 802.11ad. The BRP request element field is a newly added field in the 802.11ay, and is used to carry additional BRP related information. As shown in FIG. 18, the BRP request element field may include an element ID field, a length field, an element ID extension field, a digital beamforming request field, a feedback type field, an Nc index field, and a reserved field.

Optionally, the third indication information is located in the reserved field in the BRP.

For example, when the feedback type field is 1, it indicates an MU scenario. In this case, ay is an OFDM PHY. When the feedback type field is 1, as shown in the following Table 18, one reserved bit (any one of B91 to B95) indicates the third indication information.

TABLE 18

| Any bit of B91 to B95 | Meaning |
| --- | --- |
| 1 | Third indication information |
| 0 | Other |

It should be noted that when a new frame for indicating sensing information is present in WLAN sensing at a high frequency, the third indication information may alternatively be located in the new frame. This is not limited in embodiments of this disclosure.

Based on the foregoing descriptions of the first indication information to the tenth indication information and the sensing request frame and the sensing response frame, the foregoing indication information, the sensing request frame, and the sensing response frame may be used independently, or may be used in combination. This is not limited in this disclosure.

Figure 19:
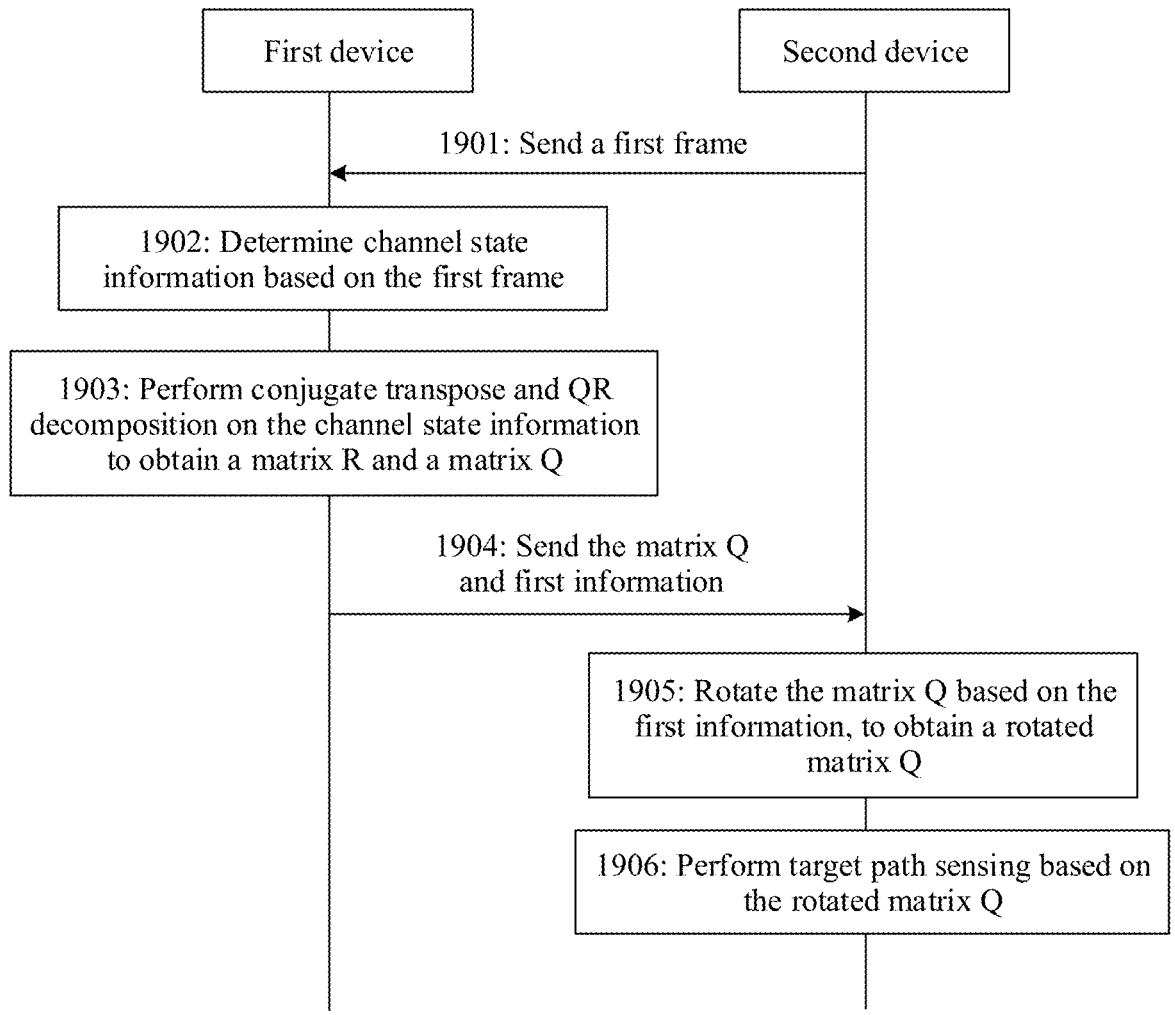
FIG. 19 is a flowchart of a communication method according to an embodiment of this disclosure.

Different from FIG. 8 to FIG. 17 showing the method in which subcarrier dimension consistency or sample dimension consistency needs to be met when the first device performs QR decomposition, FIG. 19 shows the method in which subcarrier dimension consistency and sample dimension consistency may not need to be met when the first device performs QR decomposition.

FIG. 19 is a flowchart of a communication method according to an embodiment of this disclosure. As shown in FIG. 19, the method may include the following steps.

Step 1901: The second device sends a first frame to the first device. Correspondingly, the first device receives the first frame from the second device.

For descriptions of step 1901, refer to the foregoing descriptions of step 801. Details are not described herein again.

Step 1902: The first device determines channel state information based on the first frame.

For descriptions of step 1902, refer to the foregoing descriptions of step 802. Details are not described herein again.

Step 1903: The first device performs conjugate transpose and QR decomposition on the channel state information to obtain an upper right triangular matrix R and a matrix Q.

Because the channel state information may include the channel matrix of each subcarrier that carries the first frame, the first device may remove a CSD from the channel state information, extract channel matrices of some or all subcarriers, and perform conjugate transpose and QR decomposition on the extracted channel matrices of the subcarriers by using the foregoing solution 2, to obtain a matrix R and a matrix Q that correspond to each subcarrier. The matrix Q may also be described as a beamforming matrix corresponding to the subcarrier.

Step 1904: The first device sends the matrix Q and first information to the second device. Correspondingly, the second device receives the matrix Q and the first information.

The first information may include one or more of the following: a plus or minus sign of a first reference element or a plus or minus sign of a second reference element. The first reference element is any one of the first L elements on a diagonal of the matrix R, the second reference element is any one of the first L elements on the diagonal of the matrix R, the plus or minus sign of the first reference element indicates to rotate the matrix Q in a subcarrier dimension, the plus or minus sign of the second reference element indicates to rotate the matrix Q in a sample dimension, L is a quantity of target paths between the first device and the second device, a sample is a plurality of pieces of channel state information obtained by performing a plurality of times of channel measurement in a time dimension, and the sample dimension is a sample dimension corresponding to the plurality of pieces of channel state information.

A plus or minus sign of the reference element may indicate a plus or minus sign of a corresponding column vector in the matrix Q. When the plus or minus sign of the reference element is plus, the plus or minus sign of the corresponding column vector in the matrix Q is plus. When the plus or minus sign of the reference element is minus, the plus or minus sign of the corresponding column vector in the matrix Q is minus.

For example, the quantity L of target paths between the first device and the second device is two, the samples obtained through sampling in the channel measurement process include a sample 1, a sample 2, a sample 3, and a sample 4, and a quantity of subcarriers that carry the first frame is 256. The first device may perform conjugate transpose and QR decomposition on the channel state information of each sample. It is assumed that subcarriers extracted by the first device are a subcarrier 1, a subcarrier 2, ..., and a subcarrier 64. In this case, the first device may send, to the second device, a matrix Q of 64 subcarriers corresponding to each sample, a plus or minus sign of a first reference element corresponding to each matrix Q, and/or a plus or minus sign of a second reference element corresponding to each matrix Q.

It should be noted that the first reference element and the second reference element may be a same element. This is not limited in embodiments of this disclosure.

Optionally, the first device may determine the first reference element and the second reference element based on a third location and a fourth location, where the third location is a location of the first reference element in the matrix R, and the fourth location is a location of the second reference element in the matrix R.

The third location and the fourth location may be determined by the second device and sent to the first device, or may be predefined in a protocol, or may be defined by the first device. This is not limited in this disclosure.

It should be noted that when the third location and the fourth location are defined by the first device, the first device may send information about the third location and information about the fourth location to the second device, and the second device performs target path sensing based on the third location and the fourth location.

Step 1905: The second device rotates the matrix Q based on the first information, to obtain a rotated matrix Q.

The rotating the matrix Q may be understood as rotating plus or minus signs of column vectors in the matrix Q. That is, the rotating the matrix Q may be understood as multiplying the column vectors of the matrix Q by plus 1, so that the plus or minus signs of the column vectors remain unchanged. Alternatively, the rotating the matrix Q may be understood as multiplying the column vectors of the matrix Q by minus 1, so that the plus or minus signs of the column vectors change from plus to minus or from minus to plus.

When the second device rotates the matrix Q based on the first information in the first L columns of the rotated matrix Q, plus or minus signs of column vectors corresponding to the first reference element are consistent in a subcarrier dimension, and/or plus or minus signs of column vectors corresponding to the second reference element are consistent in a sample dimension.

The rotated matrix Q may indicate attribute information of the target path. The attribute information of the target path may include one or more of the following: a delay of the target path, an AOD of the target path, or a Doppler shift of the target path.

Further, when the first information includes the plus or minus sign of the first reference element, the second device may rotate the matrix Q based on the plus or minus sign of the first reference element in a subcarrier dimension to obtain the rotated matrix Q, where in the first L columns of the rotated matrix Q, the plus or minus signs of the column vectors corresponding to the first reference element are consistent in a subcarrier dimension. When the first information includes the plus or minus sign of the second reference element, the second device rotates the matrix Q based on the plus or minus sign of the second reference element in a sample dimension to obtain the rotated matrix Q, where in the first L columns of the rotated matrix Q, the plus or minus signs of the column vectors corresponding to the second reference element are consistent in a sample dimension.

For example, the quantity L of target paths between the first device and the second device is two, the samples obtained through sampling in the channel measurement process include a sample 1, a sample 2, a sample 3, and a sample 4, and a quantity of subcarriers that carry the first frame is 256. The first device may perform conjugate transpose and QR decomposition on the channel state information of each sample. It is assumed that subcarriers extracted by the first device are a subcarrier 1, a subcarrier 2, ..., and a subcarrier 64. In this case, the first device may send, to the second device, a matrix Q of 64 subcarriers corresponding to each sample, a plus or minus sign of a first reference element corresponding to each matrix Q, or a plus or minus sign of a second reference element corresponding to each matrix Q.

The second device may rotate the matrix Q in a subcarrier dimension based on the plus or minus sign of the first reference element corresponding to each matrix Q, to obtain rotated matrices Q of 64 subcarriers corresponding to each sample. Assuming that the third location corresponding to the first reference element is (1, 1), for each subcarrier, in the first two columns of the four rotated matrices Q corresponding to the four samples, plus or minus signs of first column vectors are consistent on the current subcarrier. The second device may rotate the received matrix Q in a sample dimension based on the plus or minus sign of the second reference element corresponding to each matrix Q, to obtain rotated matrices Q of 64 subcarriers corresponding to each sample. Assuming that a fourth location corresponding to the second reference element is (2, 2), for each sample, in the first two columns of the 64 rotated matrices Q corresponding to the 64 subcarriers, plus or minus signs of second column vectors are consistent on the current sample.

For example, a subcarrier 1 is used as an example. It is assumed that in the first two columns of the four rotated matrices Q corresponding to the four samples, plus or minus signs of the first column vectors are consistent on the subcarrier 1. To be specific, a plus or minus sign of a first column vector of a rotated matrix Q corresponding to the subcarrier 1 in the sample 1, a plus or minus sign of a first column vector of a rotated matrix Q corresponding to the subcarrier 1 in the sample 2, a plus or minus sign of a first column vector of a rotated matrix Q corresponding to the subcarrier 1 in the sample 3, and a plus or minus sign of a first column vector of a rotated matrix Q corresponding to the subcarrier 1 in the sample 4 are consistent, and are all plus signs, or are all minus signs.

For another example, a sample 1 is used as an example. It is assumed that in the first two columns of the 64 rotated matrix Q corresponding to the 64 subcarriers, plus or minus signs of the second column vectors are consistent in the sample 1. To be specific, a plus or minus sign of a second column vector of a rotated matrix Q corresponding to the subcarrier 1 in the sample 1, a plus or minus sign of a second column vector of a rotated matrix Q corresponding to the subcarrier 2 in the sample 1, . . . , and a plus or minus sign of a second column vector of a rotated matrix Q corresponding to the subcarrier 64 in the sample 1 are consistent, and are all plus signs, or are all minus signs.

Optionally, in the first L columns of the rotated matrix Q, plus or minus signs of column vectors corresponding to the first reference element are consistent in a subcarrier dimension, and/or plus or minus signs of column vectors corresponding to the second reference element are consistent in a sample dimension, which may also be described as follows. In the first L columns of the rotated matrix Q, the column vectors corresponding to the first reference element meet that the plus or minus signs of corresponding first reference elements are consistent in a subcarrier dimension, and/or the column vectors corresponding to the second reference element meet that the plus or minus signs of corresponding second reference elements are consistent in a sample dimension.

When rotating the matrix Q based on the plus or minus sign of the first reference element, the second device may rotate the matrix Q based on the plus or minus sign of the first reference element, or may rotate the first reference element based on the plus or minus sign of the first reference element. When rotating the matrix Q based on the plus or minus sign of the second reference element, the second device may rotate the matrix Q based on the plus or minus sign of the second reference element, or may rotate the second reference element based on the plus or minus sign of the second reference element.

The rotating the reference element may be understood as rotating a plus or minus sign of the reference element. That is, the rotating the reference element may be understood as multiplying the reference element by plus 1, so that the plus or minus sign of the reference element remains unchanged. Alternatively, the rotating the reference element may be understood as multiplying the reference element by minus 1, so that the plus or minus sign of the reference element changes from plus to minus or from minus to plus.

It should be noted that, in that the column vectors corresponding to the first reference element meet that the plus or minus signs of corresponding first reference elements are consistent in a subcarrier dimension, that the plus or minus signs are consistent means that after the first reference elements corresponding to the column vectors are rotated, the plus or minus signs of the rotated first reference elements are consistent. In that the column vectors corresponding to the second reference element meet that the plus or minus signs of corresponding second reference elements are consistent in a subcarrier dimension, that the plus or minus signs are consistent means that after the second reference elements corresponding to the column vectors are rotated, the plus or minus signs of the rotated second reference elements are consistent.

The second device may rotate, based on a first reference element whose plus or minus sign is minus, a matrix Q and first reference elements that correspond to the first reference element, so that in the first L columns of a rotated matrix Q, the column vectors corresponding to the first reference element meet that the plus or minus signs of the corresponding first reference elements are plus in a subcarrier dimension. In this case, the second device may not rotate, based on a first reference element whose plus or minus sign is plus, a matrix Q and first reference elements that correspond to the first reference element. That is, for the matrix Q corresponding to the first reference element whose plus or minus sign is plus, the matrix Q is the same as a rotated matrix Q corresponding to the matrix Q.

Alternatively, the second device may rotate, based on a first reference element whose plus or minus sign is plus, a matrix Q and first reference elements that correspond to the first reference element, so that in the first L columns of a rotated matrix Q, the column vectors corresponding to the first reference element meet that the plus or minus signs of the corresponding first reference elements are minus in a subcarrier dimension. In this case, the second device may not rotate, based on a first reference element whose plus or minus sign is minus, a matrix Q and first reference elements that correspond to the first reference element. That is, for the matrix Q corresponding to the first reference element whose plus or minus sign is minus, the matrix Q is the same as a rotated matrix Q corresponding to the matrix Q.

Similarly, for descriptions that the second device rotates each received matrix Q based on the second reference element, refer to the foregoing descriptions that the second device rotates each received matrix Q based on the first reference element. Details are not described herein again.

For example, the quantity L of target paths between the first device and the second device is two, the samples obtained through sampling in the channel measurement process include a sample 1, a sample 2, a sample 3, and a sample 4, and a quantity of subcarriers that carry the first frame is 256. The first device may perform conjugate transpose and QR decomposition on the channel state information of each sample. It is assumed that subcarriers extracted by the first device are a subcarrier 1, a subcarrier 2, . . . , and a subcarrier 64. In this case, the first device may send, to the second device, a matrix Q of 64 subcarriers corresponding to each sample, a plus or minus sign of a first reference element corresponding to each matrix Q, or a plus or minus sign of a second reference element corresponding to each matrix Q.

The second device may rotate the matrix Q and the first reference element in a subcarrier dimension based on the plus or minus sign of the first reference element corresponding to each matrix Q, to obtain rotated matrices Q of 64 subcarriers corresponding to each sample and a rotated first reference element corresponding to each rotated matrix Q. Assuming that the third location corresponding to the first reference element is (1, 1), for each subcarrier, in the first two columns of the four rotated Q matrices corresponding to the four samples, plus or minus signs of rotated first reference elements corresponding to first column vectors are consistent on the current subcarrier. The second device may rotate the received matrix Q in a sample dimension based on the plus or minus sign of the second reference element corresponding to each matrix Q, to obtain rotated matrices Q of 64 subcarriers corresponding to each sample and a rotated second reference element corresponding to each rotated matrix Q. Assuming that a fourth location corresponding to the second reference element is (2, 2), for each sample, in the first two columns of the 64 rotated matrix Q corresponding to the 64 subcarriers, plus or minus signs of rotated second reference elements corresponding to second column vectors are consistent on the current sample.

For example, a subcarrier 1 is used as an example. It is assumed that in the first two columns of the four rotated matrices Q corresponding to the four samples, plus or minus signs of the rotated first reference elements corresponding to the first column vectors on the subcarrier 1 are consistent. To be specific, a plus or minus sign of a rotated first reference element corresponding to a first column vector of a rotated matrix Q corresponding to the subcarrier 1 in the sample 1, a plus or minus sign of a rotated first reference element corresponding to a first column vector of a rotated matrix Q corresponding to the subcarrier 1 in the sample 2, a plus or minus sign of a rotated first reference element corresponding to a first column vector in a rotated matrix Q corresponding to the subcarrier 1 in the sample 3, and a plus or minus sign of a rotated first reference element corresponding to a first column vector in a rotated matrix Q corresponding to the subcarrier 1 in the sample 4 are consistent, and are all plus signs, or are all minus signs.

For another example, a sample 1 is used as an example. It is assumed that in the first two columns of the 64 rotated matrices Q corresponding to the 64 subcarriers, plus or minus signs of the rotated second reference elements corresponding to the second column vectors are consistent on the sample 1. To be specific, a plus or minus sign of a rotated second reference element corresponding to a second column vector of a rotated matrix Q corresponding to the subcarrier 1 in the sample 1, a plus or minus sign of a rotated second reference element corresponding to a second column vector of a rotated matrix Q corresponding to the subcarrier 2 in the sample 1, . . . , and a plus or minus sign of a rotated second reference element corresponding to a second column vector of a rotated matrix Q corresponding to the subcarrier 64 in the sample 1 are consistent, and are all plus signs, or are all minus signs.

It should be noted that when only Doppler shift sensing is performed, for different subcarriers, plus or minus signs corresponding to the subcarriers may be consistent, or may be inconsistent. This is not limited in this disclosure.

A plus or minus sign corresponding to a subcarrier is the plus or minus sign corresponding to the column vectors corresponding to the first reference element when the plus or minus signs of the column vectors corresponding to the first reference element in the first L columns of the rotated matrix Q are consistent in a subcarrier dimension for a current subcarrier.

For example, a subcarrier 1 is used as an example. It is assumed that in the first L columns of the rotated matrix Q corresponding to each sample, plus or minus signs of the column vectors corresponding to the first reference element are consistent on the subcarrier 1. In this case, a plus or minus sign corresponding to the column vectors corresponding to the first reference element is a plus or minus sign corresponding to the subcarrier 1. When the column vector corresponding to the first reference element corresponds to a plus sign, the subcarrier 1 corresponds to a plus sign. When the column vector corresponding to the first reference element corresponds to a minus sign, the subcarrier 1 corresponds to a minus sign.

For example, different subcarriers are a subcarrier 1 and a subcarrier 2. A plus or minus sign corresponding to the subcarrier 1 may be the plus or minus sign corresponding to the column vectors corresponding to the first reference element when the plus or minus signs of the column vectors corresponding to the first reference element in the first L columns of the rotated matrix Q corresponding to each sample are consistent on the subcarrier 1. A plus or minus sign corresponding to the subcarrier 2 may be the plus or minus sign corresponding to the column vectors corresponding to the first reference element when the plus or minus signs of the column vectors corresponding to the first reference element in the first L columns of the rotated matrix Q corresponding to each sample are consistent on the subcarrier 2. Plus or minus signs corresponding to the subcarrier 1 and plus or minus signs corresponding to the subcarrier 2 may be consistent, or may be inconsistent. To be specific, both the subcarrier 1 and the subcarrier 2 correspond to plus signs, both the subcarrier 1 and the subcarrier 2 correspond to minus signs, the subcarrier 1 corresponds to a plus sign, and the subcarrier 2 corresponds to a minus sign, or the subcarrier 1 corresponds to a minus sign, and the subcarrier 2 corresponds to a plus sign. This is not limited in this disclosure.

Similarly, when only delay sensing is performed, for different samples, plus or minus signs corresponding to the samples may be consistent, or may be inconsistent. This is not limited in this disclosure.

A plus or minus sign corresponding to a sample is the plus or minus sign corresponding to the column vectors corresponding to the second reference element when the plus or minus signs of the column vectors corresponding to the second reference element in the first L columns of the matrix Q are consistent in a sample dimension for a current sample.

For example, a sample 1 is used as an example. It is assumed that in the first L columns of the matrix Q corresponding to each subcarrier, the plus or minus signs of the column vectors corresponding to the second reference element are consistent in the sample 1. In this case, the plus or minus sign corresponding to the column vectors corresponding to the second reference element is a plus or minus sign corresponding to the sample 1. When the column vectors corresponding to the second reference element correspond to a plus sign, the sample 1 corresponds to a plus sign. When the column vectors corresponding to the second reference element correspond to a minus sign, the sample 1 corresponds to a minus sign.

For example, different samples are a sample 1 and a sample 2. A plus or minus sign corresponding to the sample 1 may be the plus or minus sign corresponding to the column vectors corresponding to the second reference element when the plus or minus signs of the column vectors corresponding to the second reference element in the first L columns of the matrix Q corresponding to each subcarrier are consistent on the sample 1. A plus or minus sign corresponding to the sample 2 may be the plus or minus sign corresponding to the column vectors corresponding to the second reference element when the plus or minus signs of the column vectors corresponding to the second reference element in the first L columns of the matrix Q corresponding to each subcarrier are consistent on the sample 2. Plus or minus signs corresponding to the sample 1 and plus or minus signs corresponding to the sample 2 may be consistent, or may be inconsistent. To be specific, both the sample 1 and the sample 2 correspond to plus signs, both the sample 1 and the sample 2 correspond to minus signs, the sample 1 corresponds to a plus sign, and the sample 2 corresponds to a minus sign, or the sample 1 corresponds to a minus sign, and the sample 2 corresponds to a plus sign. This is not limited in this disclosure.

In addition, in the first L columns of the rotated matrix Q, a column in which plus or minus signs of column vectors corresponding to the first reference element are consistent in a subcarrier dimension and a column in which plus or minus signs of column vectors corresponding to the second reference element are consistent in a sample dimension may be the same column or different columns. This is not limited in this disclosure.

For example, in the first L columns of the rotated matrix Q, one column in which plus or minus signs of column vectors corresponding to the first reference element are consistent in a subcarrier dimension exists, and another column in which plus or minus signs of column vectors corresponding to the second reference element are consistent in a sample dimension exists, and the one column and the other column may be the same column or different columns. This is not limited in this disclosure.

Step 1906: The second device performs target path sensing based on the rotated matrix Q.

For example, the second device may perform target path sensing on the rotated matrix Q based on the third location and the fourth location, to obtain the attribute information of the target path.

The third location may be a location of the first reference element in the matrix R, and the fourth location is a location of the second reference element in the matrix R. The third location and the fourth location may be a same location, or may be different locations. This is not limited in this disclosure.

Optionally, the third location and the fourth location may be determined by the second device, or may be predefined in a protocol, or may be defined by the first device. This is not limited in this disclosure.

It should be noted that when the third location and the fourth location are determined by the second device, the second device may send the information about the third location and the information about the fourth location to the first device before the first device performs channel measurement, and the first device determines the plus or minus sign of the first reference element and the plus or minus sign of the second reference element based on the third location and the fourth location.

When the third location and the fourth location are defined by the first device, the first device may send the information about the third location and the information about the fourth location to the second device, and the second device performs target path sensing based on the third location and the fourth location.

For example, when performing target path sensing based on the rotated matrix Q, the second device may select, based on the third location and the fourth location, a corresponding column in the rotated matrix Q to perform angle sensing, perform delay sensing in a subcarrier dimension, and perform Doppler shift sensing in a sample dimension.

For example, the second device may perform target path sensing based on the rotated matrix Q by using one or more of the following method 1 to method 4, to obtain the attribute information of the target path.

Method 1: The second device may select, based on the third location, a column in which an element at the third location in the matrix Q rotated in a subcarrier dimension based on the plus or minus sign of the first reference element is located, to perform angle sensing.

The second device may select any subcarrier, and extract, in a sample dimension, a column in which an element at the third location in the matrix Q that is rotated based on the plus or minus sign of the first reference element and that corresponds to the subcarrier in each sample is located, to form a signal matrix whose dimension is T×S, where T indicates a quantity of transmit antennas, or may be described as a quantity of antennas of the second device, and S indicates a quantity of samples. The second device may perform angle sensing based on the signal matrix by using a parameter estimation algorithm, to obtain the AOD of the target path.

The parameter estimation algorithm may be an algorithm that can perform parameter estimation, for example, a MUSIC algorithm.

For example, the third location is (1, 1). The column in which the element at the third location is located is the first column. The second device may select any subcarrier, and extract, in a sample dimension, elements in the first column of the rotated matrix Q corresponding to the subcarrier in each sample, to form a signal matrix whose dimension is T×S, to implement angle sensing.

Method 2: The second device may select, based on the fourth location, a column in which an element at the fourth location in the matrix Q rotated in a sample dimension based on the plus or minus sign of the second reference element is located, to perform angle sensing.

The second device may select any sample, and extract, in a subcarrier dimension, a column in which an element at the fourth location in the matrix Q that is rotated based on the plus or minus sign of the second reference element and that corresponds to each subcarrier in the sample is located, to form a signal matrix whose dimension is T×K, where T indicates a quantity of transmit antennas, or may be described as a quantity of antennas of the second device, and K indicates a quantity of subcarriers. The second device may perform angle sensing based on the signal matrix by using a parameter estimation algorithm, to obtain the AOD of the target path.

The parameter estimation algorithm may be an algorithm that can perform parameter estimation, for example, a MUSIC algorithm.

For example, the fourth location is (1, 1). The column in which the element at the fourth location is located is the first column. The second device may select any sample, and extract, in a subcarrier dimension, elements in the first column of the rotated matrix Q corresponding to each subcarrier in the sample, to form a signal matrix whose dimension is T×K, to implement angle sensing.

Method 3: The second device may select, based on the third location, a column in which an element at the third location in the matrix Q rotated in a subcarrier dimension based on the plus or minus sign of the first reference element is located, to perform Doppler shift sensing in a sample dimension.

The second device may select any subcarrier, and extract, in a sample dimension, a column in which an element at the third location in the matrix Q that is rotated based on the plus or minus sign of the first reference element and that corresponds to the subcarrier in each sample is located, to form a signal matrix whose dimension is S×T, where S indicates a quantity of samples, and T indicates a quantity of transmit antennas, or may be described as a quantity of antennas of the second device. The second device may perform Doppler shift sensing based on the signal matrix by using a parameter estimation algorithm, to obtain the Doppler shift of the target path.

The parameter estimation algorithm may be an algorithm that can perform parameter estimation, for example, a MUSIC algorithm.

For example, the third location is (1, 1). The column in which the element at the third location is located is the first column. The second device may select any subcarrier, and extract, in a sample dimension, elements in the first column of the rotated matrix Q corresponding to the subcarrier in each sample, to form a signal matrix whose dimension is S×T, to implement Doppler shift sensing.

Method 4: The second device may select, based on the fourth location, a column in which an element at the fourth location in the matrix Q rotated in a sample dimension based on the plus or minus sign of the second reference element is located, to perform delay sensing in a subcarrier dimension.

The second device may select any sample, and extract, in a subcarrier dimension, a column in which an element at the fourth location in the matrix Q that is rotated based on the plus or minus sign of the second reference element and that corresponds to each subcarrier in the sample is located, to form a signal matrix whose dimension is K×T, where K indicates a quantity of subcarriers, and T indicates a quantity of transmit antennas, or may be described as a quantity of antennas of the second device. The second device may perform delay sensing based on the signal matrix by using a parameter estimation algorithm, to obtain the delay of the target path.

The parameter estimation algorithm may be an algorithm that can perform parameter estimation, for example, a MUSIC algorithm.

For example, the fourth location is (1, 1). The column in which the element at the fourth location is located is the first column. The second device may select any sample, and extract, in a subcarrier dimension, elements in the first column of the rotated matrix Q corresponding to each subcarrier in the sample, to form a signal matrix whose dimension is K×T, to implement delay sensing.

It should be noted that delay information and Doppler shift information are carried on a plurality of subcarriers and a plurality of samples respectively. To ensure that the delay information is correctly reserved, when the second device rotates the matrix Q, in the first L columns of the rotated matrix Q, the plus or minus signs of the column vectors corresponding to the first reference element need to be consistent in a subcarrier dimension. In this case, the second device may obtain the delay information based on the corresponding matrix Q.

To ensure that the Doppler shift information is correctly reserved, when the second device rotates the matrix Q, in the first L columns of the rotated matrix Q, the plus or minus signs of the column vectors corresponding to the second reference element need to be consistent in a sample dimension. In this case, the second device may obtain the Doppler shift information based on the rotated matrix Q.

In addition, based on the foregoing description of angle sensing in step 1906, it may be learned that the second device may perform angle sensing in a sample dimension, or may perform angle sensing in a subcarrier dimension.

Optionally, the second device may further use the rotated matrix Q as a precoding matrix, precode a signal sent to the first device, and send a precoded signal to the first device.

Based on the communication method shown in FIG. 19, the first device may perform conjugate transpose and QR decomposition on the channel state information to obtain the matrix Q and the upper right triangular matrix R, and send the matrix Q and the first information to the second device. The second device rotates the matrix Q based on the first information, and performs target path sensing based on the rotated matrix Q. In the first L columns of the rotated matrix Q, the plus or minus signs of the column vectors corresponding to the first reference element are consistent in a subcarrier dimension, or the plus or minus signs of the column vectors corresponding to the second reference element are consistent in a sample dimension. Therefore, the rotated matrix Q may indicate the attribute information of the target path. In other words, the attribute information such as the delay, the AOD, and the Doppler shift of the target path may be reserved in the rotated matrix Q. Therefore, the second device may determine the attribute information of the target path based on the rotated matrix Q, to implement effective sensing on the target path based on a channel matrix diagonalization principle.

FIG. 19 mainly describes a process in which the first device performs channel measurement and feeds back the matrix Q and the first information, and the second device rotates the matrix Q based on the first information and performs target path sensing based on the rotated matrix Q. Optionally, before the first device performs channel measurement, the first device may send fourth indication information to the second device.

The fourth indication information may indicate whether the first device supports feedback of a compressed beamforming matrix based on QR decomposition and the first information, that is, indicate whether the first device supports QR decomposition and feedback shown in FIG. 19.

When the fourth indication information indicates that the first device supports feedback of the compressed beamforming matrix based on QR decomposition and the first information, the first device may perform QR decomposition by using the method shown in FIG. 19, and feed back the compressed beamforming matrix based on QR decomposition and the first information to the second device.

Optionally, the first device includes the fourth indication information in a sensing capability field and sends the sensing capability field to the second device in the association phase, the first device includes the fourth indication information in a core capabilities field of an EDMG sensing capability field and sends the core capabilities field to the second device in the association phase, or the first device includes the fourth indication information in an optional subelements field of an EDMG sensing capability field and sends the optional subelements field to the second device in the association phase.

For descriptions of a frame structure of the fourth indication information, refer to the foregoing descriptions of the frame structure of the first indication information. Details are not described herein again.

Optionally, when sending the fourth indication information to the second device, the first device may further send seventh indication information to the second device.

The seventh indication information may indicate whether the first device supports feedback of a compressed beamforming matrix based on SVD.

For descriptions that the first device sends the fourth indication information and the seventh indication information to the second device, refer to the foregoing descriptions that the first device sends the first indication information and the seventh indication information to the second device. Details are not described herein again.

Optionally, before the first device performs channel measurement, the first device may further send eleventh indication information to the second device, where the eleventh indication information may indicate whether the first device supports feedback of a compressed beamforming matrix for implementing sensing.

When the eleventh indication information indicates that the first device supports feedback of the compressed beamforming matrix for implementing sensing, the first device may feed back the compressed beamforming matrix and the first information to the second device by using the method shown in FIG. 19, or the first device may feed back the compressed beamforming matrix to the second device based on SVD.

For descriptions of a frame structure of the eleventh indication information, refer to the foregoing descriptions of the frame structure of the eighth indication information. Details are not described herein again.

Optionally, before the first device performs channel measurement, the second device may send fifth indication information to the first device.

The fifth indication information may indicate whether the second device supports feedback of a compressed beamforming matrix based on QR decomposition and the first information.

When the fifth indication information indicates that the second device supports feedback of the compressed beamforming matrix based on QR decomposition and the first information, the second device may perform QR decomposition through the action performed by the first device in FIG. 19, and feed back the compressed beamforming matrix based on QR decomposition and the first information to the first device. The first device may rotate the matrix Q through the action performed by the second device in FIG. 19, and perform target path sensing based on the rotated matrix Q.

Optionally, the second device includes the fifth indication information in a sensing capability field of an association response frame or a beacon frame and sends the sensing capability field to the first device in the association phase, the second device includes the fifth indication information in the core capabilities field of the EDMG sensing capability field and sends the core capabilities field to the first device in the association phase, or the second device includes the fifth indication information in the optional subelements field of the EDMG sensing capability field and sends the optional subelements field to the first device in the association phase.

For descriptions of a frame structure of the fifth indication information, refer to the foregoing descriptions of the frame structure of the second indication information. Details are not described herein again.

Optionally, when sending the fifth indication information to the first device, the second device may further send ninth indication information to the first device.

The ninth indication information may indicate whether the second device supports feedback of the compressed beamforming matrix based on SVD.

For descriptions that the second device sends the fifth indication information and the ninth indication information to the first device, refer to the foregoing descriptions that the second device sends the second indication information and the ninth indication information to the first device. Details are not described herein again.

Optionally, before the first device performs channel measurement, the second device may further send twelfth indication information to the first device, where the twelfth indication information may indicate whether the second device supports feedback of the compressed beamforming matrix for implementing sensing.

When the twelfth indication information indicates that the second device supports feedback of the compressed beamforming matrix for implementing sensing, the second device may feed back the compressed beamforming matrix and the first information to the first device through the action performed by the first device in the method shown in FIG. 19, or the second device may feed back the compressed beamforming matrix to the first device based on SVD.

For descriptions of a frame structure of the twelfth indication information, refer to the foregoing descriptions of the frame structure of the tenth indication information. Details are not described herein again.

Optionally, before the first device performs channel measurement, the second device may send a sensing request frame to the first device.

The sensing request frame may include a feedback type indication. The feedback type indication may indicate to feed back channel state information for implementing sensing.

When the feedback type indication indicates to feed back the channel state information for implementing sensing, the first device may feed back the compressed beamforming matrix and the first information to the second device by using the method described in FIG. 19, and the second device performs sensing based on the received compressed beamforming matrix and the received first information.

For descriptions of a frame structure of the sensing request frame, refer to the foregoing descriptions of the frame structure of the sensing request frame. Details are not described herein again.

Optionally, before the first device performs channel measurement, the first device may send a sensing response frame to the second device.

The sensing response frame may include a feedback type indication. The feedback type indication may indicate to feed back the channel state information for implementing sensing.

When the feedback type indication indicates to feed back the channel state information for implementing sensing, the first device may feed back the compressed beamforming matrix and the first information to the second device by using the method described in FIG. 19, and the second device performs sensing based on the received compressed beamforming matrix and the received first information.

For descriptions of a frame structure of the sensing response frame, refer to the foregoing descriptions of the frame structure of the sensing response frame. Details are not described herein again.

Optionally, before the first device performs channel measurement, the second device may send sixth indication information to the first device.

The sixth indication information indicates to use feedback of the compressed beamforming matrix based on QR decomposition and the first information.

Optionally, the sixth indication information is located in one or more of the following frames: a sensing NDPA, a sensing trigger frame, or a BRP.

Optionally, the sixth indication information is located in one or more of the following fields: a user information field of a sensing NDPA, a common information field of a sensing NDPA, a common information field of a sensing trigger frame, a user information field of a sensing trigger frame, or a reserved field of a BRP.

When the sixth indication information indicates to use feedback of the compressed beamforming matrix based on QR decomposition and the first information, the first device may feed back the compressed beamforming matrix and the first information to the second device by using the method in FIG. 19, and the second device performs sensing based on the received compressed beamforming matrix and the received first information.

For descriptions of a frame structure of the sixth indication information, refer to the foregoing descriptions of the frame structure of the third indication information. This is not limited in this disclosure.

Based on the foregoing descriptions of the fourth indication information to the twelfth indication information and the sensing request frame and the sensing response frame, the foregoing indication information, the sensing request frame, and the sensing response frame may be used independently, or may be used in combination. This is not limited in this disclosure.

Based on the communication method shown in FIG. 8, the first device may decompose the channel state information based on QR decomposition, may decompose the channel state information through SVD, or may decompose the channel state information in another decomposition manner. This is not limited in this disclosure. It should be noted that in the beamforming feedback matrix (or the beamforming matrix) obtained by the first device through decomposition, the plus or minus signs of the column vectors for sensing are consistent in a subcarrier dimension, and/or the plus or minus signs of the column vectors for sensing are consistent in a sample dimension.

Based on the communication method shown in FIG. 19, the first device may decompose the channel state information based on QR decomposition, may decompose the channel state information through SVD, or may decompose the channel state information in another decomposition manner. This is not limited in this disclosure. It should be noted that after receiving the beamforming feedback matrix sent by the first device, the second device may rotate the beamforming feedback matrix, and in a rotated beamforming feedback matrix, plus or minus signs of column vectors for sensing are consistent in a subcarrier dimension, and/or plus or minus signs of column vectors for sensing are consistent in a sample dimension.

The foregoing mainly describes the solutions provided in embodiments of this disclosure from a perspective of interaction between the devices. It may be understood that, to implement the foregoing functions, each device includes a corresponding hardware structure and/or a corresponding software module for performing each function. A person skilled in the art should easily be aware that, in combination with algorithm steps of the examples described in embodiments disclosed in this specification, this disclosure may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure.

In embodiments of this disclosure, functional modules of each device may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example and is merely logical function division, and may be other division in an actual implementation.

Figure 20:
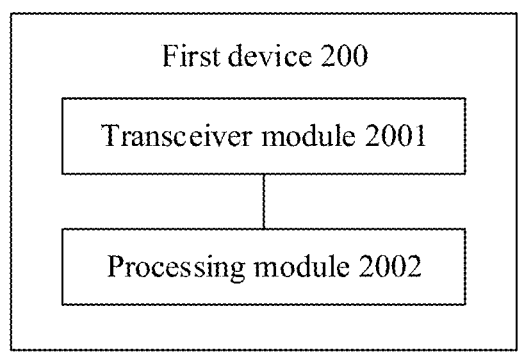
FIG. 20 is a diagram of a first device according to an embodiment of this disclosure.

When each functional module is obtained through division based on each corresponding function, FIG. 20 shows a first device 200. The first device 200 may perform actions performed by the first device in FIG. 8 to FIG. 19.

The first device 200 may include a transceiver module 2001 and a processing module 2002. For example, the first device 200 may be the first device, or may be a chip used in the first device or another combined part or component having a function of the first device. When the first device 200 is the first device, the transceiver module 2001 may be a transceiver. The transceiver may include an antenna, a radio frequency circuit, and the like. The processing module 2002 may be a processor (or a processing circuit), for example, a baseband processor. The baseband processor may include one or more central processing units (CPUs). When the first device 200 is a component having a function of the first device, the transceiver module 2001 may be a radio frequency unit. The processing module 2002 may be a processor (or a processing circuit), for example, a baseband processor. When the first device 200 is a chip system, the transceiver module 2001 may be an input/output interface of a chip (for example, a baseband chip). The processing module 2002 may be a processor (or a processing circuit) of the chip system, and may include one or more central processing units. It should be understood that the transceiver module 2001 in this embodiment of this disclosure may be implemented by a transceiver or a transceiver-related circuit component. The processing module 2002 may be implemented by a processor or a processor-related circuit component (or referred to as a processing circuit).

For example, the transceiver module 2001 may be configured to perform all sending and receiving operations performed by the first device in embodiments shown in FIG. 8 to FIG. 19, and/or configured to support another process of the technology described in this specification. The processing module 2002 may be configured to perform all operations other than the receiving and sending operations performed by the first device in the embodiments shown in FIG. 8 to FIG. 19, and/or configured to support another process of the technology described in this specification.

In another possible implementation, the transceiver module 2001 in FIG. 20 may be replaced with a transceiver, and a function of the transceiver module 2001 may be integrated into the transceiver. The processing module 2002 may be replaced with a processor, and a function of the processing module 2002 may be integrated into the processor. Further, the first device 200 shown in FIG. 20 may further include a memory.

Figure 21:
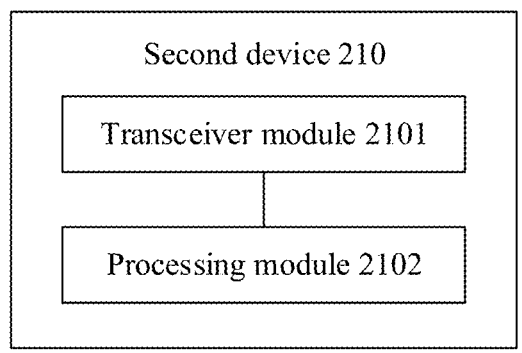
FIG. 21 is a diagram of a second device according to an embodiment of this disclosure.

When each functional module is obtained through division based on each corresponding function, FIG. 21 shows a second device 210. The second device 210 may perform actions performed by the second device in FIG. 8 to FIG. 19.

The second device 210 may include a transceiver module 2101 and a processing module 2102. For example, the second device 210 may be the second device, or may be a chip used in the second device or another combined part or component having a function of the second device. When the second device 210 is the second device, the transceiver module 2101 may be a transceiver. The transceiver may include an antenna, a radio frequency circuit, and the like. The processing module 2102 may be a processor (or a processing circuit), for example, a baseband processor. The baseband processor may include one or more CPUs. When the second device 210 is a component having a function of the second device, the transceiver module 2101 may be a radio frequency unit. The processing module 2102 may be a processor (or a processing circuit), for example, a baseband processor. When the second device 210 is a chip system, the transceiver module 2101 may be an input/output interface of a chip (for example, a baseband chip). The processing module 2102 may be a processor (or a processing circuit) of the chip system, and may include one or more central processing units. It should be understood that the transceiver module 2101 in this embodiment of this disclosure may be implemented by a transceiver or a transceiver-related circuit component. The processing module 2102 may be implemented by a processor or a processor-related circuit component (or referred to as a processing circuit).

For example, the transceiver module 2101 may be configured to perform all sending and receiving operations performed by the second device in embodiments shown in FIG. 8 to FIG. 19, and/or configured to support another process of the technology described in this specification. The processing module 2102 may be configured to perform all operations other than the receiving and sending operations performed by the second device in the embodiments shown in FIG. 8 to FIG. 19, and/or configured to support another process of the technology described in this specification.

In another possible implementation, the transceiver module 2101 in FIG. 21 may be replaced with a transceiver, and a function of the transceiver module 2101 may be integrated into the transceiver. The processing module 2102 may be replaced with a processor, and a function of the processing module 2102 may be integrated into the processor. Further, the second device 210 shown in FIG. 21 may further include a memory.

Embodiments of this disclosure further provide a computer-readable storage medium. All or some of procedures in the foregoing method embodiments may be implemented by a computer program instructing related hardware. The program may be stored in the foregoing computer-readable storage medium. When the program is executed, the procedures in the foregoing method embodiments may be performed. The computer-readable storage medium may be an internal storage unit in the terminal (including a data transmitter and/or a data receiver) in any one of the foregoing embodiments, for example, a hard disk or a memory of the terminal. The computer-readable storage medium may alternatively be an external storage device of the foregoing terminal, for example, a plug-in hard disk, a smart media card (SMC), a Secure Digital (SD) card, or a flash card that is configured on the foregoing terminal. Further, the computer-readable storage medium may further include both an internal storage unit and an external storage device of the foregoing terminal. The computer-readable storage medium is configured to store the computer program and other programs and data required by the foregoing terminal. The computer-readable storage medium may be further configured to temporarily store data that has been output or is to be output.

It should be noted that, in the specification, claims, and accompanying drawings of this disclosure, the terms "first", "second", and the like are intended to distinguish between different objects but do not describe a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this disclosure, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

In the several embodiments provided in this disclosure, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this disclosure essentially or all or some of the technical solutions may be implemented in the form of a software product. The software product is stored in a storage medium and includes several instructions for instructing a device (or a single-chip microcomputer, a chip, or the like) or a processor to perform all or some of the steps of the methods described in embodiments of this disclosure. The foregoing storage medium includes any medium that

What is claimed is:

1. A method implemented by a first device, the method comprising:
   receiving, from a second device, a first frame for channel measurement;
   obtaining, based on the first frame, channel state information (CSI), wherein a dimension of the CSI is $N_r \times N_t \times K$, wherein $N_r$ is a first quantity of first antennas of the first device, wherein $N_t$ is a second quantity of second antennas of the second device, wherein K is a third quantity of subcarriers that carry the first frame, and wherein $N_r$, $N_t$, and K are all positive integers;
   performing a conjugate transpose and a QR decomposition on the CSI to obtain an upper right triangular matrix R and a matrix Q, wherein in first L rows of the upper right triangular matrix R, at least one first row comprises positive or negative values of first elements on a first corresponding diagonal that are consistent in a subcarrier dimension and at least one second row comprises positive or negative values of second elements on a second corresponding diagonal that are consistent in a sample dimension, wherein L is a fourth quantity of target paths between the first device and the second device, wherein a sample comprises pieces of the CSI based on times of the channel measurement in a time dimension, the sample dimension corresponds to the pieces of the CSI, and wherein the matrix Q indicates attribute information of a target path; and
   sending, to the second device, the matrix Q.

2. The method of claim 1, the matrix Q or a first matrix based on at least one column of the matrix Q is a unitary matrix.

3. The method of claim 1, the attribute information comprises one or more of a delay of the target path, an angle of departure (AOD) of the target path, or a Doppler shift of the target path.

4. The method of claim 1, wherein performing the conjugate transpose and the QR decomposition on the CSI comprises:
   obtaining a first location and a second location, the first location is of a third element that is in the first L rows and that comprises the positive or negative values of the first elements, and the second location is of a fourth element that is in the first L rows and that comprises the positive or negative values of the second elements; and
   further performing, based on the first location and the second location the conjugate transpose and the QR decomposition on the CSI.

5. The method of claim 4, wherein obtaining the first location and the second location comprises:
   receiving, from the second device, first information regarding the first location and second information regarding the second location;
   identifying that the first location and the second location are predefined; or
   defining the first location and the second location.

6. The method of claim 4, further comprising sending, to the second device, first information regarding the first location and second information regarding the second location.

7. The method of claim 1, wherein before receiving the first frame from the second device, the method further comprises:
   sending, to the second device, first indication information indicating whether the first device supports one or more of the following feedbacks:
   first feedback of a first compressed beamforming matrix based on subcarrier dimension consistency; or
   second feedback of a second compressed beamforming matrix based on sample dimension consistency.

8. The method of claim 7, the first indication information is located in one or more a sensing capability field of an association request frame, a core capabilities field of an enhanced directional multi-gigabit (EDMG) sensing capability field, or an optional subelements field of the EDMG sensing capability field.

9. The method of claim 1, wherein before receiving the first frame, the method further comprises:
   receiving, from the second device, indication information indicating whether the second device supports one or more of the following feedbacks:
   first feedback of a first compressed beamforming matrix based on subcarrier dimension consistency; or
   second feedback of a second compressed beamforming matrix based on sample dimension consistency.

10. The method of claim 9, the indication information is located in one or more of a first sensing capability field of an association response frame, a second sensing capability field of a beacon frame, a core capabilities field of an enhanced directional multi-gigabit (EDMG) sensing capability field, or an optional subelements field of an of the EDMG sensing capability field.

11. A method implemented by a second device, the method comprising:
    sending, to a first device, a first frame for channel measurement;
    receiving, from the first device based on the first frame, a matrix Q that is based on channel state information (CSI), the matrix Q indicates attribute information of a target path, and the target path is between the first device and the second device;
    obtaining a first location and a second location, the first location is of a first element that is in first L rows of a matrix R and that comprises positive or negative values of second elements on a first corresponding diagonal that are consistent in a subcarrier dimension, the second location is of a third element that is in the first L rows and that comprises positive or negative values of fourth elements on a second corresponding diagonal that are consistent in a sample dimension, and wherein L is a fourth quantity of target paths; and
    performing, based on the matrix Q, the first location and the second location, target path sensing.

12. The method of claim 11, the matrix Q or a first matrix based on at least one column of the matrix Q is a unitary matrix.

13. The method of claim 11, wherein a dimension of the CSI is $N_r \times N_t \times K$, wherein $N_r$ is a first quantity of first antennas of the first device, wherein $N_t$ is a second quantity of second antennas of the second device, wherein K is a third quantity of subcarriers that carry the first frame, and wherein $N_r$, $N_t$, and K are all positive integers.

14. The method of claim 13, the attribute information comprises one or more of a delay of the target path, an angle of departure (AOD) of the target path, or a Doppler shift of the target path.

15. A first device comprising:
a memory configured to store instructions; and
one or more processors coupled to the memory and configured to execute the instructions to cause the first device to:
receive, from a second device, a first frame for channel measurement;
obtain, based on the first frame, channel state information (CSI), wherein a dimension of the CSI is $N_r \times N_t \times K$, wherein $N_r$ is a first quantity of first antennas of the first device, wherein $N_t$ is a second quantity of second antennas of the second device, wherein K is a third quantity of subcarriers that carry the first frame, and wherein $N_r$, $N_t$, and K are all positive integers;
perform a conjugate transpose and a QR decomposition on the CSI to obtain an upper right triangular matrix R and a matrix Q, wherein in first L rows of the upper right triangular matrix R, at least one first row comprises positive or negative values of first elements on a first corresponding diagonal that are consistent in a subcarrier dimension and at least one second row comprises positive or negative values of second elements on a second corresponding diagonal that are consistent in a sample dimension, wherein L is a fourth quantity of target paths between the first device and the second device, wherein a sample comprises pieces of the CSI based on times of the channel measurement in a time dimension, the sample dimension corresponds to the pieces of the CSI, and the matrix Q indicates attribute information of a target path; and
send, to the second device, the matrix Q.

16. The first device of claim 15, the matrix Q or a first matrix based on at least one column of the matrix Q is a unitary matrix.

17. The first device of claim 15, the attribute information comprises one or more of a delay of the target path, an angle of departure (AOD) of the target path, or a Doppler shift of the target path.

18. The first device of claim 15, the one or more processors are further configured to execute the instructions to cause the first device to:
obtain a first location and a second location, the first location is of a third element that is in the first L rows and comprises the positive or negative values of the first elements, and the second location is of a fourth element that is in the first L rows and comprises the positive or negative values of the second elements; and
further perform, based on the first location and the second location, the conjugate transpose and the QR decomposition on the CSI.

19. The first device of claim 18, the one or more processors are further configured to execute the instructions to cause the first device to:
receive, from the second device, first information regarding the first location and second information regarding the second location;
identify that the first location and the second location are predefined; or
define the first location and the second location.

* * * * *